(12) United States Patent
Massara et al.

(10) Patent No.: US 11,839,844 B2
(45) Date of Patent: Dec. 12, 2023

(54) FILTRATION DEVICES AND ASSOCIATED FILTER ELEMENT

(71) Applicant: Donaldson Company, Inc., Minneapolis, MN (US)

(72) Inventors: Mirko Massara, Borgo Mantavano (IT); Stefano Bertelli, Magnacavallo (IT); Alessandro Torresani, Nogara (IT); Fabrizio Buratto, Sustinente (IT); Isacco Pavanelli, Sermide e Felonica (IT); Miloslav Krystufek, Brussels (BE); Luca Ghisu, Bierbeek (BE); John K. Aune, Edina, MN (US); Gert Willems, Edegem (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 17/342,121

(22) Filed: Jun. 8, 2021

(65) Prior Publication Data
US 2021/0379514 A1  Dec. 9, 2021

Related U.S. Application Data

(60) Provisional application No. 63/036,536, filed on Jun. 9, 2020.

(51) Int. Cl.
*B01D 35/30* (2006.01)
*B01D 29/33* (2006.01)
*B01D 35/027* (2006.01)

(52) U.S. Cl.
CPC .......... *B01D 35/306* (2013.01); *B01D 29/33* (2013.01); *B01D 35/027* (2013.01);
(Continued)

(58) Field of Classification Search
CPC .... B01D 35/306; B01D 29/33; B01D 35/027; B01D 2201/0461; B01D 2201/301;
(Continued)

(56) References Cited

U.S. PATENT DOCUMENTS 5,593,577 A * 1/1997 Imai ..................... B01D 35/147
                                                    210/453
6,387,259 B1   5/2002 Roll
(Continued)

FOREIGN PATENT DOCUMENTS

DE      102013019807 A1   5/2015
EP          3185982 A1   7/2017
WO       2019012425 A1   1/2019

OTHER PUBLICATIONS

International Search Report and Written Opinion for PCT/US2021/036441 dated Aug. 26, 2021, 18pgs.

*Primary Examiner* — Waqaas Ali
(74) *Attorney, Agent, or Firm* — Merchant & Gould P.C.

(57) ABSTRACT

A filter assembly is disclosed comprising a filter cartridge, a filter housing end part, and a filter housing main part, said filter housing main part being adapted for receiving said filter cartridge and for being connected to the housing end part by screwing, wherein
said filter housing main part comprises a first longitudinal axis and a main opening, said main opening being defined by a first end portion, said first end portion comprising an upper, interrupted rim and a first threaded portion arranged below said upper rim;
said first end portion comprising a recess arrangement comprising one or more axially extending recesses, said one or more axially extending recesses at least partially interrupting said first threaded portion;
said filter cartridge comprises a second longitudinal axis and a first end cap, said first end cap comprising a
(Continued)

central portion and a radial extension arrangement comprising one or more radial extensions extending radially away from said central portion; and wherein said radial extension arrangement is adapted for being receivable or received by said recess arrangement; and associated cartridges.

29 Claims, 33 Drawing Sheets

(52) U.S. Cl.
CPC ............... *B01D 2201/0461* (2013.01); *B01D 2201/295* (2013.01); *B01D 2201/301* (2013.01); *B01D 2201/4092* (2013.01)

(58) Field of Classification Search
CPC .... B01D 2201/4092; B01D 2201/4053; B01D 35/14; B01D 35/147; B01D 2201/316; B01D 2201/4046; B01D 29/21
See application file for complete search history.

(56) References Cited

U.S. PATENT DOCUMENTS

| | | |
|---|---|---|
| 6,595,372 B1 | 7/2003 | Minowa et al. |
| 7,232,522 B1 | 6/2007 | Lasley et al. |
| 7,237,682 B2 | 7/2007 | Reynolds et al. |
| 8,425,773 B2 | 4/2013 | Bonta et al. |
| 10,307,712 B2 | 6/2019 | Huda et al. |
| 10,675,567 B2 | 6/2020 | Core et al. |
| 2004/0018043 A1 | 1/2004 | Yu |
| 2005/0000886 A1 | 1/2005 | Reynolds et al. |
| 2011/0089104 A1 | 4/2011 | Menez et al. |
| 2013/0256206 A1* | 10/2013 | Thalmann ............ B01D 35/306 210/232 |
| 2015/0144549 A1 | 5/2015 | Kreibig |
| 2017/0136412 A1 | 5/2017 | Huda et al. |

* cited by examiner

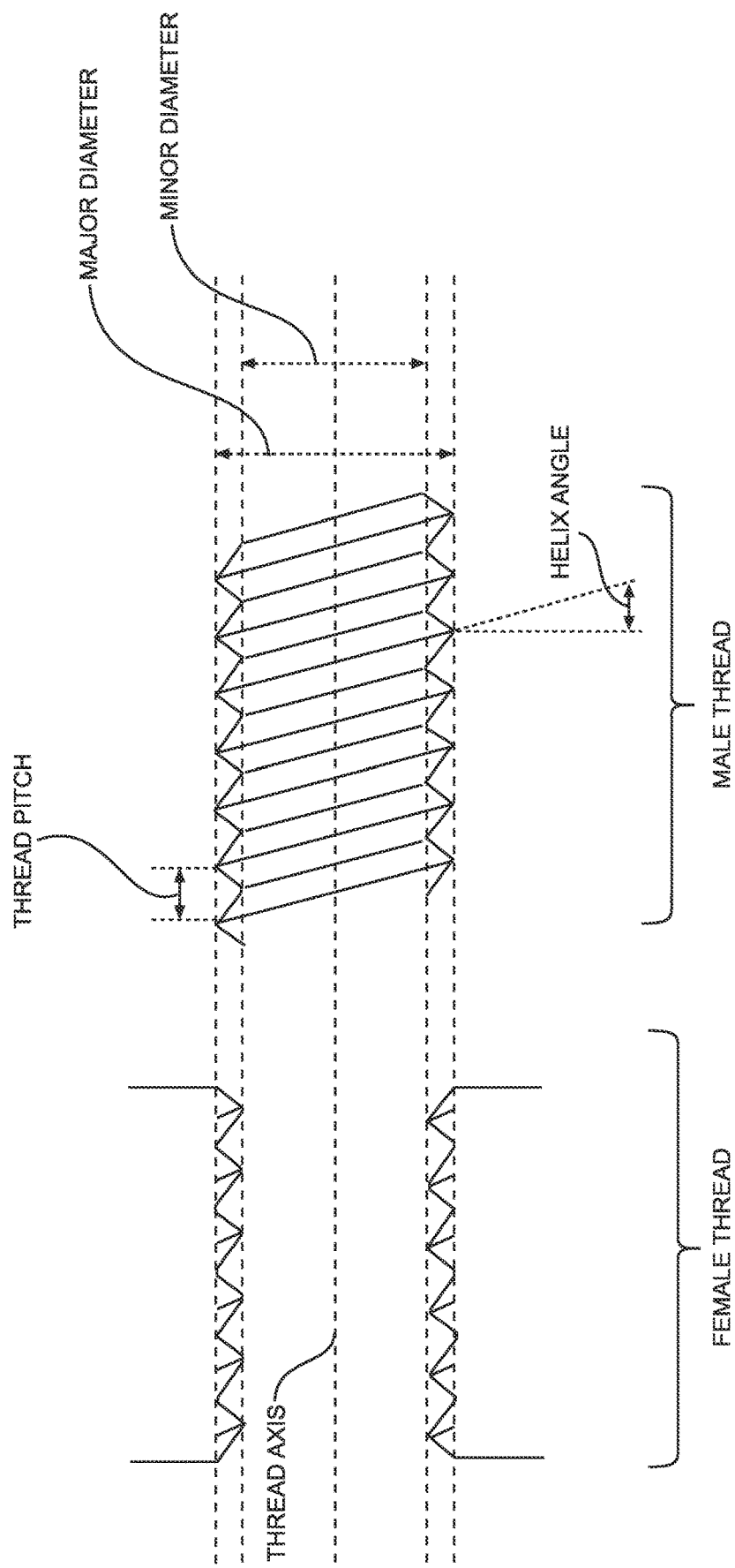

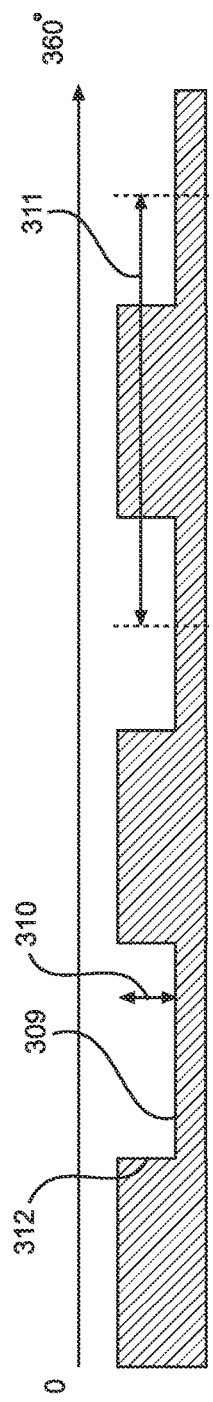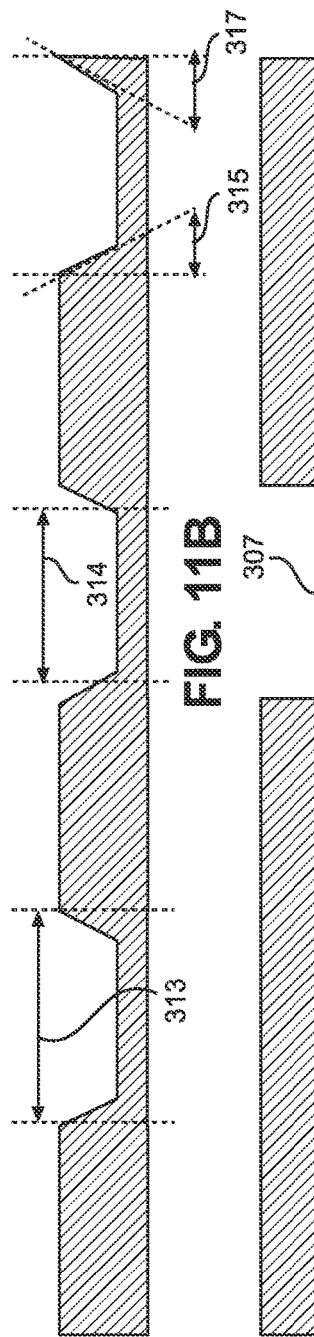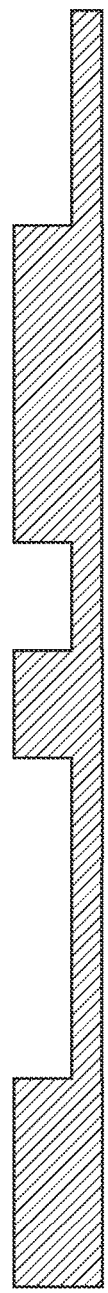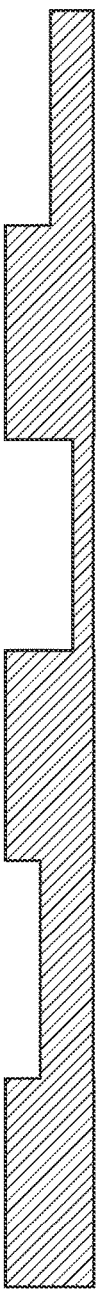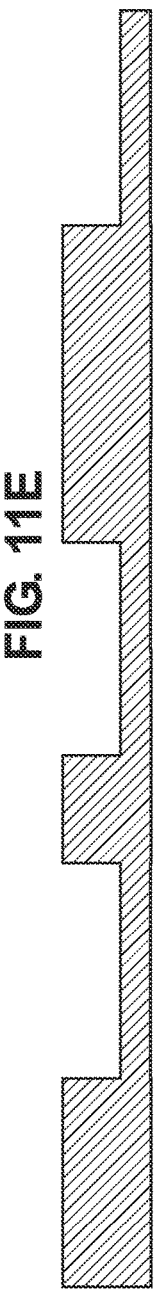
FIG. 11A
FIG. 11B
FIG. 11C
FIG. 11D
FIG. 11E
FIG. 11F

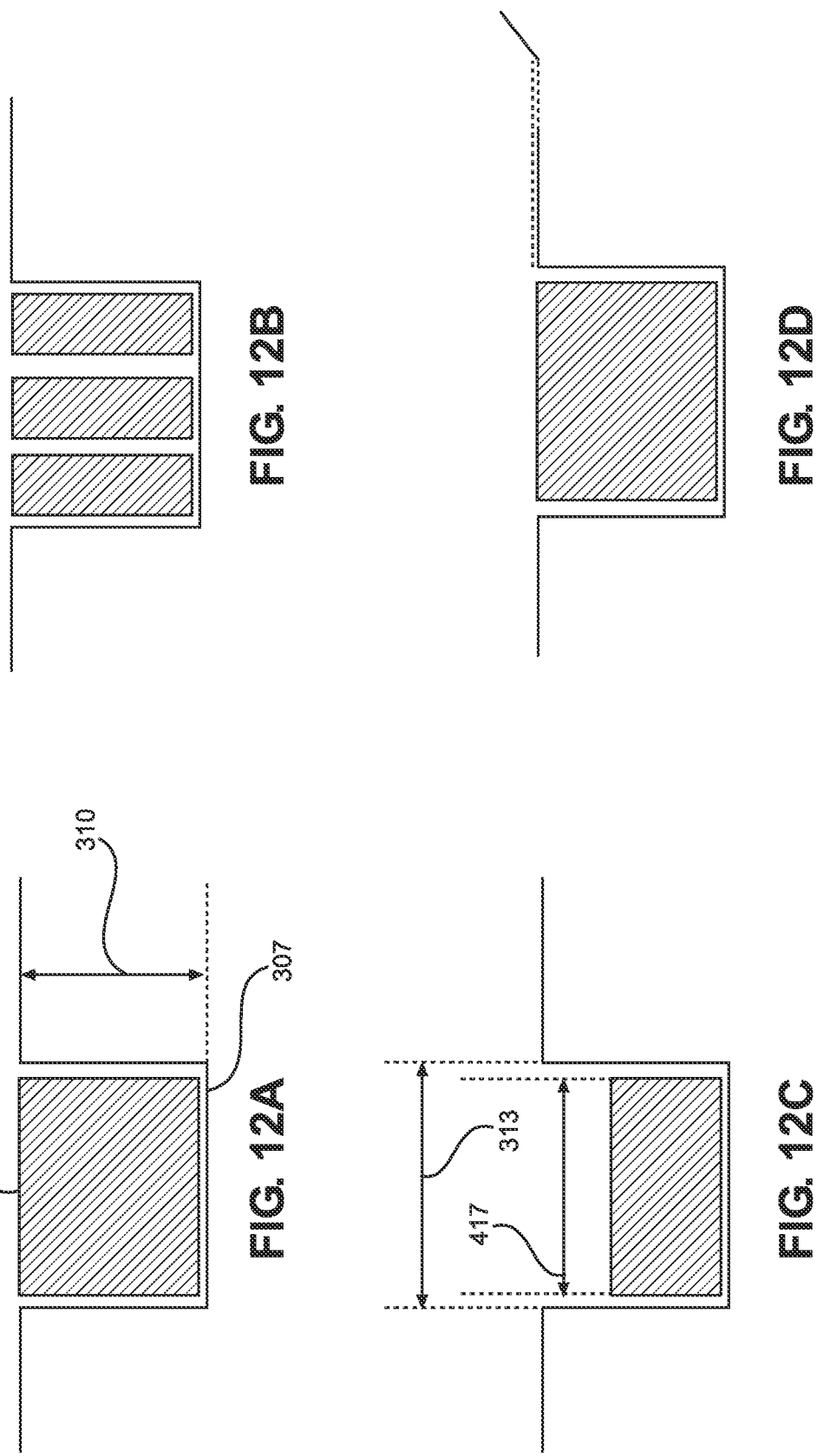

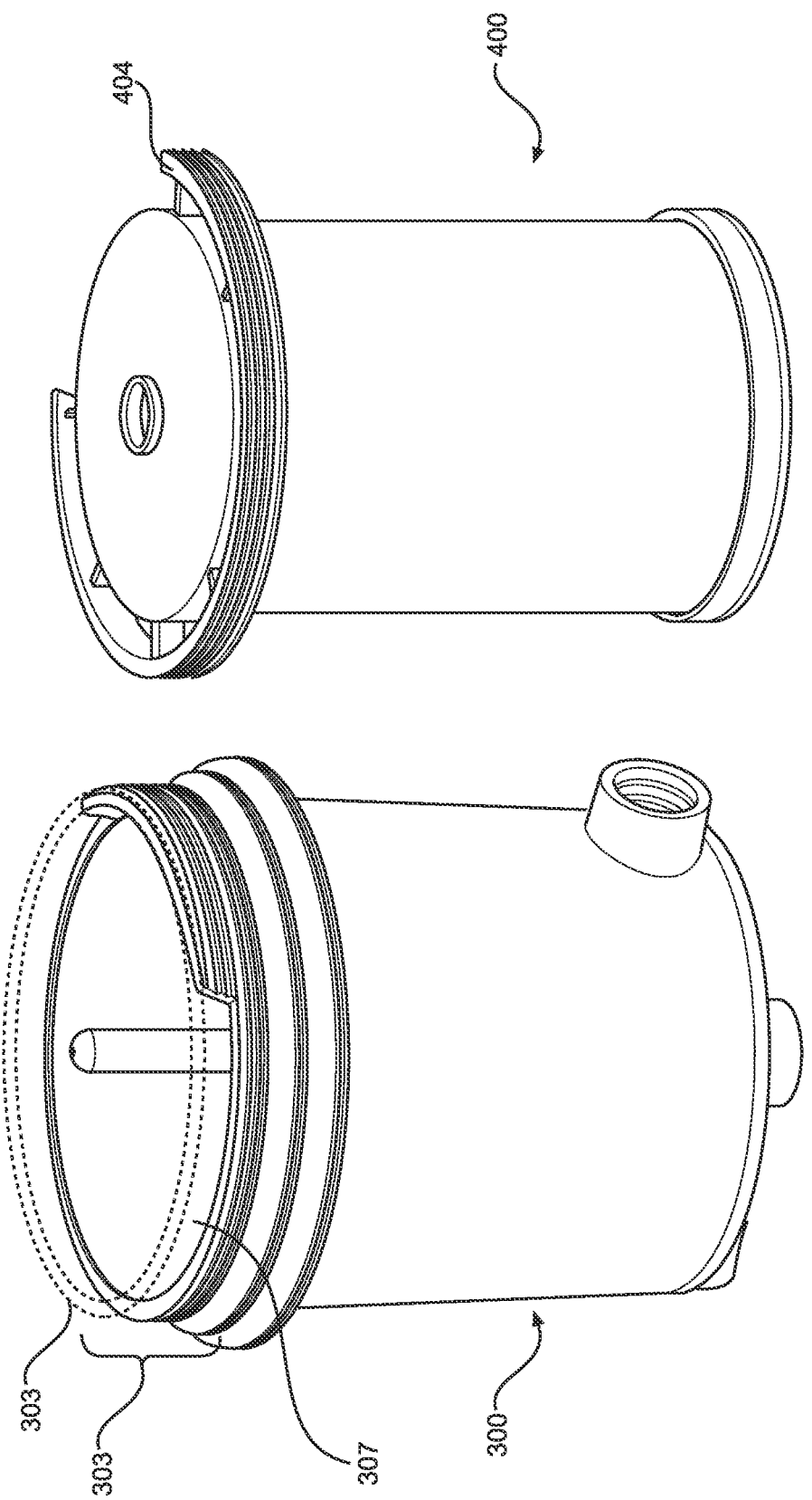

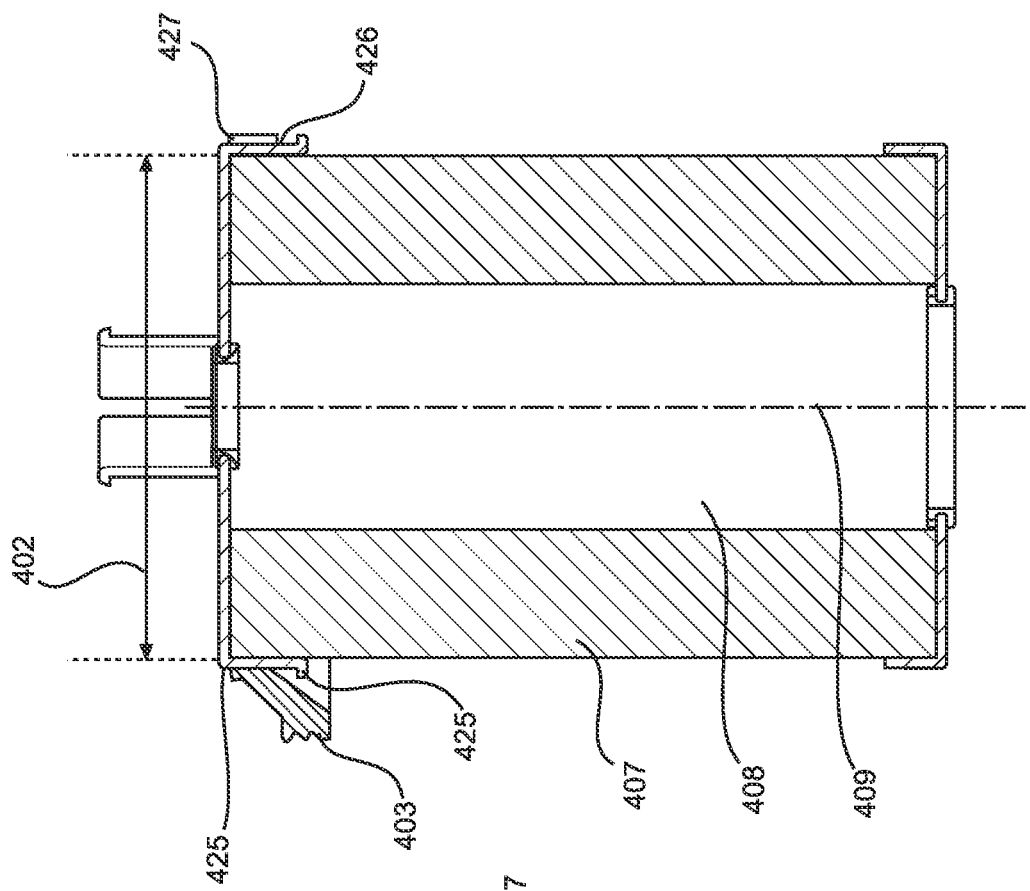
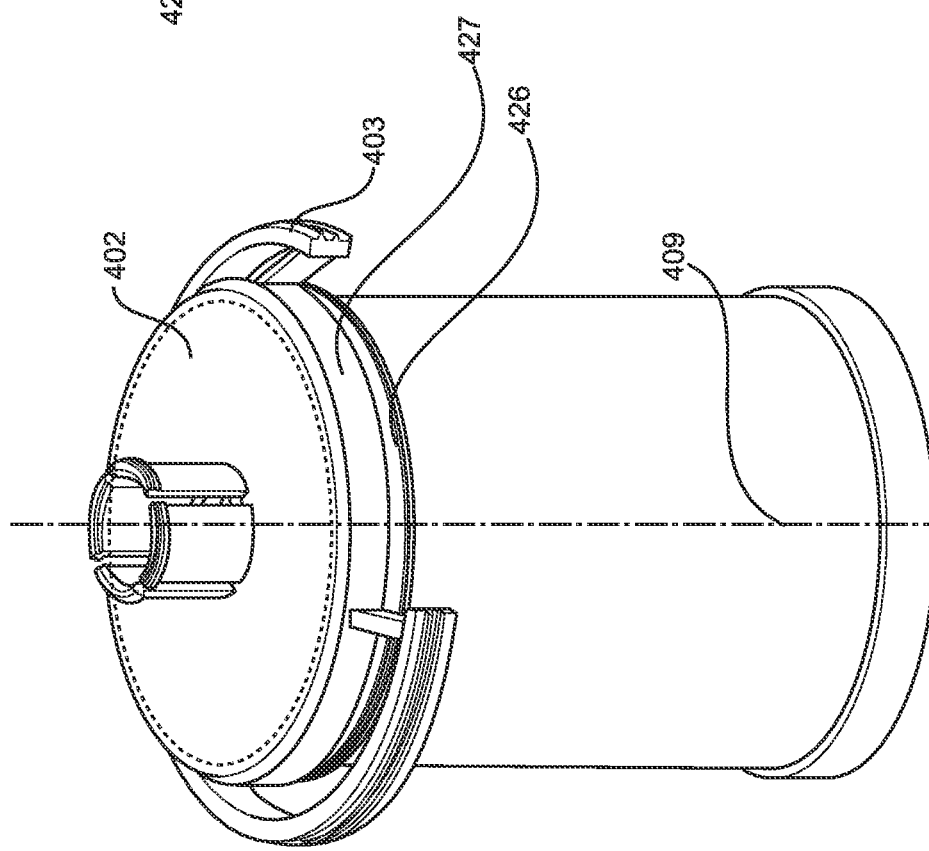

FILTRATION DEVICES AND ASSOCIATED FILTER ELEMENT

CROSS-REFERENCE TO RELATED APPLICATION

This application claims the benefit of U.S. Provisional Patent Application Ser. No. 63/036,536, filed Jun. 9, 2020, which is incorporated herein by reference in its entirety.

TECHNICAL FIELD

The present disclosure relates to filtration devices, especially to filtration assemblies and associated filter elements.

BACKGROUND ART

Fluid filters as for instance liquid filters have been employed in a variety of applications including hydraulic systems, engine lubrication systems, and fuel systems. In these type of systems, a filter cartridge (also referred to as filter element) is serviced periodically. This is important to protect equipment from contaminant.

Bowl/cartridge assemblies are known in the art. Bowl/cartridge assemblies can be of the bottom-mount type, wherein a filter cartridge is, during servicing, brought into a filter bowl, the latter which is then mounted on a filter head from below. Bowl/cartridge assemblies can also be of the top-mount type, whereby a filter housing main part has a main access opening oriented upwards and is receiving the filter cartridge through this main access opening from above. In assemblies of the top-mount type, fluid/liquid flow lines may be comprised in the filter housing main part for guiding the fluid to be filtered into the filtration assembly, and away from the filtration assembly after the fluid has been filtered by passing though the filtration media of the filter cartridge. The upwardly oriented main opening of assemblies of the top-mount type can be closed off by a filter housing end part as e.g. a filter housing end cover.

In examples of liquid filter assemblies of the bottom-mount type, a housing is removably mounted on a filter head, filter base or some other form of manifold, which directs liquid to be filtered to the filter system and which provides for removal of filtered liquid from the system. Such assemblies are sometimes referenced as "in-line", since the filter assembly is typically positioned in one or more liquid flow lines. This type of assembly includes a receiving housing or bowl which is mounted on the filter head, base or manifold, for example through a threaded engagement. The filter head and filter receiving housing typically define the housing of the filtration assembly. A filter cartridge is positioned within the filter receiving housing or bowl, and engages appropriate portions of the filter head as the filter receiving housing or bowl is mounted, for sealing interaction to provide for a filtering flow path of unfiltered liquid to the filter cartridge, and filtered liquid from the filter cartridge.

It is important to ensure, during servicing, that the filter cartridge is properly and sealingly positioned within the assembly. Since portions of the housing may block view of the cartridge, during closure of the housing, it is preferable to develop features to help ensure proper alignment and interaction between the cartridge and a remainder of the system, to ensure that the cartridge is properly positioned for use.

In addition, with the continued development of still greater numbers of different applications for liquid filter arrangements and a wide number of various types of systems to use them, it is important to ensure that any filter cartridge that is positioned within the housing of a given filter assembly, is a proper filter cartridge for that assembly.

Furthermore, it is preferable when the filter cartridge is removably attached to the bowl such that, upon unmounting the bowl from the filter head, the filter cartridge remains removably attached to the bowl. This serves different purposes.

For instance, it avoids that, upon removal of the bowl, liquid drips from the filter cartridge into the surroundings of the filter assembly, thereby contaminating them. When the cartridge remains removably attached to the bowl, the remaining liquid will drip into the bowl and can conveniently be discarded once the bowl is removed from the system, thereby enabling clean servicing of the system.

Also, it greatly reduces the amount of clearance that is required for servicing of the filter assembly, as the cartridge remain in the bowl during that process. Since liquid filters are often installed in tight spaces, like motor compartments of vehicles, such a reduction in the amount of clearance required is highly beneficial from a design, manufacturing and maintenance perspective.

Patent application US20170028322A1 (Donaldson Inc.) solves some of the above mentioned problems. However, the Applicant has realized that some desirable functions are missing in embodiments of US20170028322A1.

For example, it is not only important to ensure that only the proper filter cartridge can be installed in a filter assembly, it is even more important to ensure that the filter assembly cannot be completed without the presence of any filter cartridge.

Also, it is preferable when any features which are incorporated to ensure the usage of the proper cartridge type, proper cartridge positioning, and proper engagement within system, are features that are relatively mechanically robust and convenient to align in use.

Furthermore, it is highly preferable when these features are simple and inexpensive to construct, assemble and tailor to client's needs. Since existing embodiments often rely on interaction with the filter head, which is mechanically the most complex part of the system and hence also the most expensive part of the system, this is not the case at the moment. A solution which does not require any modification to the filter head for usage with different types of filter cartridges is thus highly desirable.

While the above examples, preferences and advantages have mainly focused on bowl/cartridge assemblies of the bottom-mount type, the skilled person will appreciate that many of those are also applicable on housing main part/cartridge assemblies of the top-mount type.

There exist a need in industry for improved and alternative filtration assemblies and associated filtration elements.

SUMMARY OF THE DISCLOSURE

It is an objective of the present disclosure to provide a filtration assembly according to claim 1, and to provide associated filter elements, according to the other independent claims.

In a first aspect of the present disclosure, a filter assembly is disclosed comprising a filter cartridge, a filter housing end part, and a filter housing main part, the filter housing main part being adapted for receiving the filter cartridge and adapted for being connected to the filter housing end part by means of screwing, wherein the filter housing main part comprises a first longitudinal axis and a main opening, the main opening being defined by a first end portion, the first end portion comprising an upper, interrupted rim and a first threaded portion arranged below the upper rim;

the first end portion comprises a recess arrangement comprising one or more axially extending recesses, the one or more axially extending recesses at least partially interrupting the first threaded portion;

the filter cartridge comprises a filtration media and comprising a second longitudinal axis and a first end cap connected to said filtration media, the first end cap comprising a central portion and a radial extension arrangement comprising one or more radial extensions extending radially away from the central portion; and wherein the radial extension arrangement is adapted for being received (or receivable) by the recess arrangement.

For the purpose of the present description, when it is mentioned that a part A and a part B are connected by screwing, it covers a relative movement and cover both the situation where part A is screwed on or in part B, part B being stationary, as the situation where part B is screwed in or on part A, part A being stationary. The skilled person will realize what applies depending on the embodiments concerned.

The filter housing main part preferably is the part of the filter housing adapted for substantially receiving the largest portion of the filter element, e.g. more than 50 or 60 or 70 or 80 or 90 or 95 or 99%, or even 100% of the filter element's length.

Preferably, the central portion of the first end cap corresponds to the projection of the filtration media onto the first end cap along the second longitudinal axis. Preferably, the central portion comprises the portion of the first end cap that abuts the filtration media. Preferably, the central portion comprises a circular outer perimeter.

Preferably, the radial extension arrangement comprises an annular portion directly surrounding the central portion. The annular portion then preferably constitutes the inner portion of the radial extension arrangement. Depending on particular architecture of the filter cartridge, the annular portion can be for instance a projecting rim of the end cap, which is often used to confine the filtration media radially and/or to confine the potting or glue material used to bond the filtration media to the first end cap. Alternatively, for instance in case a direct bonding process is used, whereby the filtration media is attached to the first end cap without glue or potting, the annular portion may comprise a portion of the end cap which is not showing any separate radial extension features.

According to preferred embodiments, the filtration media comprises pleated media or foamed media, or other media known to the skilled person. Preferably, the filtration media is arranged in a tubular manner, preferably defining a cylindrical outer and/or inner envelope. Preferably the filtration media comprises a circular cross-section in a direction perpendicular on the second longitudinal axis.

It is an advantage that embodiments of the present disclosure that it is difficult or impossible to install an improper filter cartridge.

It is another advantage that the filter cartridge can be installed in a single predetermined position, or in a limited set of two or more predetermined positions with respect to the filter housing main part.

It is another advantage that the filter assembly is to some extent difficult to mount in the absence of a filter cartridge, such that the system becomes of the no filter—no run type. Indeed, it is more difficult to screw on the filter housing main part/bowl if it's upper rim is interrupted regularly or irregularly by the recess arrangement. In another view, a protrusion arrangement, complementary to the recess arrangement of the first end portion of the filter bowl, can be designed such that it may become difficult to center and start screwing onto the filter housing end part. It may also be difficult to do so without creating damage to the first threaded portion of the filter housing main part or corresponding thread in the filter housing end part (second threaded portion). It may moreover also be difficult to find the start of the second threaded portion in the filter housing end part.

It is a further advantage that the radial extension arrangement, especially it's outer surface, can be used to remove the filter element or cartridge from the filter housing main part as e.g. the filter bowl. The outer surface is clearly visible when the filter housing main part and the filter housing end part are separated, and can be reached easily. If the radial extension arrangement is provided with a thread structure, the thread constitutes a gripping feature, which avoids the element slipping from between a user's fingers when servicing. It will be appreciated by the user of the assembly that the outer surface of the radial extension arrangement is not or to a very limited extent in contact with the fluid in the filtration assembly.

It is a further advantage that, when servicing, the filter cartridge can be lifted partially from the filter housing main part, and after being slightly rotated, rest on the upper rim of the protrusion arrangement of the filter housing main part. This would allow a draining mechanism to open and/or allow the filter element to release most of its remnant fluid before removing the filter element completely from the filter housing main part.

The filter assembly is preferably adapted for filtration of fluids as gases and liquids. More preferably the assembly is adapted for filtration of fuel or oil or hydraulic liquids. In certain embodiment, the assembly can also be used for filtration of air.

The filter housing can comprise a filter bowl (filter housing main part) and filter head (filter housing end part), and can be of the bottom-mount type. The filter head is arranged for directing fluid to be filtered to the filter system/filter and for removal of filtered liquid from the system/filter. The filter assembly can be preferably of the "in-line" type, as the filter assembly is preferably positioned in one or more liquid flow lines. The filter cartridge or element engages appropriate portions of the filter head as the bowl is mounted on the head, for sealing interaction to provide for a filtering flow path of unfiltered liquid to the filter cartridge, and filtered liquid from the filter cartridge.

According to preferred embodiments, at least one, a plurality, or all the radial extensions of the radial extension arrangement extend radially away from the central portion for more than 3, 4, 5, 6, 7, 8, 9, 10 mm.

According to preferred embodiments, the radial extension arrangement extends radially away from the central portion for more than 3, 4, 5, 6, 7, 8, 9, 10, 15, 20, 25 mm.

According to preferred embodiments, the annular portion of the radial extension arrangement extends radially away from the central portion for about 1 to 5 mm, or for about 1 to 10 mm.

It will be appreciated that the first threaded portion has a pitch which is different from 0. For instance, the thread pith can be between 0.5 mm and 4 mm, more preferably between 1 and 3 mm.

The threaded portion preferably includes at least 2 or more threads. The skilled person will appreciate that thread portions described in the context of the present disclosure are different from portions often used in bayonet type fittings.

For the purpose of the present disclosure, the first threaded portion forms a continuous thread. The first threaded portion can be interrupted, but subsequent parts of said first threaded portion, present on adjacent protrusions of the protrusion arrangement, are forming a single continuous thread.

According to preferred embodiments, the protrusion arrangement (or recess arrangement) is defining a battlement type structure.

According to preferred embodiments, individual recesses of the recess arrangement can be of equal or unequal heights (length over the axial direction). Also the radial extensions of the first end cap of the filter cartridge can be arranged at different axial positions, in accordance with a corresponding recess arrangement.

In preferred embodiments, the filter housing end part comprises a second threaded portion for receiving the filter housing main part by means of at least the first threaded portion. The second threaded portion thus has a compatible thread with the first threaded portion. For instance, the second threaded portion preferably has the same pitch as the first threaded portion.

In preferred embodiments, the radial extension arrangement comprises only 1 radial extension.

Preferably, the single radial extension has an angular extent around said second longitudinal axis which is larger than 180°, more preferably larger than 190°, 200°, 210°, 220°, 230°, 240°, 250°, 260°, more preferably larger than 270°, 280°, 290°, 300°, 310°, 320°, 330°, 340°, 350°, 355°, and smaller than 360°.

It is an advantage of such embodiments, that it makes the start of a relative screwing process between filter housing main part and filter housing end part very difficult if not impossible without the presence of a suitable filter cartridge. Especially for an angular extent of the radial extension above 270°, installation is extremely difficult or impossible.

In preferred embodiments, the radial extension arrangement comprises at least 2 radial extensions.

In preferred embodiment, the at least 2 radial extensions are arranged fully within an angular range around said second longitudinal axis of less than 180°, or less than 135°, or less than 90°.

In certain embodiments, the at least 2 radial extensions are arranged at regular angular intervals.

In preferred embodiments, the at least 2 radial extensions are arranged at irregular angular intervals.

In preferred embodiments, the recess arrangement comprises one recess.

In preferred embodiments, the recess arrangement comprises at least two recesses.

In preferred embodiments, the amount of axial recesses equals the amount of radial extensions.

In preferred embodiments, the filter cartridge is such as that when it is received by the filter housing main part in a mounted state of the assembly, the radial extensions have an axial extent which equals the height of the respective recesses.

In preferred embodiments, the filter cartridge is such as that when it is received by the filter housing main part in a mounted state of the assembly, the radial extensions have an axial extent which is slightly (e.g. less than 10%) or substantially (more than 10%) smaller than the height of the respective recesses.

It is not excluded that the radial extensions have an axial extent which is slightly higher (e.g. up to 10%) than the height of the respective recesses, if case the filter housing end part would allow for sufficient clearance, or if the first filter end cap would be slightly compressible.

In preferred embodiments, the annular portion of the radial extension arrangement has a substantially circular perimeter, which has a limited clearance with respect to the inner side surface of the housing main part/bowl. This clearance can be used for allowing the fluid to pass from one or more inlet orifices in the filter head towards the filter media of the filter cartridge. The clearance can be for instance between 1 to 25 mm, more preferably between 1 and 15, or between 1 and 10, more preferably 2 and 5 mm.

In preferred embodiments, at least one, possibly a few or all of the radial extensions of the filter cartridge further comprise one or more through openings, which allow fluid to pass.

By providing one or more through openings, the inflow of fluid can be provided or optimized, e.g. the restriction of the filter assembly for a particular fluid/dimension etc. can be reduced.

According to preferred embodiments, the through openings have a round, obround, elliptical or elongated shape. Preferably the total cross-sectional surface of the through openings is larger than 10% or larger than 20% of the annular surface area defined by the radial extension arrangement, being the surface area defined between the central portion of the end cap and a concentrical circular outer perimeter on which the radial extension arrangement is abutting.

Preferably, for at least one, a plurality or all of the radial extensions, the total cross-sectional surface of the through openings of the respective radial extension is larger than 20, 30, 40, 50, 60, 70, 80, or larger than 90% of the surface area defined by the respective radial extension, being the surface area of the respective radial extension defined between the central portion of the end cap and its outer perimeter.

According to preferred embodiments, the width or diameter of the through openings is larger than 2, 3, 4, 5, 6 or 7 mm.

According to preferred embodiments, the length of the through openings is larger than 4, 5, 6, 7, 8, 9, 10, 20 mm.

In preferred embodiments, the radial extension arrangement comprises a third threaded portion on a cylindrical surface, the third threaded portion being compatible with the first threaded portion and configured to complement the first threaded portion.

In the context of bottom-mount embodiments, this provides the advantage of clean servicing as the filter element will be pulled down together with the filter housing main part/bowl during servicing, overcoming the resistance force exerted by e.g. an O-ring seal forming a seal between the head/housing end part and the (e.g. outlet of the) filter element.

Preferably, the third threaded portion and the first threaded portion form a complete, radially continuous thread upon receiving of the radial extension arrangement by the recess arrangement, i.e. at least over a part of the, preferably over the whole, axial extent of the first threaded portion.

Alternatively, the third threaded portion is complementing the first threaded portion only partially, but substantially, in the angular direction. E.g. the third threaded portion is angularly complementing the first threaded portion in such a way as to complement at least 50%, or at least 75%, or at least 90% or even 100% of the angular gaps defined by the recess arrangement.

In preferred embodiments, the first threaded portion and the third threaded portion have compatible threads. It will be appreciated by the skilled person that compatible threads are not necessarily identical threads. E.g. the pitch of the first and third threaded portions can be the same, but there can be difference in relative crest and root positions and thread angle. According to preferred embodiments, the third threaded portion comprises threads with allow for a limited amount of play with the threads of the second threaded portion, on order to allow for small misalignment due to e.g. warping of the plastic material of the end cap or e.g. the presence of a limited amount of dirt.

In some example embodiments, the starting point of the complete thread is located on the radial extension arrangement. This provides the advantage that the housing main part cannot be screwed on the filter housing end part without the presence of an appropriate filter element. According to some embodiments, the starting point of the complete thread is positioned near or at the side of one to the protrusions of the protrusion arrangement. In such embodiments, it is preferred that the filter element and filter housing main part can be oriented with respect to one another in a single predetermined position only, when the filter cartridge is inserted in the filter housing main part.

In some examples, the starting point of the thread is located on the housing main part, to assure that during disassembly, the main part does not dropping down separate from the cartridge.

In preferred embodiments, a cylindrical surface of the radial extension arrangement comprises a deformable, preferably threadable material, the threadable material being softer than the material of which the second threaded portion is composed, and the threadable material having a radial thickness greater than the thread depth of the threaded portion. The deformable material is preferably such that it adapts partially or completely to the thread of the second thread configuration when the first and second threads are screwed onto one another. The threadable material is preferably such that it is easily provided with a permanent thread when the first and second threads are screwed onto one another, by interaction with the second thread.

This also provides the advantage of clean servicing as the filter element will be pulled down together with the bowl/housing main part during servicing, overcoming the resistance force exerted by e.g. an O-ring seal forming a seal between the head/housing end part and the (e.g. outlet of the) filter element.

In preferred embodiments, the filter housing end part comprises a spring loaded sliding pin, the sliding pin being arranged to jut into one of the recesses upon the screwing on of the filter housing main part on the filter housing end part in the absence of the filter cartridge, thereby disabling the complete screwing on of the filter housing main part on the filter housing end part in the absence of the filter cartridge.

In preferred embodiments, the filter housing end part comprises a flat spring, the flat spring being arranged to jut into one of the recesses upon the screwing on of the filter housing main part on the filter housing end part in the absence of the filter cartridge, thereby disabling the complete screwing on of the filter housing main part on the filter housing end part in the absence of the filter cartridge.

It will be appreciated that in preferred embodiments of the present disclosure, an external thread of a filter housing main part is completed by an arrangement of radial extensions of the filter end cap, the outer surface of the radial extension arrangement comprising a thread, or comprising a threadable or deformable material which can be provided with a thread when the combination of filter housing main part and filter cartridge is connected by screwing with a filter housing end part.

The combination of filter cartridge and filter housing main part (e.g. bowl) can for instance be screwed into the filter housing end part.

In a second aspect of the present disclosure, a filter cartridge is disclosed for use in a filter housing main part, preferably for use in a filter assembly of the first aspect, the filter cartridge having a longitudinal axis, comprising filter media surrounding an open filter interior; the filter media having first and second, opposite, ends; a first end cap at one end of the filter media; wherein the first end cap comprises a central portion and a radial extension arrangement comprising one or more radial extensions extending radially away from the central portion, the radial extension arrangement radially abutting on a cylindrical surface; and the radial extension arrangement comprises a third threaded portion on the cylindrical surface.

In preferred embodiments, the third threaded portion comprises the starting point of a thread.

In a third aspect of the present disclosure, a filter cartridge is disclosed for use in a filter housing main part, preferably for use in a filter assembly of the first aspect, the filter cartridge having a longitudinal axis, comprising: filter media surrounding an open filter interior; the filter media having first and second, opposite, ends; a first end cap at one end of the filter media; wherein the first end cap comprises a central portion and a radial extension arrangement comprising one or more radial extensions extending radially away from the central portion, the radial extension arrangement radially abutting on an cylindrical surface; and the cylindrical surface of the radial extension arrangement comprises a threadable material.

Preferably, referring to the filter housing end part of the assembly, the threadable material is softer than the material of which the second threaded portion is composed, and the threadable material has a radial thickness greater than the thread depth of the second threaded portion.

Preferably, the material of which the second threaded portion comprises for instance aluminum or a technical durable plastic material or metal.

Preferably, the threadable material comprises a rubber, silicone, thermoplastic elastomer or soft plastic material (like PE/PP).

Preferably, the threadable material is different from the main material of the first end cap.

The main material of the first end cap can be for instance a hard plastic or a metal (eg Aluminum or Zamac).

In preferred embodiments of the bottom-mount type, the filter cartridge of any of the aspects of the present disclosure comprises a primary aperture through the first end cap, the primary aperture being in communication with the open filter interior and not overlapping with the filter media in axial projection.

The primary aperture in the first end cap can be arranged at a central position, e.g. centrally in be central portion of the first end cap. The primary aperture may be defined by an outlet or inlet duct. The outlet or inlet duct may comprise a radially or axially oriented seal along its outer or inner surface, e.g. of the O-ring type. The outlet or inlet duct may extend axially away from the main portion of the first end cap, in a direction away from the filter media.

In preferred embodiments, the filter cartridge of any of the aspects of the present disclosure comprises a radial extension arrangement having a single or only 1 radial extension.

Preferably, the single radial extension has an angular extent around said second longitudinal axis which is larger than 180°, more preferably larger than 190°, 200°, 210°, 220°, 230°, 240°, 250°, 260°, more preferably larger than 270°, 280°, 290°, 300°, 310°, 320°, 330°, 340°, 350°, 355°, and smaller than 360°.

In preferred embodiments, the filter cartridge of any of the aspects of the present disclosure comprises a radial extension arrangement comprises at least 2 radial extensions. These at least 2 radial extensions can be arranged at regular or irregular angular intervals.

In preferred embodiments, the radial extension arrangement comprises an axial extension arrangement at its free end. The axial extension arrangement comprises at least one axial extension, at least some or all of the axial extensions extending axially from the distal ends of radial extensions. The presence axial extension arrangement may be beneficial to increase the surface of the third threaded portion while reduced amount of material is needed for the end cap.

In preferred embodiments of filter cartridges of any of the aspects of the present disclosure, the radial extension arrangement comprises one or more secondary apertures or through openings through the first end cap, the secondary apertures falling outside the filter media and not overlapping with the filter media in axial projection.

In preferred embodiments of filter cartridges of any of the aspects of the present disclosure, at least one, preferably both, side surface(s) of at least one, a plurality or all of the radial extensions is tapered in axial direction. The side surfaces can for instance comprise a tapering of about 1 to 60 degrees with respect to the axial direction. The taper can be asymmetric or symmetric.

Preferably the tapered side surfaces are asymmetric. On a first side or a radial extension, the taper is preferably larger than 45° or even larger than 60°. On the other, second side, the taper can be preferably between 0-30°, or between 0-20°, or between 0-10°. This provides the advantage that in embodiments where a blocking pin is provided in the filter head, as described herein, the blocking pin would effectively block the rotation of the filter bowl on the filter head when the filter element is not present, when the blocking pin interacts with the second side.

The presence of tapered side surfaces has shown to improve initial alignment between housing main part and cartridge.

In preferred embodiments of filter cartridges of any of the aspects of the present disclosure, the first end cap comprises three or more axially extending radial alignment tabs or alignment features for alignment with a cylindrical inner wall of a corresponding filter housing main part; the alignment tabs projecting away from the first end cap and having a tapered height dimension along the axial direction.

The presence of alignment tabs helps with centering the end cap and thus cartridge in the filter housing main part/bowl, thereby also defining a predetermined fluid flow.

In preferred embodiments, the radial extension arrangement can comprise two separate parts, which can for instance be arranged in a slidable manner with respect to each other. For instance, a first part can comprise the annular portion. A second part can comprise a further ring or similar structure that is arranged around the annular portion, in an at least axially slidable manner (optionally also radially slidable manner) with respect to the first part/annular portion. The second part preferably comprises the features of the radial extension arrangement which are extending outwardly from the further ring or similar structure.

According to preferred embodiments, the second part can slide to a limited extent with respect to the first part, along the axial direction of the filter element, e.g. between a first extreme axial position and a second extreme axial position. The limited extent can be for instance between 1 and 20 mm or between 1 and 10 mm or between 1 and 5 mm.

In preferred embodiments, the first end cap, e.g. the annular portion, comprises limiting features adapted for limiting the axial movement of the ring or similar structure.

In preferred embodiment of the present disclosure, for all aspects, the filter housing main part comprises a filter bowl and the filter housing end part comprises a filter head. Such embodiments are of the bottom-mount type.

In other preferred embodiments of the present disclosure, for all aspects, the filter housing main part can comprise a fluid container, for instance provided with suitable fluid inlets and outlets. The fluid container may be a fluid tank. The filter housing end part can comprise a filter housing cover.

Such embodiments are of the top-mount type.

In another aspect, an in-tank filter assembly is provided. The assembly comprises a filter cartridge, a cover, and an interface; the cover being adapted for receiving the filter cartridge and the interface by screwing; wherein: the cover comprises a main opening, said main opening being defined by a first surrounding wall comprising a first threaded portion along the first surrounding wall; the interface comprises an interface opening defined by a second surrounding wall sized for fitting within the main opening; the second surrounding wall having one or more interface threaded radial extensions adapted to engage the first threaded portion; the one or more interface threaded radial extensions being interrupted by one or more recesses therebetween; and the filter cartridge comprises a filtration media and a first end cap connected to said filtration media, said first end cap comprising a central portion and one or more cartridge radial extensions extending radially away from said central portion; said cartridge radial extensions being adapted to threadably engage the first threaded portion of the cover; said cartridge radial extensions being interrupted by one or more recesses therebetween; and said cartridge being removably oriented in the interface opening.

In examples, the cover includes a spigot, and the central portion of the first end cap engages the spigot.

In example embodiments, the first threaded portion along the first surrounding wall is radially inwardly directed.

In example embodiments, the interface threaded radial extensions and the cartridge radial extensions are radially outwardly directed.

In example embodiments, the interface threaded radial extensions and the cartridge radial extensions radially abut on a common cylindrical surface.

In example embodiments, the cover includes an airflow passage allowing air to flow through the spigot and through a gap between the cover and the interface.

In example embodiments, the cover includes a first cover piece and a second cover piece in engagement with each other.

Many examples further include a splash deflector at an end of the filter cartridge opposite of the first end cap.

In one or more example embodiments, the first threaded portion extends 360°; the interface threaded radial extensions extend less than 360°; and the cartridge radial extensions extend less than 360°.

In some implementations, the first threaded portion extends 360°; the interface threaded radial extensions extend less than 270°; and the cartridge radial extensions extend more than 90°.

In example embodiments, the first threaded portion extends 360°; the interface threaded radial extensions extend 45-120°; and the cartridge radial extensions extend 180-300°.

In a preferred embodiment, the first threaded portion extends 360°; the interface threaded radial extensions extend 90°; and the cartridge radial extensions extend 270°.

In example embodiments, the filtration media comprises pleated media.

Features and advantages disclosed for one of the above aspects of the present disclosure are hereby also implicitly disclosed for the other aspects, mutatis mutandis, as the skilled person will recognize. Especially, aspects described for the filter element in the context of the filter assembly aspect, as also applicable and considered disclosed for the filter element or cartridge, and vice versa.

BRIEF DESCRIPTION OF THE DRAWINGS

The disclosure will be further elucidated by the following description and the appended figures.

FIG. 10 is a schematic illustration of a screw thread, showing state of the art definitions of screw thread parameters.

FIG. 11A schematically illustrates an embodiments of the recess arrangement according to the present disclosure.

FIG. 11B schematically illustrates an embodiment of the recess arrangement according to the present disclosure.

FIG. 11C schematically illustrates an embodiment of the recess arrangement according to the present disclosure.

FIG. 11D schematically illustrates an embodiment of the recess arrangement according to the present disclosure.

FIG. 11E schematically illustrates an embodiment of the recess arrangement according to the present disclosure.

FIG. 11F schematically illustrates an embodiment of the recess arrangement according to the present disclosure.

FIG. 12A schematically illustrates an embodiments of the interaction between a (part of) the recess arrangement and a (part of) the extension arrangement according to the present disclosure.

FIG. 12B schematically illustrates an embodiments of the interaction between a (part of) the recess arrangement and a (part of) the extension arrangement according to the present disclosure.

FIG. 12C schematically illustrates an embodiments of the interaction between a (part of) the recess arrangement and a (part of) the extension arrangement according to the present disclosure.

FIG. 12D schematically illustrates an embodiments of the interaction between a (part of) the recess arrangement and a (part of) the extension arrangement according to the present disclosure.

FIG. 16 illustrates preferred embodiments of a filter housing main part and a filter cartridge.

FIG. 17A schematically illustrates an embodiment of a filter cartridge with a moveable radial extension arrangement.

FIG. 17B is a cross-section of the filter cartridge of FIG. 17A.

DETAILED DESCRIPTION OF PREFERRED EMBODIMENTS

Figure 1:
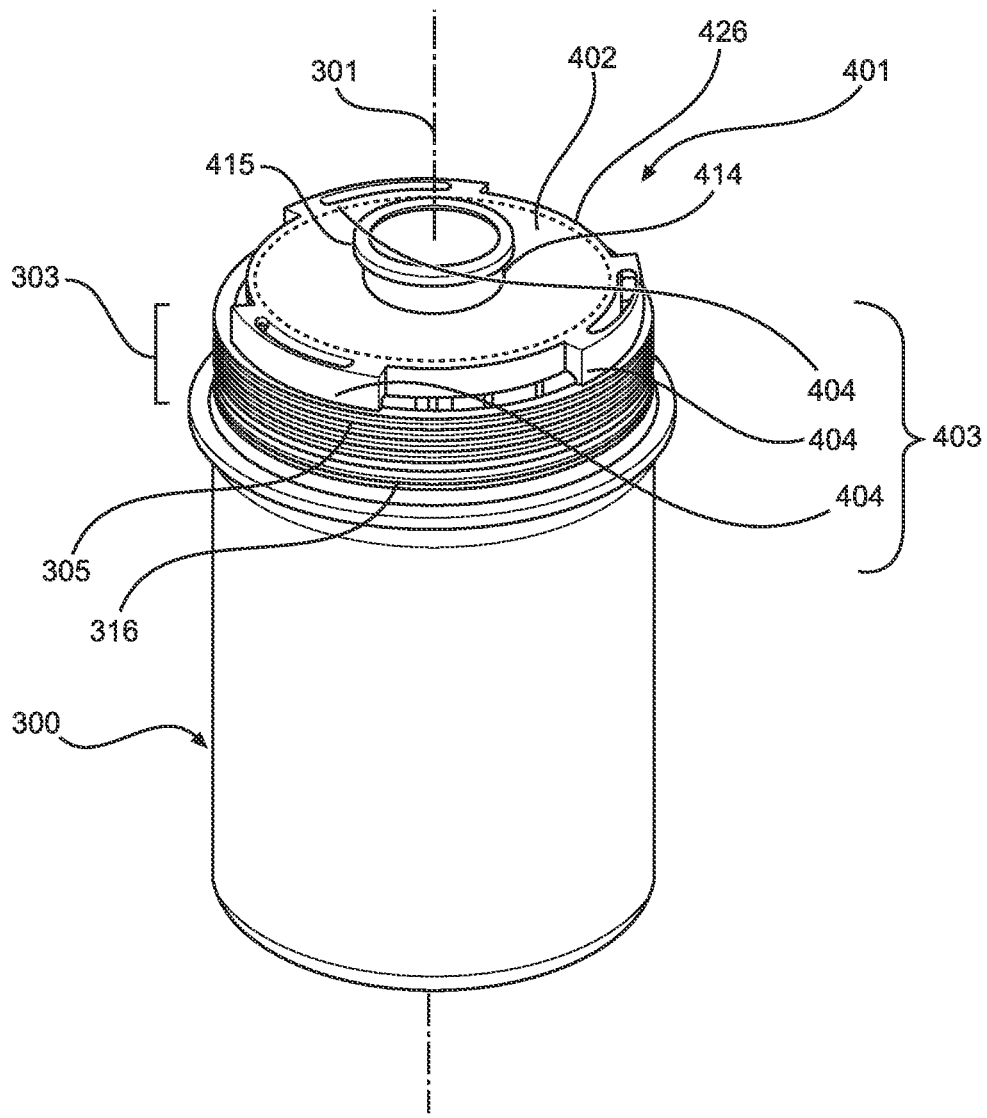
FIG. 1 shows illustrates a partial filter assembly, comprising a filter cartridge and a filter bowl, according to a first embodiment of the present disclosure.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order.

The various embodiments, although referred to as "preferred" are to be construed as examples in which the disclosure may be implemented rather than as limiting the scope of the disclosure.

FIG. 1 gives a schematic illustration of an embodiment of a filter assembly according to the present disclosure. Only a partial assembly comprising the filter bowl 300 and the filter cartridge 400 is shown in FIG. 1.

Filter Bowl

Figure 2:
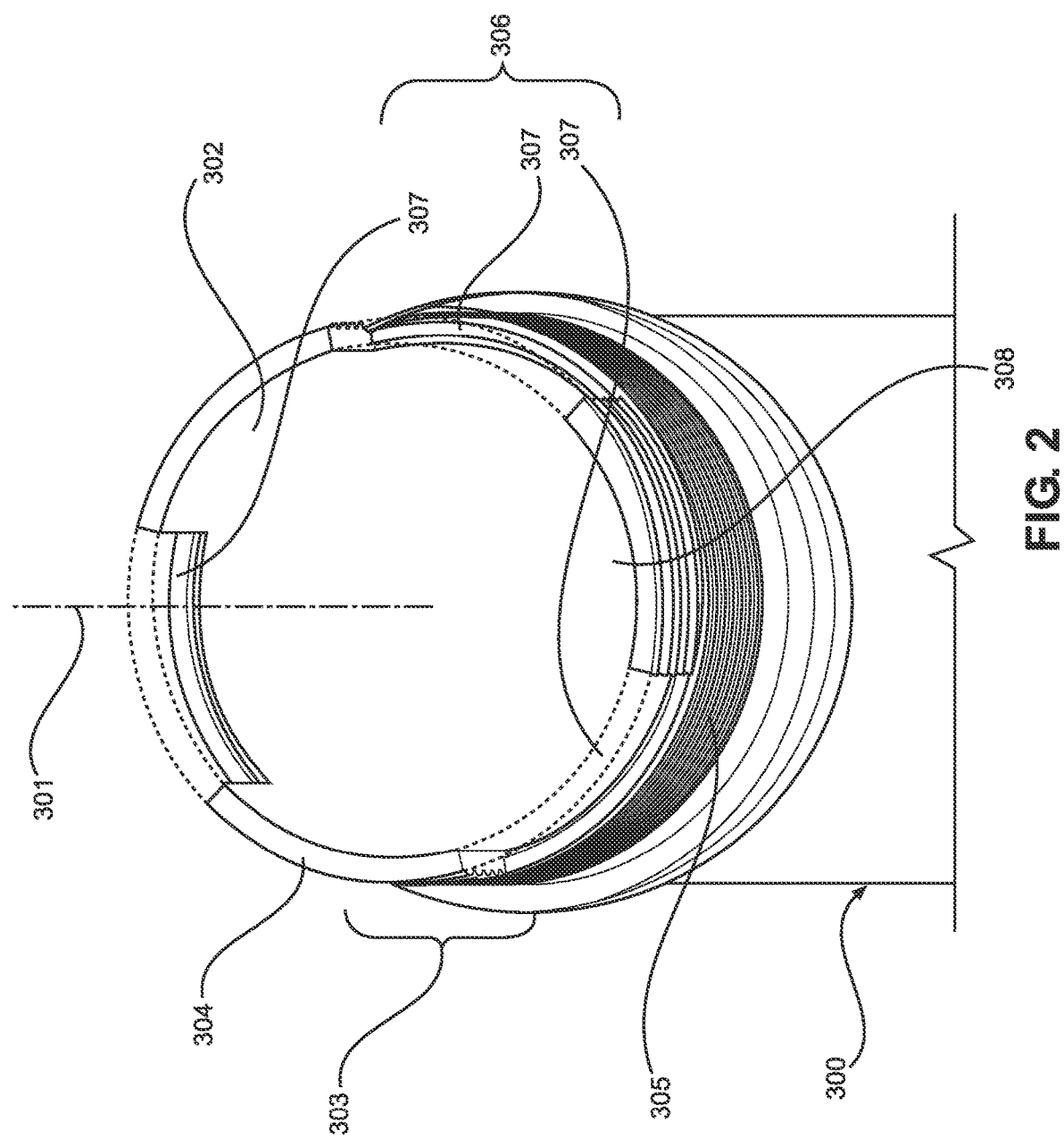
FIG. 2 illustrates the filter bowl of FIG. 1.

FIG. 2 offers a closer view of the filter bowl 300 of FIG. 1. In this embodiment, the filter bowl 300 comprises a longitudinal enclosure. It comprises a longitudinal axis 301 and a main opening 302. This opening 302 is defined by a first end portion 303. Preferably, the filter bowl is made out of a metal, more preferably out of Aluminum, or out of a suitable plastic material. Preferably, the opening 302 is circular. Preferably, the opening 302 lies in a plane perpendicular to the longitudinal axis 301 and this axis 301 passes through the center of the opening 302. Preferably, the longitudinal axis 301 is a rotational symmetry axis of the filter bowl 300.

The first end portion 303 comprises an upper rim 304 and a first threaded portion 305 arranged on the outer radial surface of the end portion 303, below the upper rim 304. The first end portion 303 preferably comprises a radial seal along its outer surface, e.g. of the O-ring type, arranged below the first threaded portion 305. The first end portion 303 also comprises a recess arrangement 306 of the battlement type, comprising one or more axially extending recesses 307. These recesses 307 at least partially, or completely, interrupt the first threaded portion 305. The longitudinal axis 301 is preferably but not necessarily a rotational symmetry axis of the recess arrangement 306.

The first threaded portion 305 is arranged on the outer radial surface of the first end portion 303 and is of the male type. The first threaded portion 305 has a thread pitch different from 0 and a helix angle different from 0, wherein the tread pitch indicates the axial distance between two windings of the same thread and the helix angle indicates the angle of the thread winding with respect to the axis of the threaded portion. (Thread definitions are schematically illustrated in FIG. 10) Preferably, its pitch is between 0.5 and 4 mm. More preferably, it is between 1 and 3 mm. Preferably, the first threaded portion 305 comprises a single thread. Preferably, the first threaded portion 305 comprises two or more windings of this single thread. This thread is continuous over the first threaded portion 305. Where the first threaded portion 305 is interrupted by the recess arrangement 306, the thread sections on the non-interrupted sections 308 of the first threaded portion 305 are parts of a continuous thread wrapped around the first end portion 303. Hence, the first threaded portion 305 is of the type used in screw type fittings and not of the type used in bayonet fittings.

FIG. 11 Schematically illustrates various embodiments of the recess arrangement 306 present in the first end portion 303 of the filter bowl 300. For simplicity of the illustration, the recess arrangement 306 has been projected on a straight line in this representation.

Preferably, the bottom 309 of the recesses 307 lies in a plane parallel to the plane of the main opening 302 and perpendicular to the longitudinal axis 301, such that the recess depth 310—the distance between the recess bottom 309 and the upper rim 304—is constant for a single recess 307.

In a first embodiment, shown in FIG. 11 (a), this recess arrangement 306 comprises two or more recesses 307. Every recess 307 of the recess arrangement 306 has the same recess depth 310. Moreover, all of the recesses 307 of the recess arrangement 306 are arranged at regular recess angular intervals 311, wherein a recess angular interval 311 is defined as the angle between the radial midlines of two adjacent recesses 307. The top opening angle 313 of every recess 307 of the recess arrangement 306 is identical. The bottom opening angle 314 of every recess 307 of the recess arrangement 306 is identical. It is noted that if the radial extension arrangement comprises a third thread on its outer surface, this embodiment is not preferable as it may remain unclear to the user how to position the element correctly, without additional marking or alignment features.

Preferably, at least one side 312 of at least one recess 307 of the recess arrangement 306 is tapered in axial direction, such that the top opening angle 313 of the at least one recess 307 is greater than the bottom opening angle 314 of the at least one recess 307. FIG. 11 (b) displays a second embodiment of a recess arrangement 306, wherein the top opening angles 313 of the recesses 307 are greater than their bottom opening angles 314. Preferably, the first taper angle 315 is between 5 and 45°, more preferably between 10 and 30°. In preferred embodiments, both sides 312 of every recess 307 of a recess arrangement 306 are tapered. However, the taper for a single recess 307 can be symmetric, where the first taper angle 315 equals the second taper angle 317, or asymmetric, where the first and second taper angle are different. For example in some embodiments (FIGS. 26-28 and 31), the second taper angle 317 is 45-85°, e.g. about 70°. In those embodiments (FIGS. 26-28 and 31), the first taper angle 315 can be 80-100°, e.g. about 90°.

Figure 14:
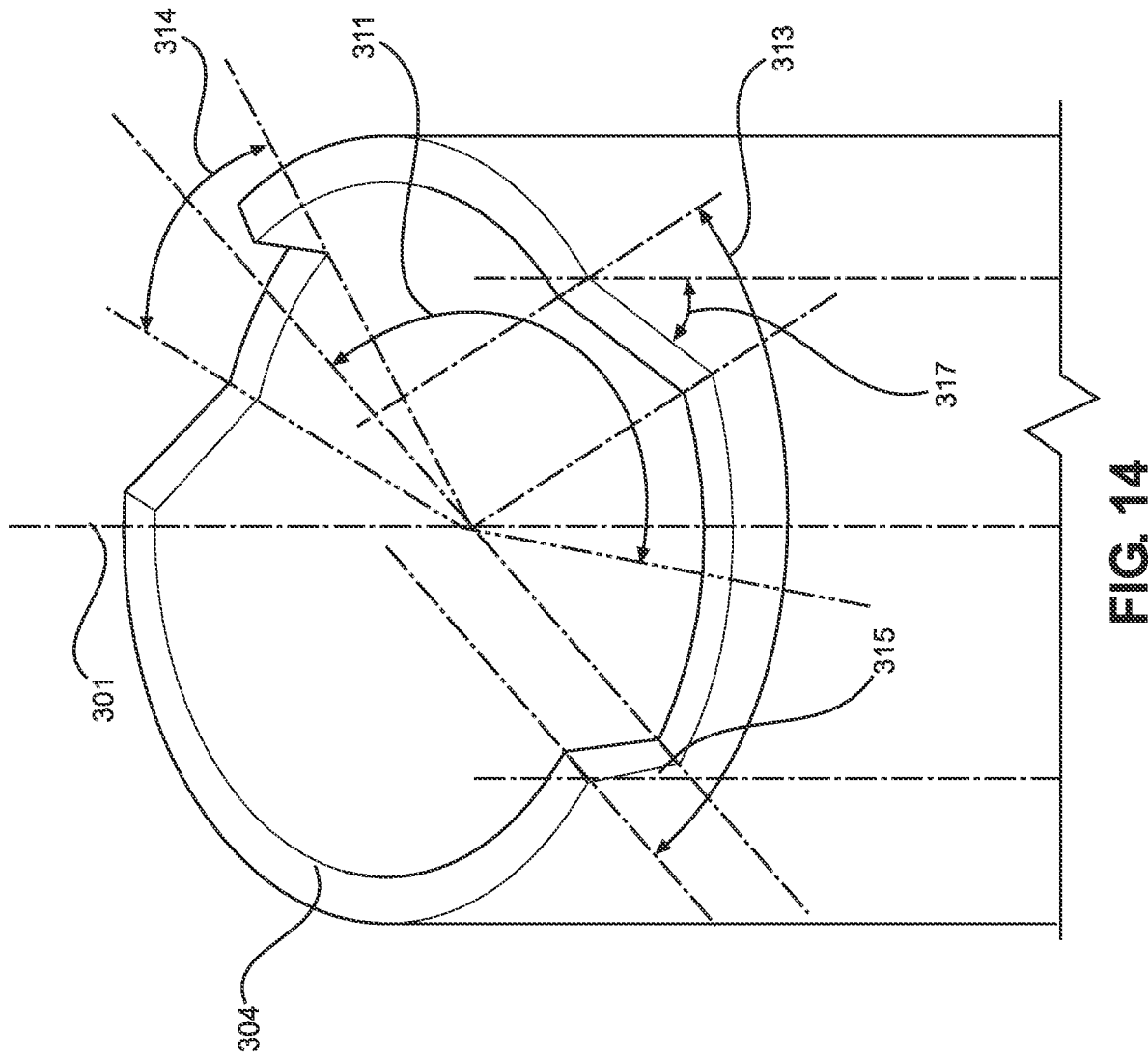
FIG. 14 schematically illustrates the definitions of the appropriate angles in the recess arrangement of the filter housing main part.

Also, the taper profile can be identical for every recess 307 of a recess arrangement 306, as illustrated in FIG. 11 (b), or the taper profile can be different for one or more recesses 307 of a recess arrangement 306. A perspective view of a recess arrangement is schematically illustrated in FIG. 14. On a first side of a recess 307, the taper 315 is preferably larger than 45° or even larger than 60°. On the other, second side, the taper 317 can be preferably between 0-30°, or between 0-20°, or between 0-10°.

Returning to FIG. 11, in some embodiments, this recess arrangement 306 comprises one recess 307, as shown in FIG. 11 (c).

In some embodiments, some or all of the recesses 307 of the recess arrangement 306 might be arranged at irregular recess angular intervals 311, as shown in FIG. 11 (d).

In some embodiments, the recess depth 310 might vary between different recesses 307 of the same recess arrangement 306, as illustrated in FIG. 11 (e).

In some embodiments, the top opening angle 313 might be different for one or more of the recesses 307 of a recess arrangement 306, as illustrated in FIG. 11 (f).

The above mentioned variations in recess depth, recess angular spacing, recess tapering and recess top opening angle can be used, each on its own or in any arbitrary combination, to distinguish between filter bowl/housing main parts 300 intended for different uses, different markets or different products, to ascertain that the right filter element, especially the right filter media is being used for a certain filtration system.

Filter Cartridge

Figure 3:
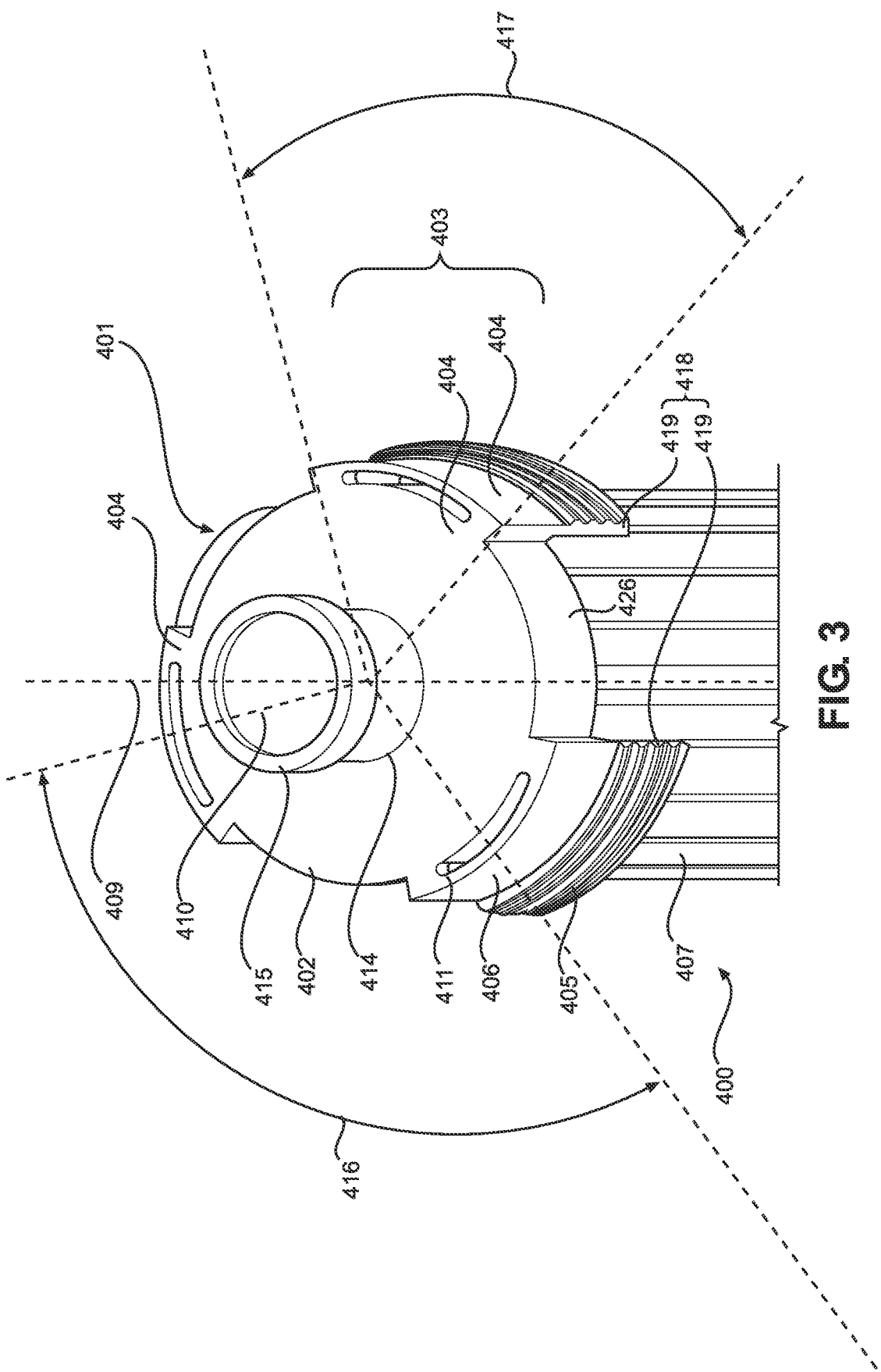
FIG. 3 illustrates the filter cartridge of FIG. 1.

FIG. 3 offers a closer view of a filter cartridge 400 as was introduced in FIG. 1. In this embodiment, the filter cartridge 400 comprises a second longitudinal axis 409 and filter media 407. The filter media 407 has first and second opposite ends and surrounds an open filter interior 408. Preferably, the planes of the first and second opposite ends are parallel to each other and perpendicular to the second longitudinal axis 409. Preferably, the open filter interior 408, delimited by the filter media 407 and its first and second opposite end planes, is cylindrical and has the second longitudinal axis 409 as symmetry axis. Preferably, the filter media 407 is suitable for the filtration of fluids, e.g. gases or, more preferably liquids.

At the first end of the filter media 407, the filter cartridge 400 comprises a first endcap 401, comprising a central portion 402 with a primary aperture 410. Preferably, the first endcap 401 is made out of plastic. Alternatively, the first endcap 401 can be made out of a metal, as e.g. Aluminum. The filter cartridge further comprises a second end cap arranged at a second end of the filter media. The first and second end caps can for instance be bound to the first and second ends of the filter media by potting, gluing or direct bonding. The primary aperture 410 in the first end cap 401 may be located in the center of the central portion 402. The primary aperture 410 provides fluid communication with the filter interior 408. The primary aperture 410 may be defined by an outlet (or inlet, depending on the configuration of the filtration system) duct 414. The outlet duct 414 may comprise a radial seal 415 along its outer or inner surface, e.g. of the O-ring type. The outlet duct 414 may extend axially away from the central portion 402 of the first end cap 401, in a direction away from the filter media 407. Preferably, the primary aperture 410 does not overlap with the filter media 407 in axial projection. Preferably, the central portion 402 of the first end cap 401 corresponds to the axial projection of the filtration media 407 onto the first end cap 401 along the second longitudinal axis 409. Preferably, the central portion 402 comprises the portion of the first end cap 401 that abuts the filtration media 407. Preferably, the central portion 402 comprises a circular outer perimeter and has the second longitudinal axis 409 as symmetry axis.

The first endcap 401 comprises a radial extension arrangement 403 comprising one or more radial extensions 404 extending radially away from the central portion 402. The radial extension arrangement 403 preferably lays in the same plane as the first endcap 401. Preferably, this plane is perpendicular to the second longitudinal axis 409. Preferably, the outer radial surfaces 406 of the radial extensions 404 are parts of the radial surface of a cylinder with the second longitudinal axis 409 as rotation axis. Preferably, all the radial extensions 404 of a radial extension arrangement 403 have the same radius such that the outer radial surfaces 406 of the radial extensions 404 are all part of the radial surface of the same cylinder with the second longitudinal axis 409 as rotation axis.

Preferably, the radial extension arrangement 403 comprises an annular portion 426 directly surrounding the central portion 402. The annular portion 426 then preferably constitutes the inner portion of the radial extension arrangement 403. Depending on particular architecture of the filter cartridge 400, the annular portion 426 can be for instance a projecting rim of the end cap 401, which is often used to confine the filtration media 407 radially and/or to confine the potting or glue material used to bond the filtration media 407 to the first end cap 401. Alternatively, for instance in case a direct bonding process is used, whereby the filtration media 407 is attached to the first end cap 401 without glue or potting, the annular portion 426 may comprise a portion of the end cap 401 which is not showing any separate radial extension features.

In the embodiment shown in FIG. 3, the radial extension arrangement 403 comprises three radial extensions 404 which are arranged at regular extension angular intervals 416, wherein an extension angular interval 416 is defined as the opening angle between the radial midlines of two adjacent radial extensions 404. Also, the extension opening angles 417 are identical for all extensions. The radial extension arrangement shown thus displays threefold rotational symmetry around the second longitudinal axis 409. However, this is not necessary for the disclosure, as additional marking or alignment features may be needed to allow correct positioning. In other embodiments, the radial extension arrangement 403 may comprise only one radial extension 404, or an arbitrary number of two or more radial extensions 404. In other embodiments, the radial extensions 404 of a radial extension arrangement 403 might be arranged at irregular extension angular intervals 416. In other embodiments, the extension opening angles 417 might be different for some or all of the radial extensions 404 of the radial extension arrangement 403.

The above mentioned variations in the number of radial extensions, extension angular spacing and extension opening angle can be used, each on its own or in any arbitrary combination, to distinguish between filter cartridges 400 intended for different uses, different markets or different products, to ascertain that the right filter element, especially the right filter media is being used for a certain filtration system.

Figure 4:
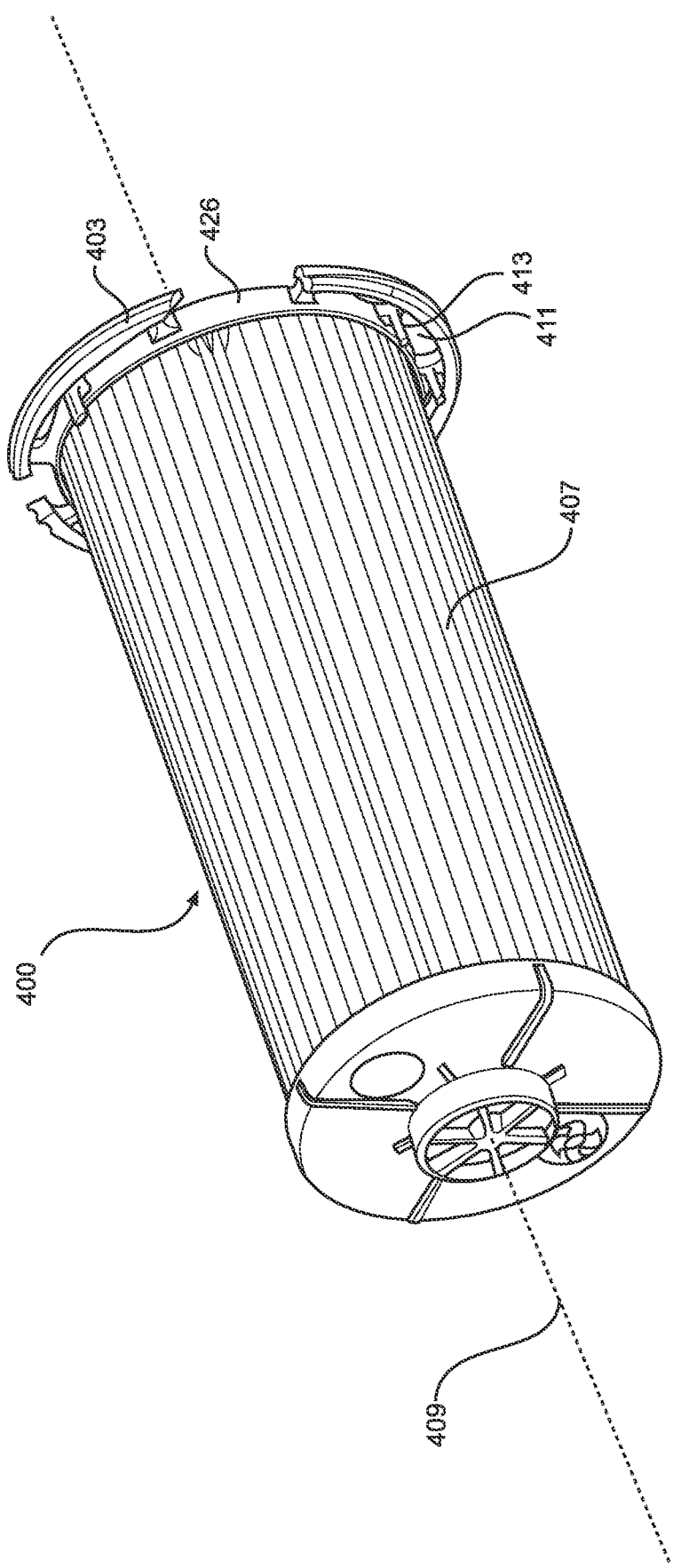
FIG. 4 depicts an embodiment of a filter cartridge according to a second embodiment of the present disclosure.
Figure 5:
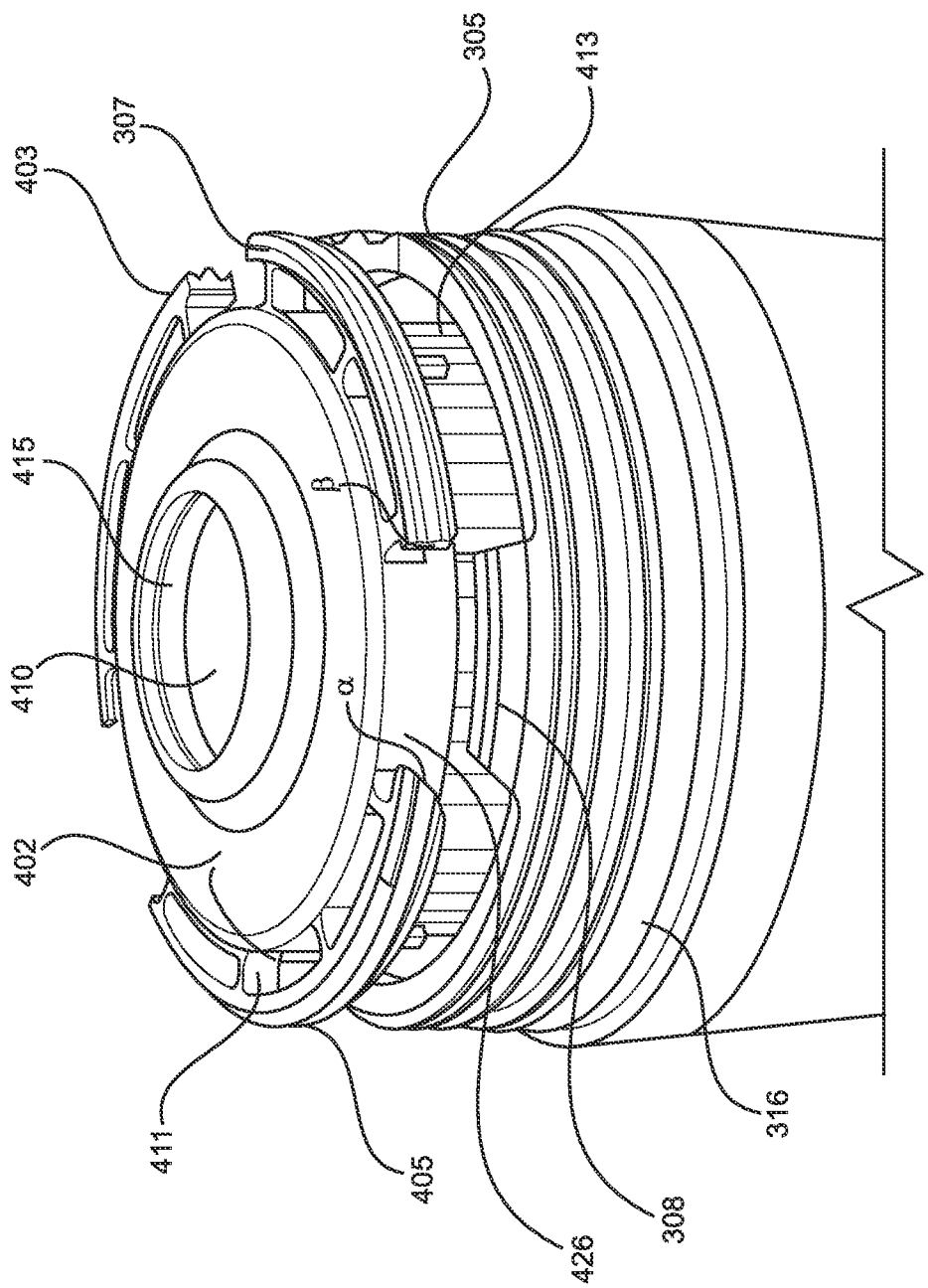
FIG. 5 illustrates the insertion of the filter cartridge of FIG. 4 into a filter bowl.

In the embodiment of FIG. 3, the radial extensions 404 of the radial extension arrangement 403 have the same thickness in axial direction as the first endcap 401 along the radial surface where the extensions 404 connect to the endcap 401. However, the extensions 404 may be thinner—as shown in FIG. 4 and FIG. 5—or thicker than the endcap 401 along this radial surface. While the embodiments displayed in FIG. 3, FIG. 4 and FIG. 5 all show extensions 404 of identical or about identical thickness within one extension arrangement 403, one or more of the extensions 404 may also differ in thickness within the same extension arrangement 403.

In the embodiment shown in FIG. 3, the radial extension arrangement 403 comprises an axial extension arrangement 418 at its free end. This axial extension arrangement comprises at least one axial extension 419. At least some or all of the axial extensions 419 extend axially from the free ends of the radial extensions 404. This extension may happen towards—as illustrated in FIG. 3—or away from the filter media. The radial extension arrangement may also be absent, as shown in the embodiments of FIG. 4 and FIG. 5.

In preferred embodiments, at least one side of at least one extension 404 of the radial extension arrangement 403 is tapered at angle α in axial direction, such that the top opening angle of the at least one extension is greater than the bottom opening angle of the at least one extension. Preferably, the taper angle is between 5 and 45°, more preferably between 10 and 30°. In preferred embodiments, both sides of every extension 404 of a radial extension arrangement 403 are tapered (angle α and angle β, FIG. 5). However, the taper for a single extension 404 can be symmetric, where both sides are tapered with the same taper angle, or asymmetric, where both sides are tapered with a different angle. Also, the taper profile can be identical for every extension 404 of a radial extension arrangement 403, or the taper profile can be different for one or more extensions 404 of an extension arrangement 403.

The above mentioned variations in extension thickness, axial extensions and extension tapering can be used, each on its own or in any arbitrary combination, and in any arbitrary combination with variations the number of radial extensions, extension angular spacing or extension opening angle to distinguish between filter cartridges 400 intended for different uses, different markets or different products.

The embodiments of FIG. 3 and FIG. 4 illustrate the presence of axial openings 411 through the first endcap 401. These openings extend completely through the first endcap 401 in axial direction and allow fluid to pass from the volume above the first endcap 401 to the volume below the first endcap 401. These openings 411 do not overlap with the filter media 407 in axial projection. Preferably, these openings 411 can be located in the radial extensions 404 of the radial extension arrangement 403. They may have an elongated shape in order to balance optimal cross-sectional surface and corresponding flow-through, and available extent of the radial extension. Preferably, these openings 411 are sufficiently large and appropriately distributed over the first end cap 401 to allow for the fluid intended to be filtered by the filter cartridge 400 to pass at the intended/predetermined flow rate under the intended pressure drop.

The embodiment of FIG. 4 displays the presence of alignment tabs 413 on the underside of the radial extension arrangement 403, extending axially in the direction of the second end of the filter media 407. At least three alignment tabs 413 are present. In some embodiments, more alignment tabs 413 may be present. The at least three alignment tabs 413 are located on a circle with a diameter inferior to the outer diameter of the radial extension arrangement 403. The at least three alignment tabs 413 are located on a circle with a diameter superior to the maximal outer diameter of the filter media 407. Preferably, the circle on which the alignment tabs 413 are located has the second longitudinal axis 409 as rotation axis. Preferably, the alignment tabs are between 5 and 40 mm long, more preferably between 10 and 20 mm long. Preferably, the alignment tabs are arranged at regular angular intervals. The alignment tabs help with the initial centering of the filter cartridge in the bowl/housing main part.

The embodiment of FIG. 3 comprises a third threaded portion 405 of the male type on the outer radial surface 406 of the radial extension arrangement 403. The third threaded portion 405 has a pitch and helix angle different from 0. Preferably, its pitch is between 0.5 and 4 mm. More preferably, it is between 1 and 3 mm. Preferably, the third threaded portion 405 comprises a single thread. Preferably, the third threaded portion 405 comprises two or more windings of this single thread. This thread is continuous over the radial extension arrangement 403. Where the radial extension arrangement 403 comprises multiple separate radial extensions 404, the thread of the third threaded portions 405 on the radial extensions 404 is part of a continuous thread wrapping around the entire radial extension arrangement 403. Hence, the third threaded portion 405 is of the type used in screw type fittings and not of the type used in bayonet fittings. The presence of the third threaded portion 405 on the radial extension arrangement 403 is however not mandatory for the disclosure.

In some embodiments of a filter cartridge 400 according to the present disclosure, part of the radial extension arrangement 403 can move up and down in axial direction with respect to the central portion 402, or with respect to the annular portion 426 of the first endcap 401. FIG. 17a shows a perspective view of such an embodiment, while FIG. 17b shows a cross-section. For instance, the up and down movement in axial direction can be achieved by the sliding of a ring structure 427 of the radial extension arrangement 403 over the annular portion 426 of the end cap. Preferably, the axial movement is possible over a limited distance. More preferably, the axial movement is limited to a range of 1-20 mm. Preferably, the axial movement does not allow the disengagement of the ring structure 427 of the radial extension arrangement 403 from the annular portion 426. To limit the range of axial movement and prevent disengagement of the ring structure 427 from the annular portion 426, the end cap 401 or annular portion 426 can be equipped with upper and lower abutment surfaces 425.

In some embodiments, there is a leading edge for each thread start in the filter cartridge 400, to compensate for any small misalignment between cartridge 400 and housing main part 300 and to avoid any damage to the thread configuration of the cartridge 400 (e.g., to avoid sharp edges).

In some embodiments, one or more radial extensions 404 have an angular extent (i.e., circumferential length) around longitudinal axis 409 which totals at least 20° and less than 340°. That is, there can be only a single radial extension 404, and it would have an angular extent of at least 20° and less than 340°. Or, there can be two radial extensions 404, and together, they total in angular extent of at least 20° (such as, e.g., one at 15° and one at 5°) and less than 340°. Or, there can be three radial extensions 404, which together, they total in angular extent of at least 20° (such as, e.g., one at 10° and two at 5°) and less than 340°. In some examples, one or more radial extensions 404 comprise an angular extent around the longitudinal axis 409 which totals at least 60°; at least 120°; at least 180°; and at least 270°. In some examples, the one or more radial extensions 404 comprise an angular extent around the longitudinal axis 409 which totals less than 300°.

Filter Assembly: Housing Main Part-Cartridge Interaction

FIG. 1 gives a schematic illustration of an embodiment of a filter assembly according to the present disclosure. Only a partial assembly comprising the filter bowl/housing main part 300 and the filter cartridge 400, but lacking the filter head/housing end part 200, is shown in FIG. 1. The filter bowl 300 shown in the assembly is identical to the bowl described in the context of FIG. 2, while the filter cartridge 400 shown in the assembly is identical to the cartridge described in the context of FIG. 3. Hence for details about the individual features of either bowl 300 or cartridge 400, the reader is referred to the appropriate passages in this document.

According to the present disclosure, the radial extension arrangement 403 of the filter cartridge 400 is adapted for being received by the recess arrangement 306 of the filter bowl 300. Preferably, the first longitudinal axis 301 and the second longitudinal axis 409 coincide when the radial extension arrangement 403 of the filter cartridge 400 is received by the recess arrangement 306 of the filter bowl 300.

In the embodiment of FIG. 1, the number of radial extensions 404 equals the number of recesses 307. This is not necessarily the case in other embodiments of the disclosure. Moreover, the extension angular intervals 416 are equal to the recess angular intervals 311 and the extensions 404 fill the recesses 307 completely in both angular, radial and axial direction. Also this is not necessary for all embodiments of the present disclosure. FIG. 12 illustrates alternative ways in which a recess 307 can receive one or more radial extensions 404.

In FIG. 12 (a), the thickness of the extension 404 at its distal end, optionally including the recesses' axial extension 419, is equal to the recess depth 310 of the recess 307 by which the extension 404 is received. The extension top opening angle 417 is inferior to the recess top opening angle 313 such that the extension 404 can be axially received by the recess 307. Preferably, the relation between both opening angles is such that the extension 404 fills at least 50% of the angular extent of the recess 307. More preferably, the relation between both opening angles is such that the extension 404 fills as much of the angular extent of the recess 307 as possible within the margins of tolerance of manufacture.

In FIG. 12 (b), the thickness of the extension 404 at its distal end, optionally including the recesses' axial extension 419, is equal to the recess depth 310 of the recess 307 by which the extension 404 is received. The extension top opening angles 417 and the extension angular intervals 416 are sufficiently inferior to the recess top opening angle 313 such that multiple extensions 404 can be axially received by a single recess 307. Preferably, the relation between the angles is such that the extensions 404 fill at least 50% of the angular extent of the recess 307. More preferably, the relation between the angles is such that both outermost extensions of the extensions 404 being received by the recess 307, sit as close to the sides 312 of the recess 307 as possible within the margins of tolerance of manufacture.

In FIG. 12 (c), the thickness of the extension 404 at its distal end, optionally including the recesses' axial extension 419, is smaller than the recess depth 310 of the recess 307 by which the extension 404 is received. Preferably, the extension thickness is no more than 10% smaller than the recess depth. In FIG. 12 (d), the thickness of the extension 404 at its distal end, or of the recesses' axial extension 419, is larger than the recess depth 310 of the recess 307 by which the extension 404 is received. Preferably, the extension thickness is no more than 10% larger than the recess depth.

While the situations (a)-(d) have been described individually, they can also be combined. For instance, a single recess 307 might receive multiple extensions 404, all of whom have a thickness smaller than the recess depth.

A single assembly can comprise any arbitrary combination of the interactions described above. For instance, one recess 307 might receive a single extension 404 while another recess 307 might receive multiple extensions 404. Furthermore, within the same assembly, the recess depth 310 may vary between the recesses 307 of the recess arrangement 306 and the thickness may vary between the radial extensions 404 of the radial extension arrangement 403. The above mentioned variations in bowl/housing main part-cartridge interaction can be used to distinguish between filter assemblies intended for different uses, different markets or different products.

In the embodiment of FIG. 1, the first and second taper angle 315 and 317 equal zero for every recess 307 of the recess arrangement. Similarly, the taper angle of every extension 404 of the radial extension arrangement 403 equals zero. In contrast, in the embodiments of FIG. 5 and FIG. 6, the taper angles of all the recesses and the extensions are equal and differ from zero. In the case of non-zero taper angles, it is preferable that the taper angle 315 of the recess 307 is smaller than or equal to the taper angle of the extension 404 that is received by the recess 307, and this for every recess 307 in the recess arrangement 306 and for every corresponding extension 404 in the extension arrangement 403. More preferably, the taper angle 315 of the recess equals the taper angle of the extension 404 that is received by the recess, and this for every recess 307 in the recess arrangement 306 and for every corresponding extension 404 in the extension arrangement 403. Preferably, both sides of both the recess 307 and the extension 404 are tapered, although the taper per extension 404 or recess 307 might be asymmetric. Preferably, every recess 307 of the recess arrangement 306 and every extension 404 of the extension arrangement 403 is tapered. It is an advantage of embodiments of the present disclosure that the presence of one or more tapered recesses 307 in the recess arrangement 306 facilitates the receiving of the extension arrangement 403 by the recess arrangement 306 and allows for easier radial alignment of the extension arrangement 403 in the recess arrangement 306.

Figure 6:
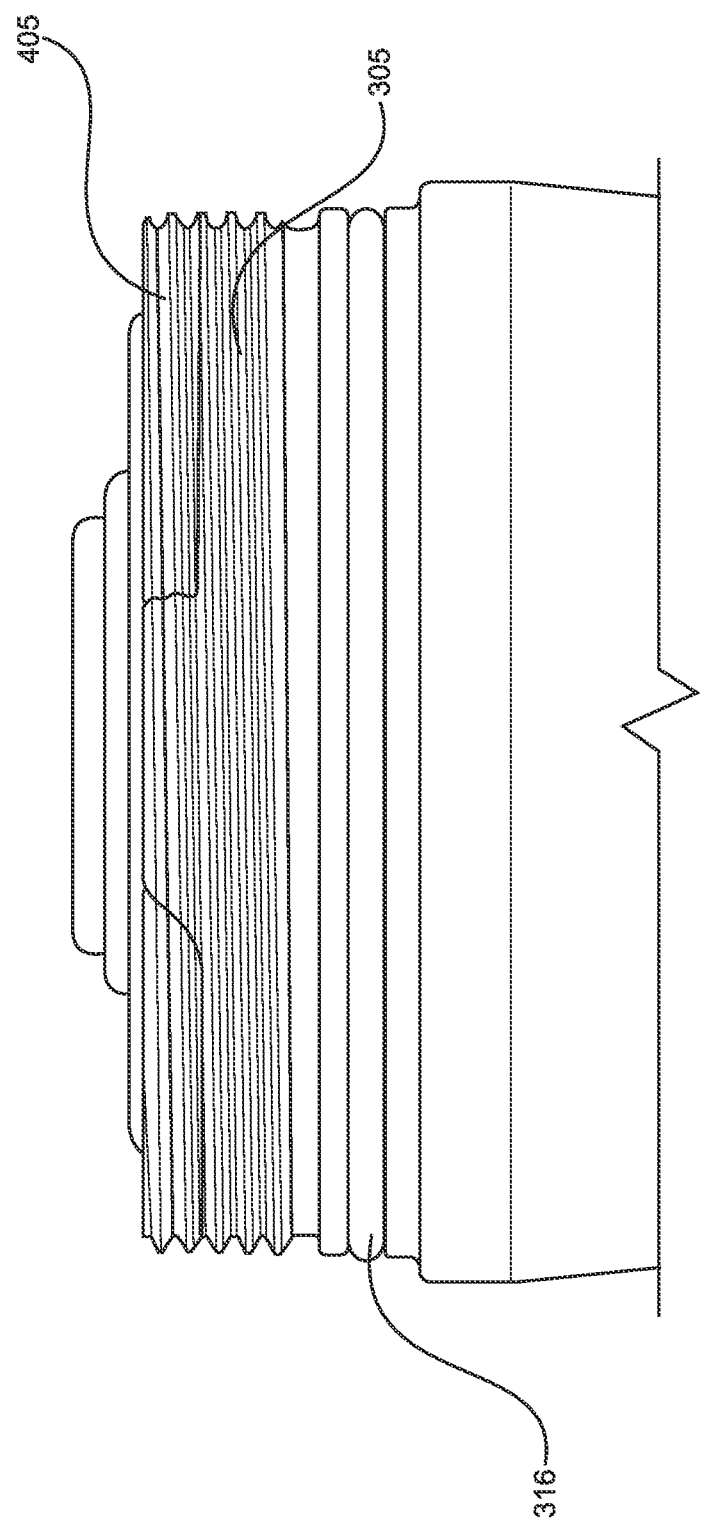
FIG. 6 illustrates the assembled filter bowl and cartridge of FIG. 5.

In the embodiments of FIG. 1, FIG. 5 and FIG. 6, the diameter of the central portion 402 of the first endcap 401 of the filter cartridge 400 is smaller than the inner diameter of the upper rim 304 of the filter bowl 300. This discrepancy in diameters leads to the creation of an open axial gap between the annular portion 426 of the first endcap 401 and the upper rim 304 over the angular intervals that are not covered by the extension arrangement 403. The axial gaps allow fluid to pass from the volume above the first endcap 401 to the volume below the first endcap 401, inside the filter bowl 300. The radial extension arrangement 403 comprises axial openings 411. Preferably, these openings 411 do not overlap with the upper rim 304 in axial projection. Preferably, these openings 411 cover more than 10, 20, 30, 40 or 50% of the upper surface of the extension arrangement 403. It is an advantage of the disclosure that the fluid flow rate from the volume above the first endcap 401 to the volume below the first endcap 401, inside the filter bowl 300, is not impeded by the presence of the extension arrangement 403 in any configuration because of the presence of the openings 411.

FIG. 5 illustrates the role of the alignment tabs 413. In the presented embodiment, the three or more alignment tabs 413 are located on a circle with a diameter that is inferior to the inner diameter of the upper rim 304. Preferably, the alignment tabs 413 are dimensioned such that all of them make contact with the inside of the first end portion 303 of the filter bowl 300 when the extension arrangement 403 is received by the recess arrangement 306. Preferably, the alignment tabs are positioned such that the first longitudinal axis 301 is aligned with the second longitudinal axis 409 when the extension arrangement 403 is received by the recess arrangement 306. It is an advantage of the disclosure that the alignment tabs 413 allow for automatic axial alignment and e.g. centering of the filter cartridge 400 in the filter bowl 300.

In the embodiments of FIG. 1, FIG. 5 and FIG. 6, the filter cartridge 400 comprises a third threaded portion 405 of the male type on the outer radial surface 406 of the radial extension arrangement 403. This third threaded portion 405 is configured to be complementary to the first threaded portion 305 on the first end portion 303 of the filter bowl 300. This complementarity can be explained as follows: when the radial extension arrangement 403 is received by the recess arrangement 306, the threads on the third threaded portion 405, together with the threads on the first threaded portion, form continuous threads wrapping around the entire first end portion 303. Upon receiving of the radial extension arrangement 403 by the recess arrangement 306, the first threaded portion 305 and the second threaded portion 405 together form a complete threaded portion of the type used in screw type fittings. In other embodiments, the extensions 404 of the extension arrangement 403 do not necessarily fill the entire angular extent of all recesses 307 of the recess arrangement 306 when the extension arrangement 403 is received by the recess arrangement 306. In these embodiments, the third threaded portion 405 is also configured to be complementary to the first threaded portion 305 on the first end portion 303 of the filter bowl 300 such that the threads on the third threaded portion 405, together with the threads on the first threaded portion, form parts of continuous threads wrapping around the entire first end portion 303. Nevertheless, for the present disclosure, it is preferable when the extensions 404 of the extension arrangement 403 fill as much of the angular extent of all recesses 307 of the recess arrangement 306 as possible within manufacturing tolerance margins, when the extension arrangement 403 is received by the recess arrangement 306.

In the embodiments of FIG. 1, FIG. 5 and FIG. 6, the first threaded portion 305 and the third threaded portion 405 have the same thread pitch and helix angle. Moreover, the first threaded portion 305 and the third threaded portion 405 comprise the same amount of threads such that their leads are equal. Their thread angle, minor diameter and major diameter might be different. However, the major diameter of any of both first or third threaded portion is always larger than the minor diameter of any of both first or third threaded portion. Preferably, the thread angle, minor diameter and major diameter of the first and third threaded portion are about equal within manufacturing tolerance margins.

In some embodiments according to the disclosure, the radial extension arrangement 403 of the filter cartridge 400 does not comprise a third threaded portion 405 on its outer radial surface 406. In these embodiments, it is preferable when the diameter of the outer radial surface 406 is equal or slightly superior to the major diameter of the first threaded portion 305.

Figure 20:
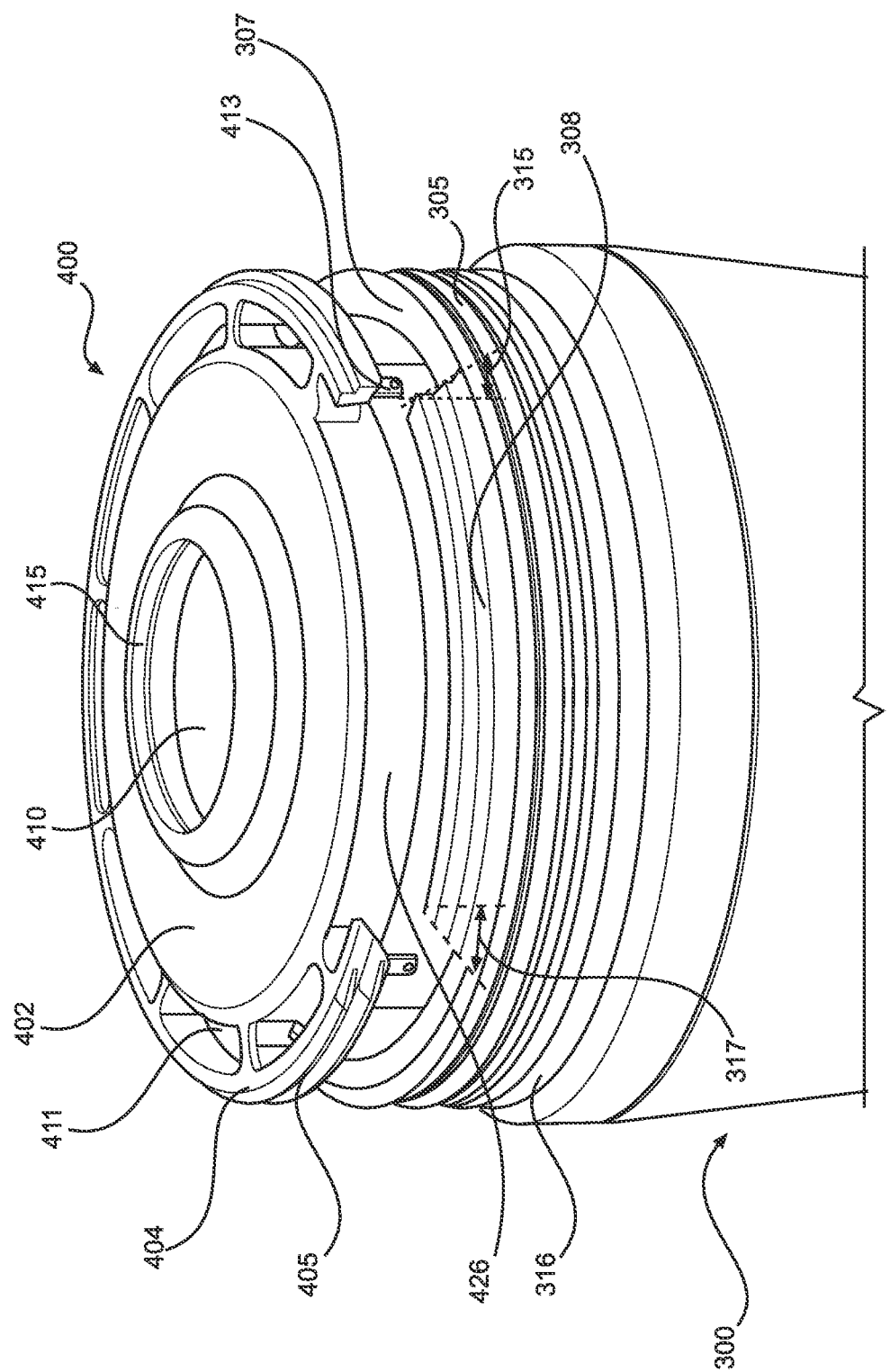
FIG. 20 displays a perspective view of a partial filter assembly, comprising a filter cartridge and a filter bowl, according to a preferred embodiment of the present disclosure.

FIG. 20 displays a partial filter assembly, comprising a filter housing main part 300 and a filter cartridge 400, according to a preferred embodiment of the present disclosure. In this preferred embodiment, the radial extension arrangement 403 comprises a single radial extension 404. This single radial extension 404 covers an angular extent around the second longitudinal axis 409, greater than 270° and smaller than 360°. The recess arrangement 306 comprises a single recess 307. This single recess 307 covers an angular extent around the first longitudinal axis 301, greater than or equal to the angular extent of the radial extension 404, such that the extension 404 can be received by the recess 307. Preferably, the angular extents of the single extension 404 and the single recess 307 are adapted such that they are equal In this preferred embodiment, the first taper angle 315 differs from the second taper angle 317. Preferably, the first taper angle 315 is smaller than 10°. Preferably, the second taper angle 317 is greater than 45°, or greater than 60°. The taper angles are of the radial extension 404 are adapted such that the corresponding taper angles on the extension 404 and the recess 307 are complementary.

Figure 30:
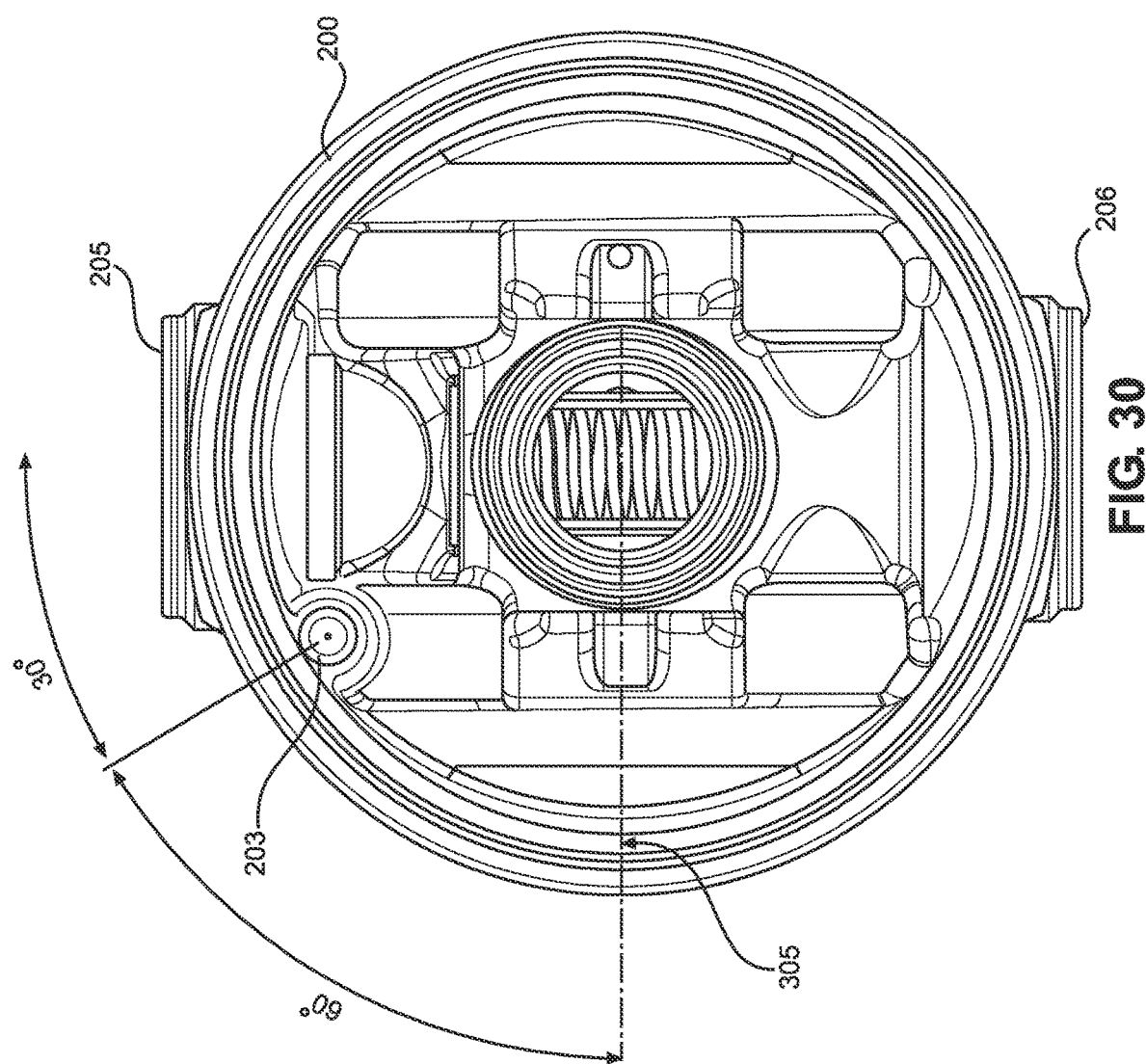
FIG. 30 is a bottom plan view of the filter head.
Figure 31:
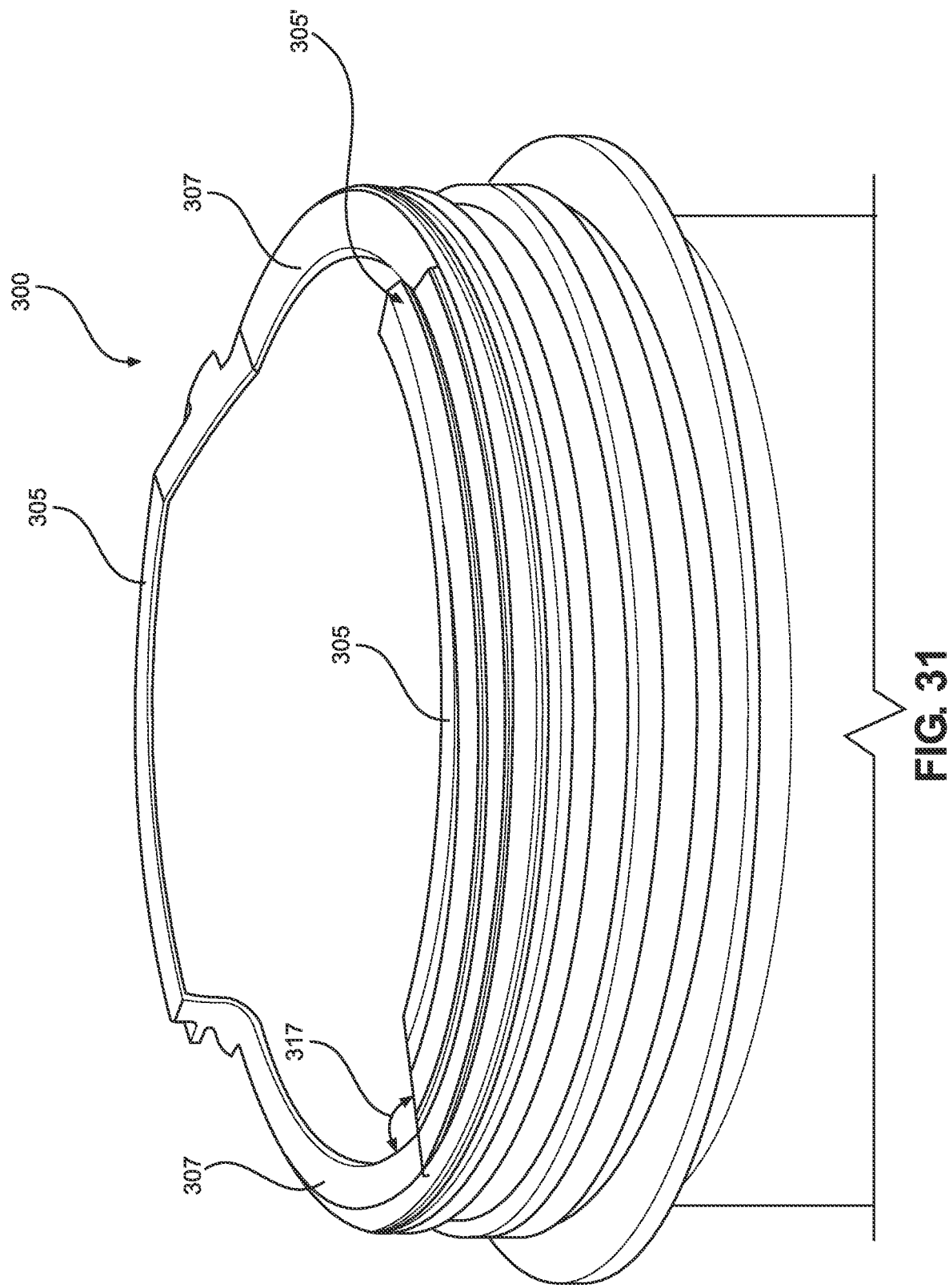
FIG. 31 is a perspective view of an embodiment of the filter bowl.
Figure 32:
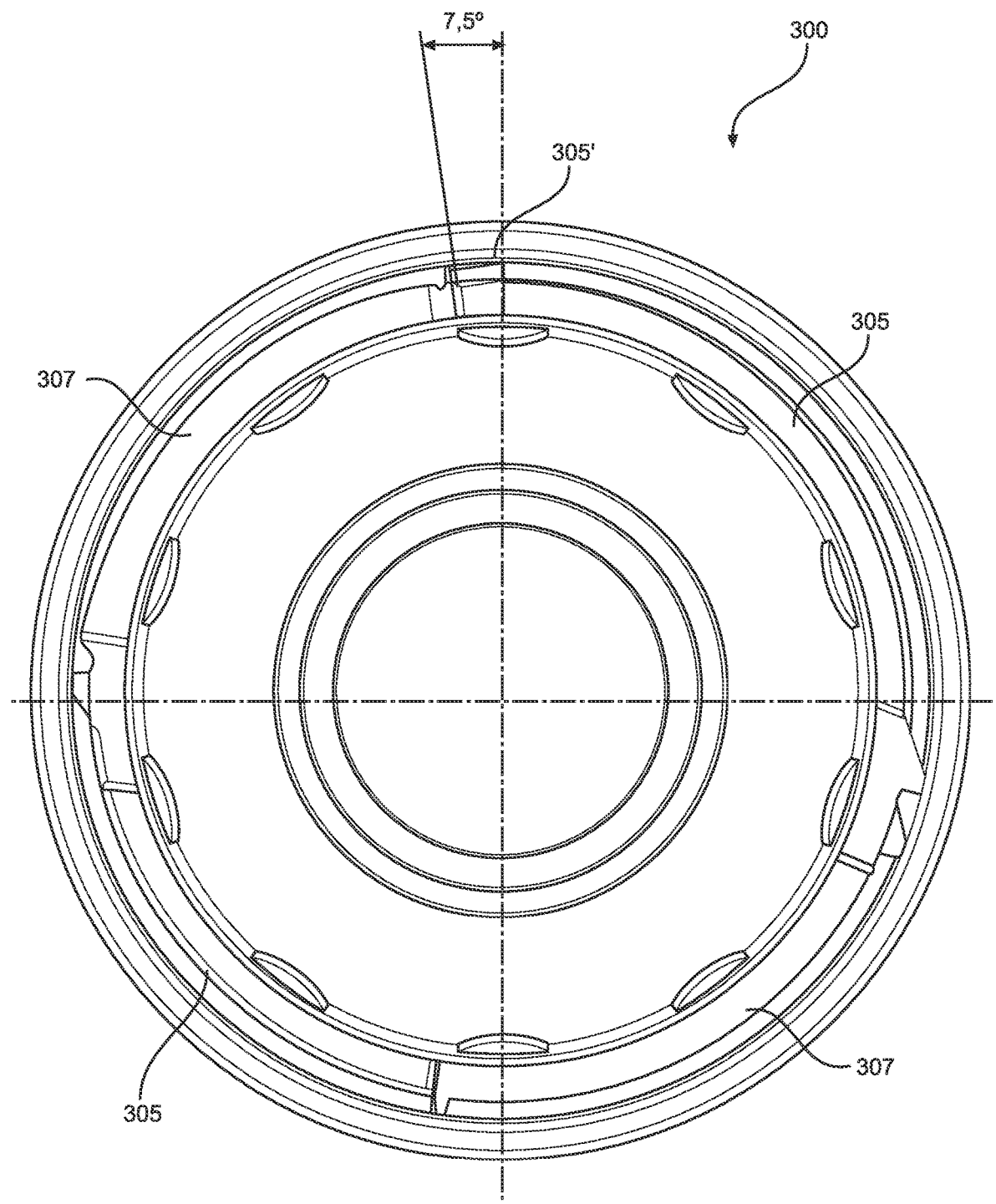
FIG. 32 is a top plan view of the filter bowl of FIG. 31.

In this preferred embodiment, the height of the single radial extension 404 equals the depth 310 of the recess 307. Furthermore, the third threaded portion 405 complements the first threaded portion 305 and comprises the thread start. In other embodiments, the thread start 305' (FIGS. 30-31) is on the first threaded portion 305 of the filter bowl 300.

As a result of the complementarity between their respective angular extents, taper angles, height/depth and threaded portions, the single radial extension 404 and the non-interrupted section 308 of the first end portion 303 together complete the first end portion 303 comprising the thread and the upper rim 304 when the filter cartridge 400 is received by the filter housing main part 300.

Filter Assembly: Interaction with Filter Housing End Part

Figure 7:
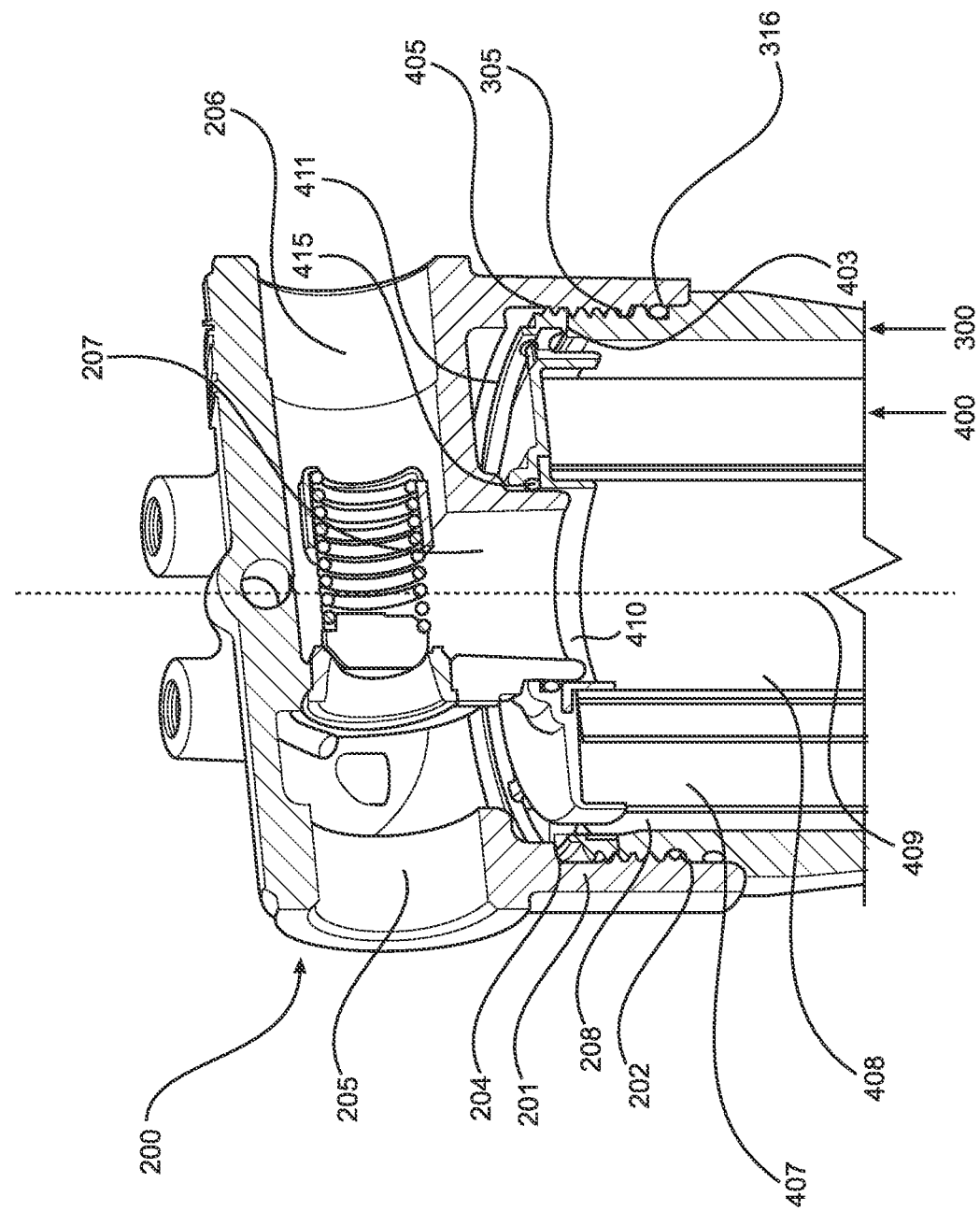
FIG. 7 shows a perspective cross-section of a filter assembly according to an embodiment of the present disclosure.

The embodiment of FIG. 7 displays a filter assembly according to the present disclosure, comprising a filter head/housing end part 200, a filter bowl 300 and a filter cartridge 400. In this assembly, the filter cartridge 400 is received by the filter bowl 300 through the receiving of the radial extension arrangement 403 by the recess arrangement 306. This receiving has been described in the context of FIG. 1, FIG. 5 and FIG. 6. Hence for details about the receiving of the filter cartridge 400 by the filter bowl 300, the reader is referred to the appropriate passages in this document. The filter bowl 300 shown in the assembly is identical to the bowl described in the context of FIG. 5 and FIG. 6, while the filter cartridge 400 shown in the assembly is identical to the cartridge described in the context of FIG. 4, FIG. 5 and FIG. 6. Hence for details about the individual features of either bowl 300 or cartridge 400, the reader is referred to the appropriate passages in this document.

The filter head 200 comprises a second end portion 201 comprising a second threaded portion 202 of the female type. Preferably, the filter head 200 is made out of a metal, e.g. Aluminum. The second end portion 201 is adapted for receiving the first end portion 303 of the filter bowl 300. This is achieved by the receiving of the first threaded portion 305 of the first end portion by the compatible second threaded portion 202 on the second end portion 201 through a screw-type connection. To this end, the second threaded portion 202 has the same thread pitch and helix angle as the first threaded portion 305 on the first end portion 303 of the filter bowl. Moreover, the first threaded portion 305 and the second threaded portion 202 comprise the same amount of threads such that their leads are equal. The thread angle, minor diameter and major diameter of the first and second threaded portion might be different. However, the minor diameter of the second threaded portion 202 is preferably larger than the minor diameter of the first threaded portion 305. Also, the major diameter of the second threaded portion 202 is preferably larger than the major diameter of the first threaded portion 305. Preferably, the thread angles of the first and second threaded portions are equal.

The filter head 200 comprises an outlet (or inlet, depending on the configuration of the system) duct 207. Upon the receiving of the filter bowl 300 and filter cartridge 400 by the filter head 200, the outlet duct 207 is axially inserted into the primary aperture 410 of the first endcap 401 of the filter cartridge. The outer diameter of the outlet duct 207 is adapted such that the outlet duct radially compresses the seal 415 upon the receiving of the filter bowl 300 and filter cartridge 400 by the filter head 200. In embodiments, the first endcap 401 might comprise an axially extending outlet duct 414 wherein a radial seal is arranged on the outer radial surface of the outlet duct 414. In this case, the outlet duct 414 is axially inserted into the outlet duct 207 upon the receiving of the filter bowl 300 and filter cartridge 400 by the filter head 200. In this case, the inner diameter of the outlet duct 207 is adapted such that the inlet duct radially compresses the seal 415.

The filter head 200 comprises an abutment surface 204. Upon the receiving of the filter bowl 300 by the filter head 200, the abutment surface 204 overlaps with the upper rim 304 of the first end portion 303 of the filter bowl 300 in axial projection. The filter bowl 300 is maximally received by the filter head 200 when the abutment surface 204 makes contact with the upper rim 304. In this situation, the second end portion extends axially below the radial seal 316. The inner diameter of the second end portion 202 is adapted such that the end portion 202 radially compresses the seal 316 in this position.

Upon the receiving of both the filter bowl 300 and filter cartridge 400 by the filter head 200, the filter bowl 300 and filter cartridge 400 are maximally received by the filter head 200 when the abutment surface 204 makes contact with the upper rim 304 and the radial extension arrangement 403. In embodiments where the radial extension arrangement 403, upon receiving of the filter cartridge 400 by the filter bowl 300, projects above the upper rim 304 in axial direction, the radial extension arrangement 403 is axially compressed when the filter bowl 300 and filter cartridge 400 are maximally received by the filter head 200.

When the filter head 200 maximally receives the filter bowl 300 and filter cartridge 400, two separate internal volumes are created in the filter assembly. The first volume is determined by the filter head inlet 205, the space between the filter head 200 and the top of the first endcap 401 and the flow annulus 208 between the inner diameter of the filter bowl 300 and the outer diameter of the filter media 407. The second volume is determined by the open filter interior 408, the outlet duct 207 and the filter head outlet 206. Both volumes are separated by the filter media 407 such that fluid can only pass from one volume to the other by flowing through the filter media 407. When the filter head inlet 205 is connected to a fluid supply, the fluid will flow into the space between the filter head 200 and the top of the first endcap 401. Subsequently, the fluid will flow into the flow annulus 208 through the open space between the inner diameter of the first end portion 303 and the annular portion 426, or through the flow openings 411. After passing through the filter media 407, the fluid will flow through the primary aperture 410 and finally through the filter head outlet 206. The role of inlet and outlet and the direction of the fluid flow can be reversed.

In the embodiment shown in FIG. 5, the radial extension arrangement 403 comprises a third threaded portion 405 on its outer radial surface 406. This third threaded portion 405 is configured to be complementary to the first threaded portion 305, as explained above. This third threaded portion 405 is also configured to be compatible with the second threaded portion 202. To this end, the third threaded portion 405 on the radial extension arrangement 403 has the same thread pitch and helix angle as the second threaded portion 202 on the second end portion 202 of the filter head 200. Moreover, the third threaded portion 405 and the second threaded portion 202 comprise the same amount of threads such that their leads are equal. The thread angle, minor diameter and major diameter of the third and second threaded portion might be different. However, the minor diameter of the second threaded portion 202 is always larger than the minor diameter of the third threaded portion 405. Also, the major diameter of the second threaded portion 202 is always larger than the major diameter of the third threaded portion 405. Preferably, the thread angles of the third and second threaded portions are equal. Upon completion of the filter assembly according to the embodiments of the present disclosure, the first threaded portion 305 of the first end portion 303 and the second threaded portion 405 on the radial extension arrangement 403 are received by the compatible second threaded portion 202 on the second end portion 201 through a screw-type connection.

It is an advantage of the embodiment according to the present disclosure that the filter assembly is difficult to complete when the correct filter cartridge 400—whose radial extension arrangement 403 can be received by the recess arrangement 306 of the filter bowl 300 and whose third threaded portion 405 is complementary with the first threaded portion 305 on the filter bowl 300 and compatible with the second threaded portion 202 on the filter head 200—is not present.

In case of the presence of the wrong filter cartridge type, the screw-type assembly will be impossible to complete without exerting excessive force. This serves as a safeguard against the usage of the wrong type of filter cartridge.

In case of the presence of the correct filter cartridge type, but with poor alignment or insertion of the filter cartridge, the screw-type assembly will be impossible to complete without exerting excessive force. This serves as a safeguard against the usage of the filter assembly while the filter cartridge is improperly oriented or inserted.

In case of the absence of a filter cartridge, the screw-type assembly will be difficult to complete due to the presence of incomplete threaded portions on the bowl-cartridge assembly. This effect can be enhanced by locating the start of the male thread on the third threaded portion 405. In this case, the screw-type assembly will be impossible to complete without perfectly horizontally and axially aligning the housing main part with the housing end part to allow proper start of the thread operation. This serves as a safeguard against the completion of the filter assembly while no filter cartridge is inserted.

It is an advantage of the embodiment according to the present disclosure that the filter cartridge 400 will be automatically removed from the filter head 200 when the filter bowl 300 is unscrewed, due to both the interaction between the radial extension arrangement 403 and the recess arrangement 306 and the interaction between the second threaded portion 202 and the third threaded portion 305. Furthermore, the cartridge 400 will remain removably attached to the bowl 300 due to the interaction between the radial extension arrangement and the recess arrangement 306.

When the cartridge 400 remains removably attached to the bowl 300, the liquid remaining in the filter assembly after drainage will drip into the bowl and can conveniently be discarded once the bowl is removed from the system, thereby enabling clean servicing of the system.

When the cartridge 400 remains removably attached to the bowl 300, no extra axial clearance beyond the axial travel distance of the screw-type assembly is required for servicing of the filter assembly. This is in contrast to filter assemblies where the cartridge does not remain removably attached to the bowl; these assemblies require an axial clearance equal to the axial travel distance of the screw-type assembly plus the axial length of the filter cartridge. Since liquid filters are often installed in tight spaces, like motor compartments of vehicles, such a reduction in the amount of clearance required is highly beneficial from a design, manufacturing and maintenance perspective.

Figure 18:
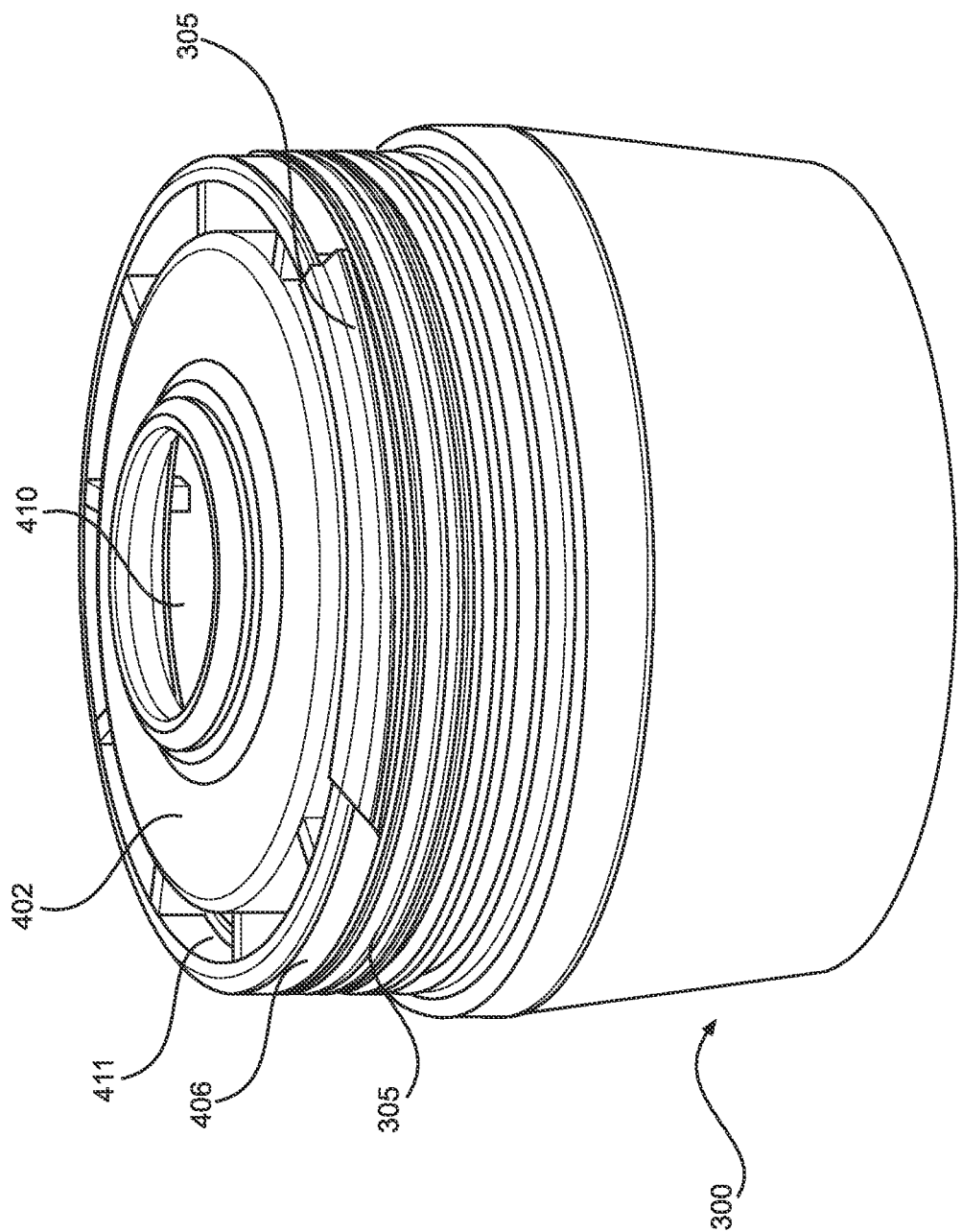
FIG. 18 shows a perspective view of a filter cartridge comprising a deformable portion on the outer radial surface of its radial extension arrangement.

In some embodiments according to the present disclosure, the radial extension arrangement 403 does not comprise a third threaded portion 405 on its outer radial surface 406. In these embodiments, the radial extension arrangement 403 comprises a threadable material portion, making up the outer radial surface 406. An example of such an embodiment is displayed in FIG. 18. Preferably, the threadable material portion covers the entire outer surface 406. The material out of which the threadable material portion is composed is preferably softer than the material of the second threaded portion 202. Preferably, the material out of which the threadable material portion is composed is a soft plastic. Preferably, the inner radial diameter of the threadable material portion is smaller than the minor diameter of the second threaded portion 202. Preferably, the outer radial diameter of the threadable material portion is larger than the minor diameter of the second threaded portion 202. Preferably, the outer radial diameter of the threadable material portion is smaller than the major diameter of the second threaded portion 202.

Figure 19:
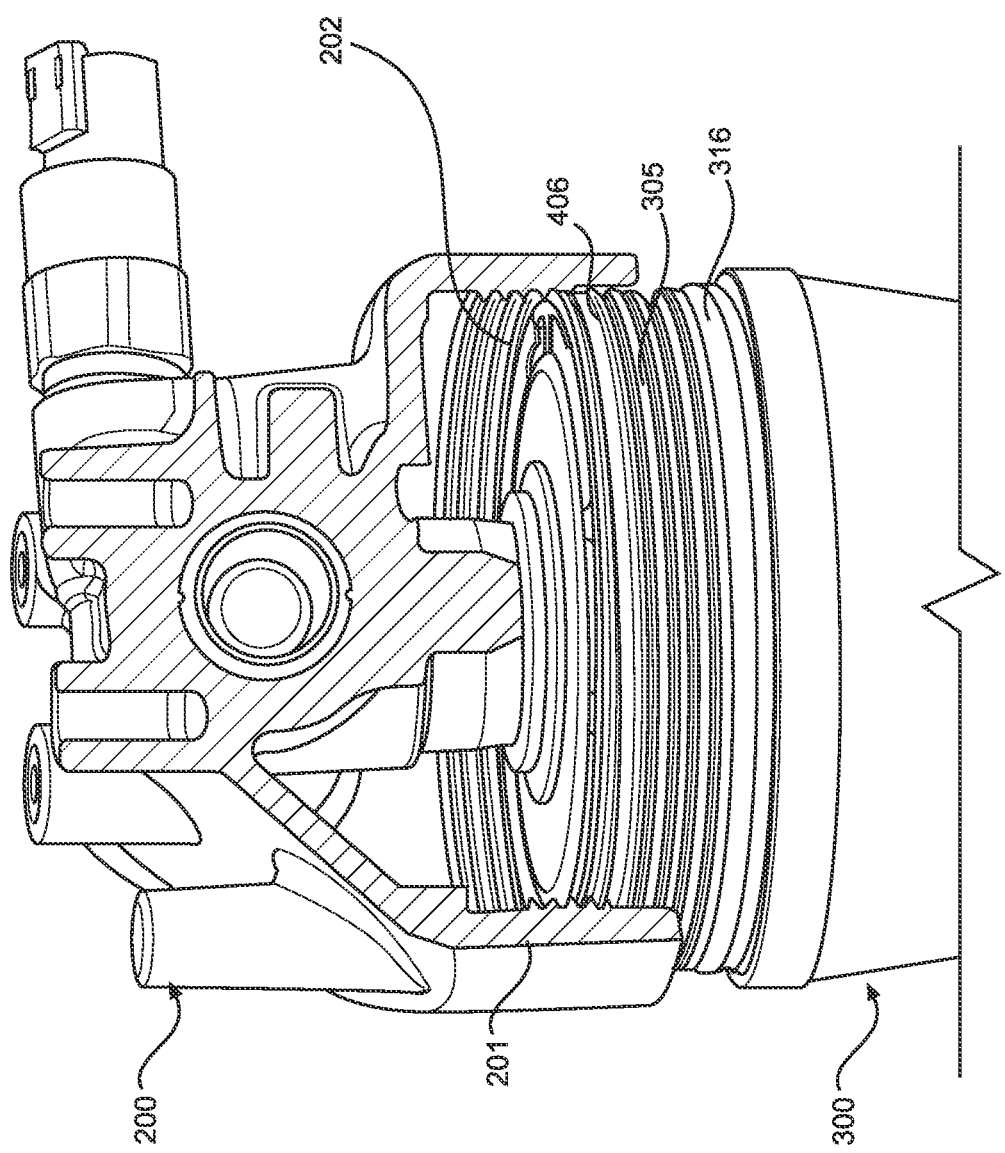
FIG. 19 shows a perspective view of a filter assembly comprising a filter cartridge with a deformable portion on the outer radial surface of its radial extension arrangement.

The presence of the threadable material portion does not modify the receiving of the filter cartridge 400 by the filter bowl 300. Upon completion of the filter assembly by the receiving of the filter cartridge 400 and filter bowl 300 by the filter head 200, the second threaded portion 202 will carve a compatible threaded portion of the male type out of the threadable material portion. This carving process is illustrated in FIG. 19, where the filter head 200 has been screwed partially onto the filter cartridge 400 and the filter bowl 300. Preferably, the material out of which the threadable material portion is composed is sufficiently soft such that the assembly can be easily completed by hand.

The skilled person will appreciate that the embodiments comprising the threadable material portion retain similar advantages of the embodiments comprising the third threaded portion 405.

Figure 8:
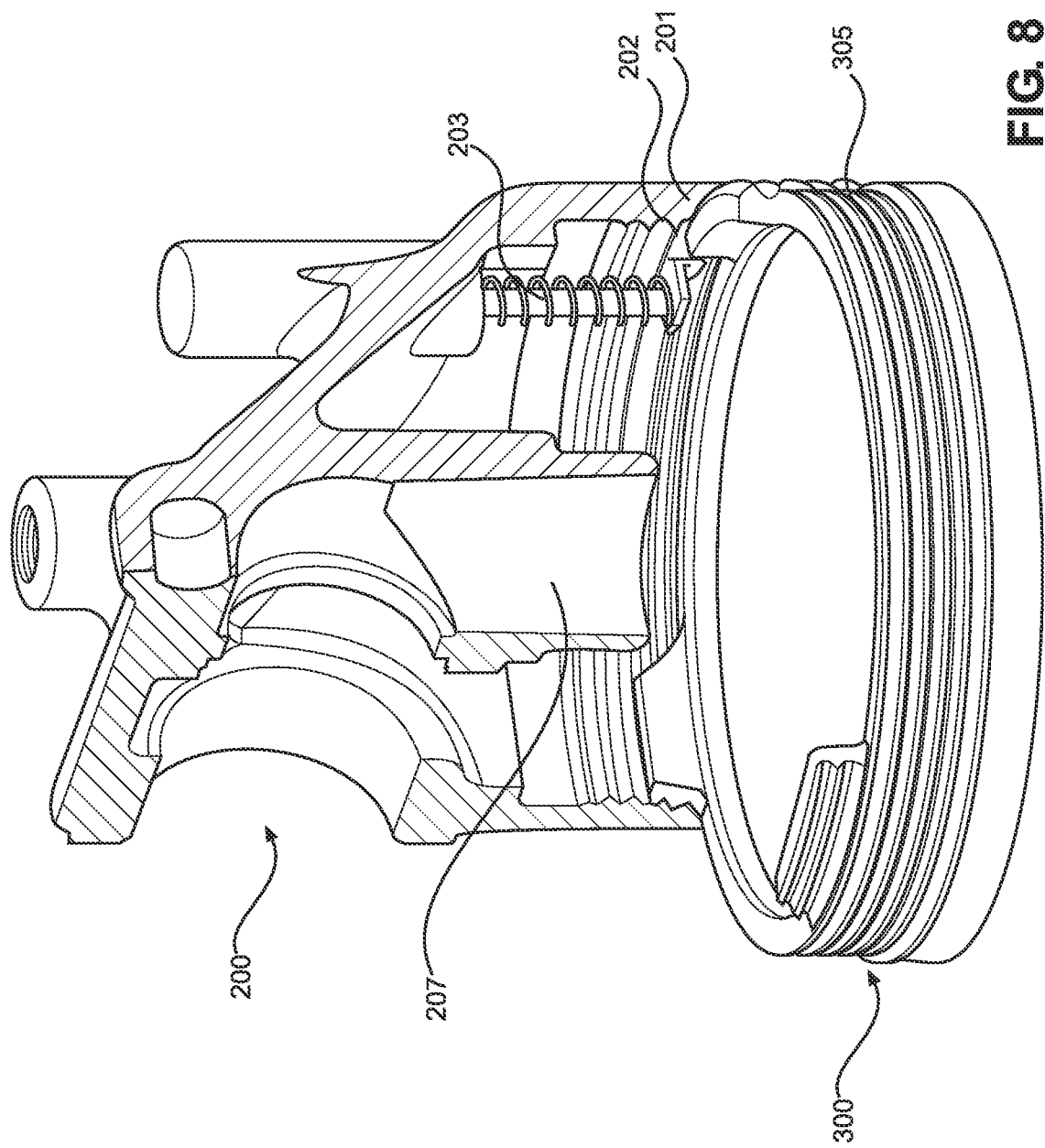
FIG. 8 displays a perspective section of a sliding pin blocking mechanism in a filter assembly in the absence of a filter cartridge, according to embodiments of the present disclosure.
Figure 9:
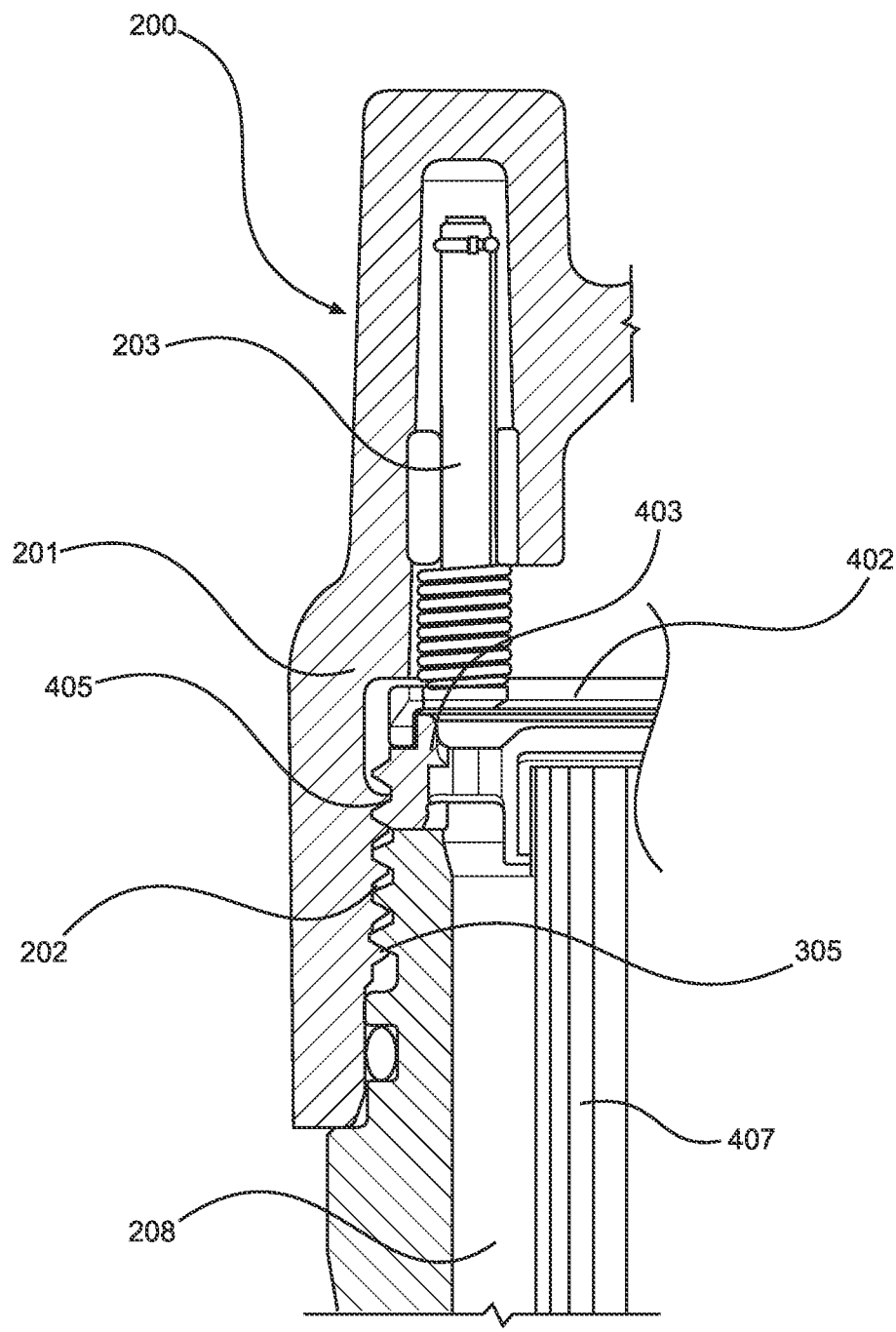
FIG. 9 is a cross-section of a sliding pin blocking mechanism in a filter assembly in the presence of a filter cartridge.

In the embodiments of FIG. 8 and FIG. 9, the filter head 200 comprises a spring-loaded sliding pin 203 that axially projects away from the filter head 200 in downward direction. The sliding pin 203 is positioned such that it overlaps with the upper rim 304 of the filter bowl 300 in axial projection. If one attempts to complete the filter assembly in the absence of an appropriate filter cartridge 400, the sliding pin 203 will extend into the first encountered recess 307 of the recess arrangement 306, thereby blocking the further completion of the screw-type assembly, as illustrated in FIG. 8. In the presence of an appropriate filter cartridge 400, the sliding pin will rest on top of the upper rim 304 or the radial extension arrangement 403, thereby not interfering with the further completion of the screw-type assembly, as illustrated in FIG. 9. Preferably, the axial bottom surface of the sliding pin 203 is broad enough such that it does not get stuck in gaps between the recess arrangement 306 and the radial extension arrangement 403 that fall within manufacturing tolerance. The sliding pin mechanism thus serves as an additional safeguard to guarantee that the filter assembly cannot be completed without the presence of an appropriate filter cartridge 400.

Figure 21:
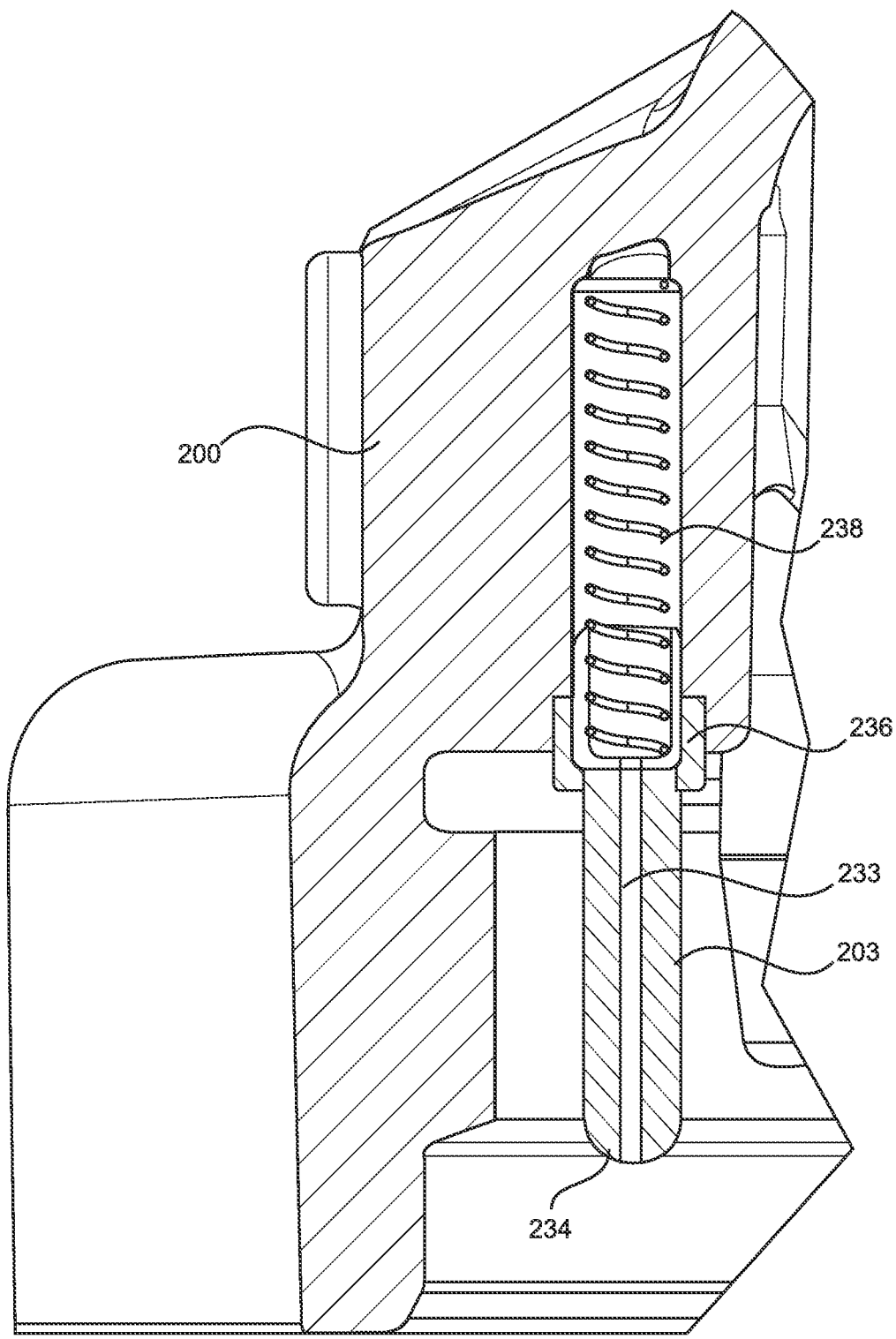
FIG. 21 shows a perspective cross-sectional view of the sliding pin blocking mechanism of FIGS. 8 and 9.

FIG. 21 shows another view of the spring-loaded sliding pin 203. In FIG. 21, the cross-section of the pin 203 is visible. The pin 203 has an open channel 233 extending through the length from a terminal end 234 to and through the pin head 236, which engages the spring 238. The channel 233 is helpful to prevent airlock when connecting the filter head 200 and filter bowl 300.

In the embodiments comprising the sliding pin mechanism, all of the recesses 307 of the recess arrangement 306 are preferably tapered in an asymmetric way. The clockwise sides of each of the recesses 307 preferably have a negligible first taper angle 315, preferably a first taper angle 315 smaller than 10°, such that the sliding pin 203 cannot ride up the clockwise side when the screw-type connection is fastened. In this way, further completion of the filter assembly in the absence of a filter cartridge 400 is guaranteed. The counter-clockwise sides of each of the recesses 307 preferably have a substantial second taper angle 317, preferably a second taper angle 317 greater than 45°, such that the sliding pin 203 can ride up the counter-clockwise side when the screw-type connection is loosened. In this way, the filter assembly can be loosened again when it got stuck in the absence of a filter cartridge 400.

Figure 13:
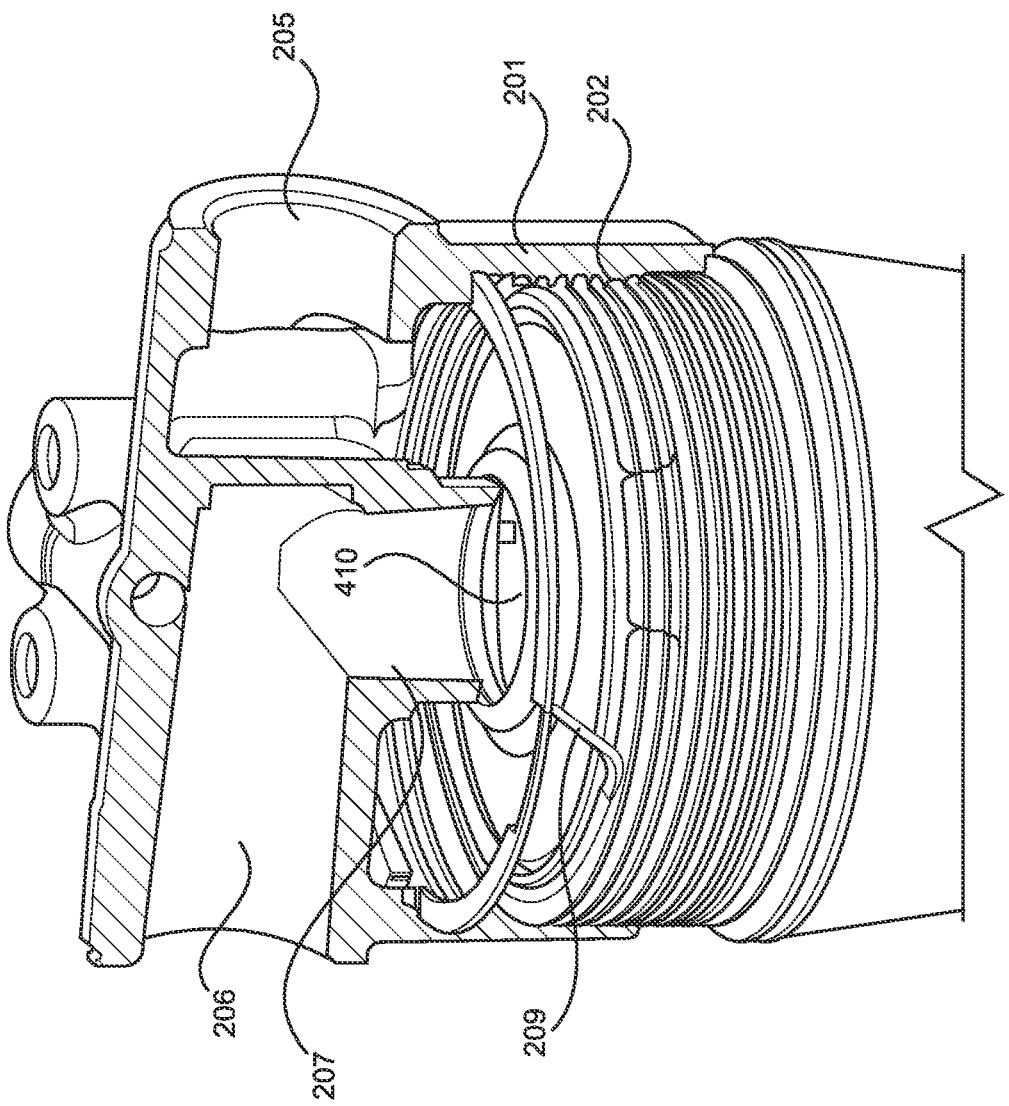
FIG. 13 displays a perspective section of a flat spring blocking mechanism in a filter assembly, according to embodiments of the present disclosure.

FIG. 13 displays an alternative embodiment of a blocking mechanism where the blocking function in the absence of an appropriate filter cartridge is ensured by the presence of a flat spring 209, axially projecting away from the filter head 200 in downward direction. The flat spring 209 is positioned such that it overlaps with the upper rim 304 of the filter bowl 300 in axial projection. If one attempts to complete the filter assembly in the absence of an appropriate filter cartridge 400, the flat spring 209 will extend into the first encountered recess 307 of the recess arrangement 306, thereby blocking the further completion of the screw-type assembly. In the presence of an appropriate filter cartridge 400, the sliding pin will rest on top of the upper rim 304 or the radial extension arrangement 403, thereby not interfering with the further completion of the screw-type assembly. Preferably, the axial bottom surface of the flat spring 209 is broad enough such that it does not get stuck in gaps between the recess arrangement 306 and the radial extension arrangement 403 that fall within manufacturing tolerance. The flat spring mechanism thus serves as an additional safeguard to guarantee that the filter assembly cannot be completed without the presence of an appropriate filter cartridge 400.

It is an advantage of the flat spring embodiment over the sliding pin embodiment that the proper functioning of the flat spring mechanism is not dependent on the asymmetric tapering of all the recesses 307 of the recess arrangement 306. In the fastening direction, the flat spring 209 will get stuck in any recess larger than its axial bottom surface whereas in loosening direction, the flat spring 209 will never get stuck.

It is an advantage of the preferred embodiment according to FIG. 20 that in the presence of a single recess 307 with an angular extent greater than 270°, the assembly of the filter is nearly impossible without the presence of a filter cartridge, even in the absence of an additional safeguard mechanism like a spring-loaded sliding pin 203 or a flat spring 209.

Figure 22:
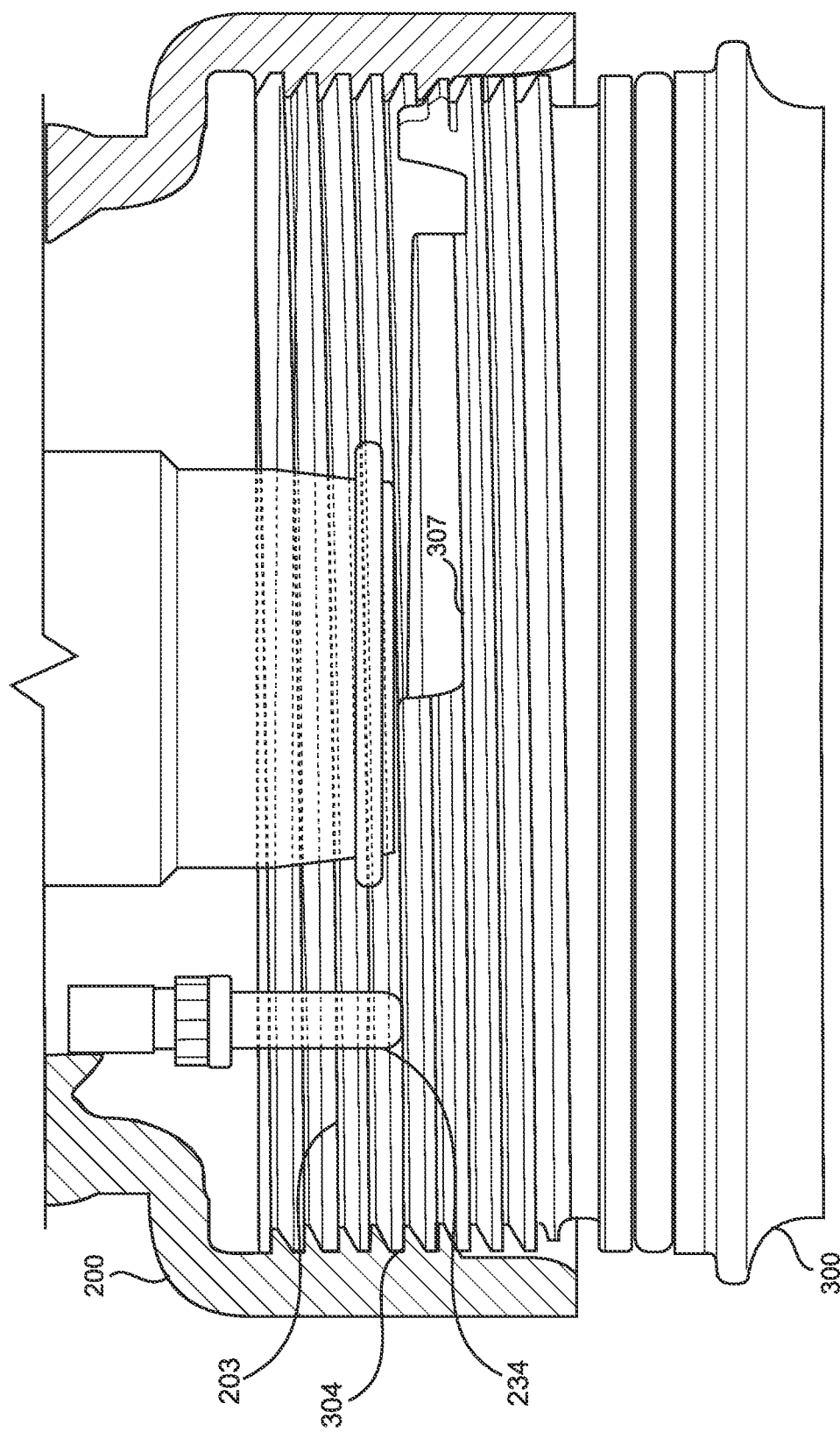
FIG. 22 shows in a step of assembling a filter bowl to the filter head, in the absence of a filter cartridge.
Figure 23:
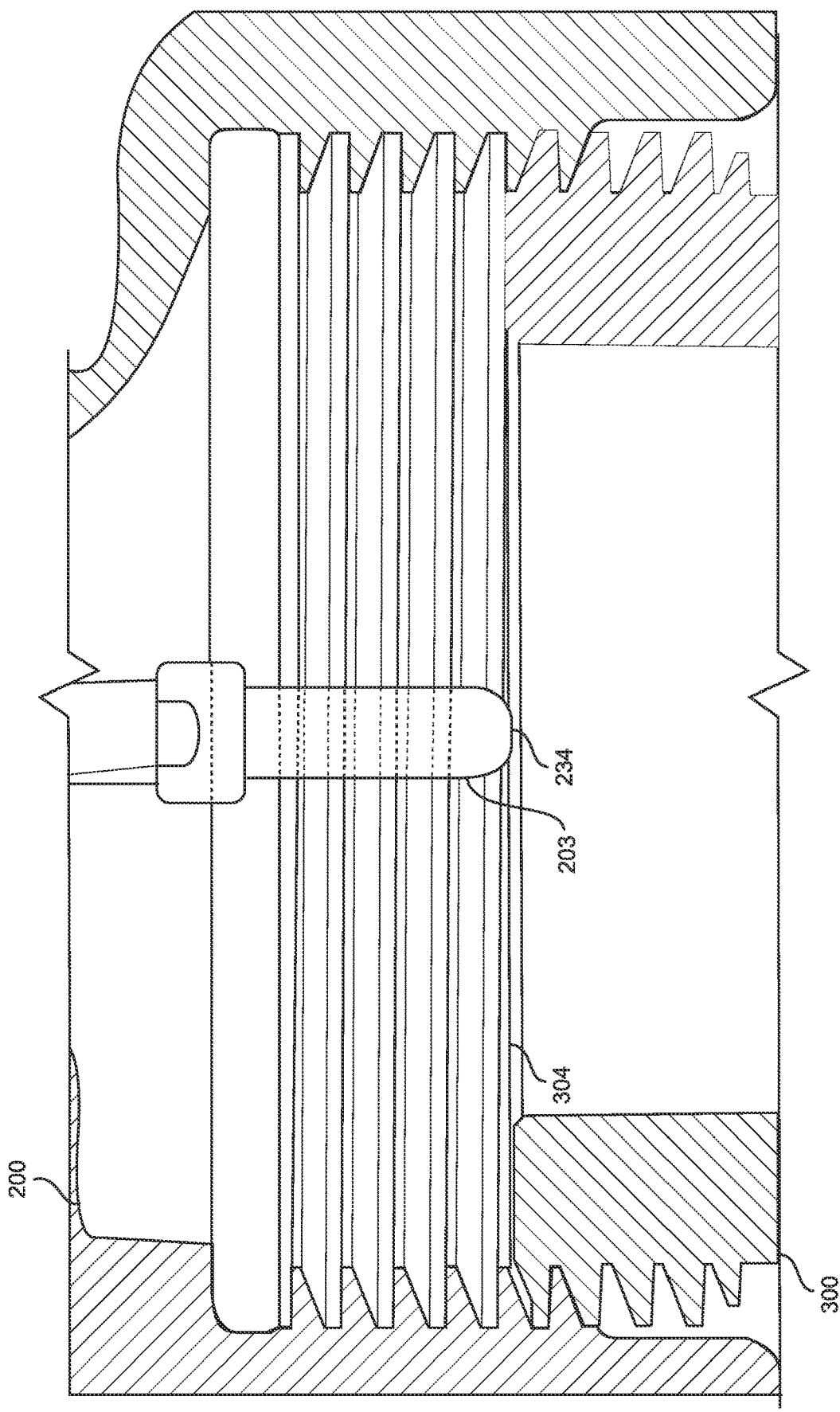
FIG. 23 is an enlarged view of a portion of FIG. 22.
Figure 24:
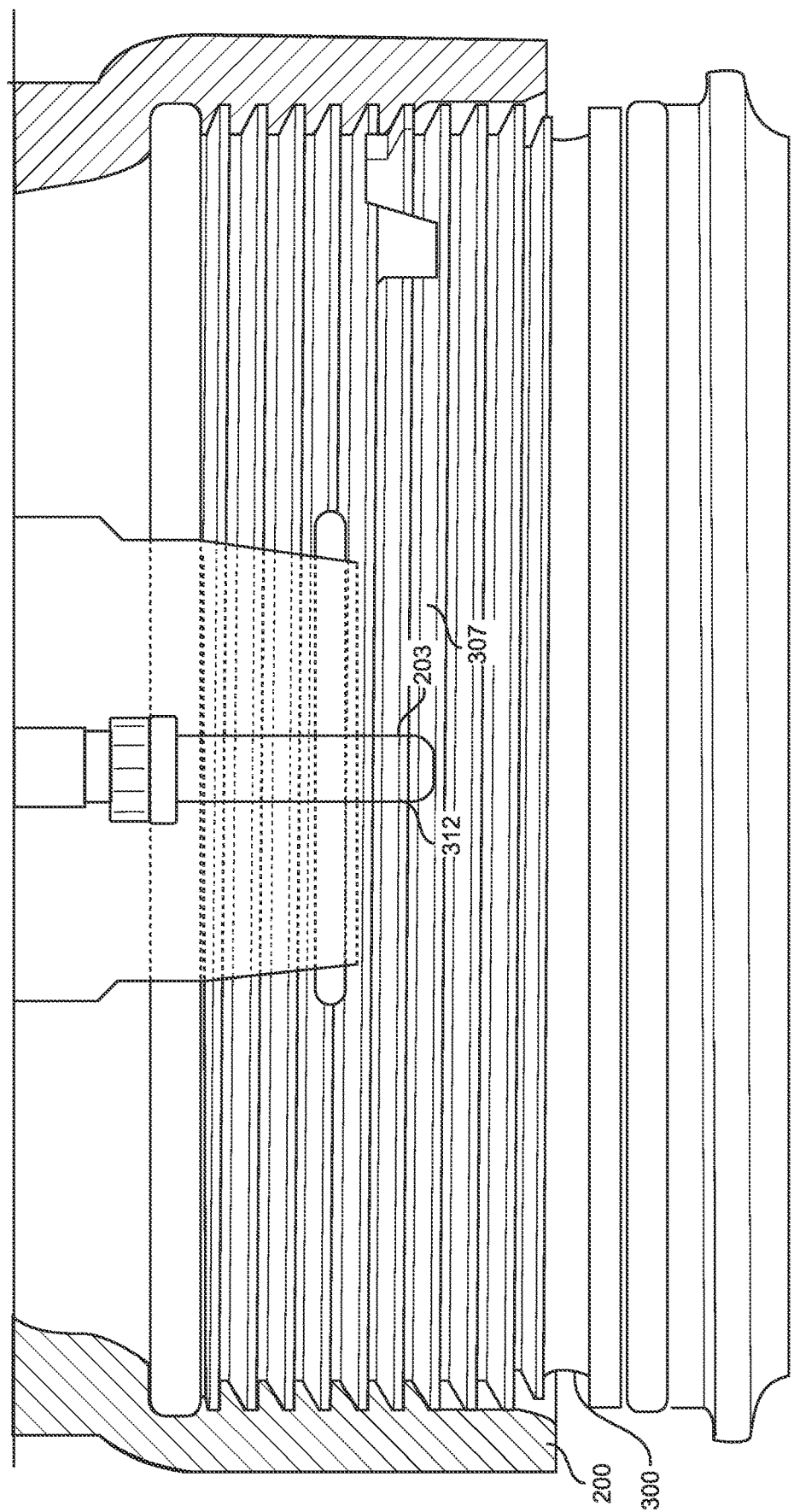
FIG. 24 shows in another step of assembling a filter bowl to the filter head, in the absence of a filter cartridge.
Figure 25:
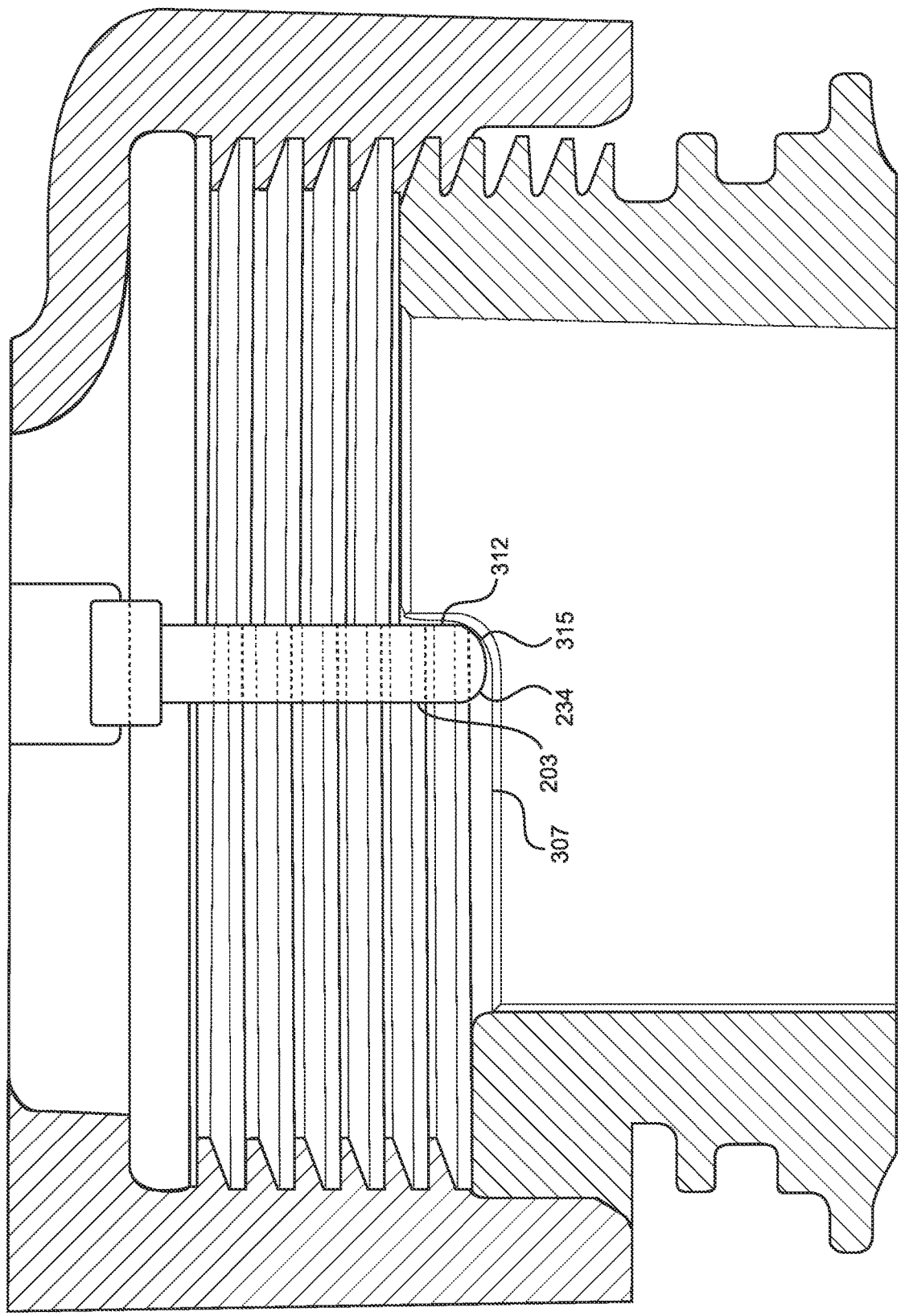
FIG. 25 is an enlarged view of a portion of FIG. 24.
Figure 26:
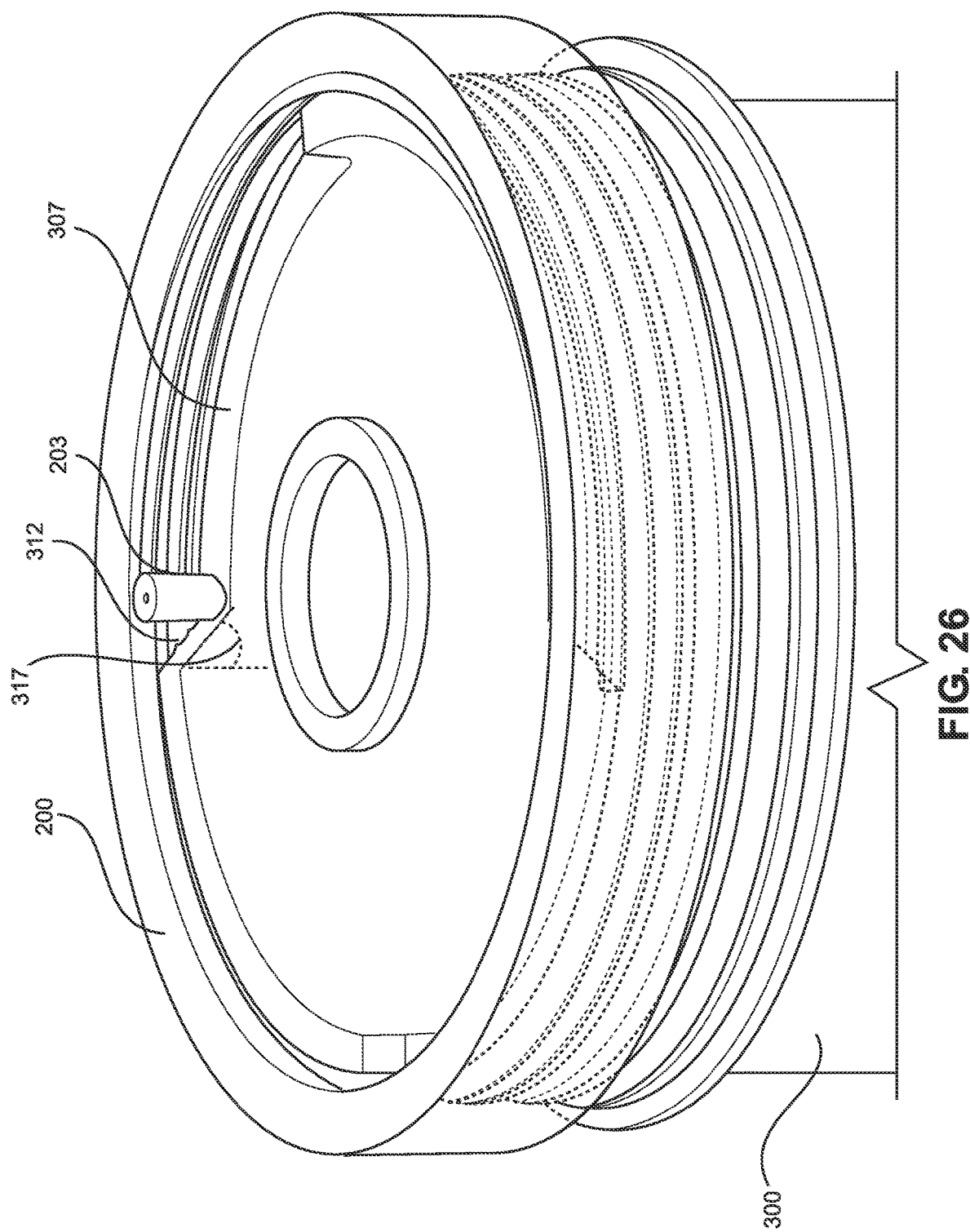
FIG. 26 shows in another step of assembling a filter bowl to the filter head, in the absence of a filter cartridge.
Figure 27:
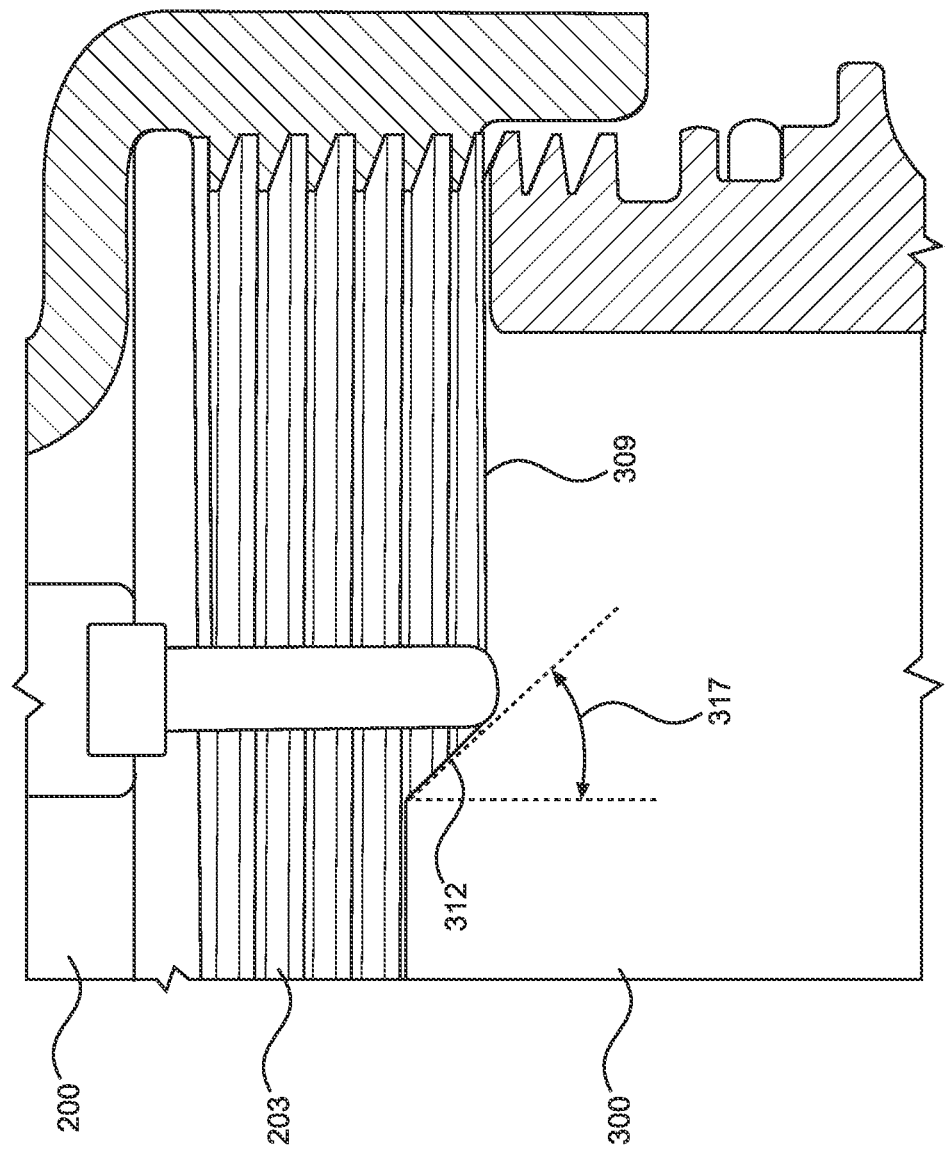
FIG. 27 is an enlarged view of a portion of FIG. 26.
Figure 28:
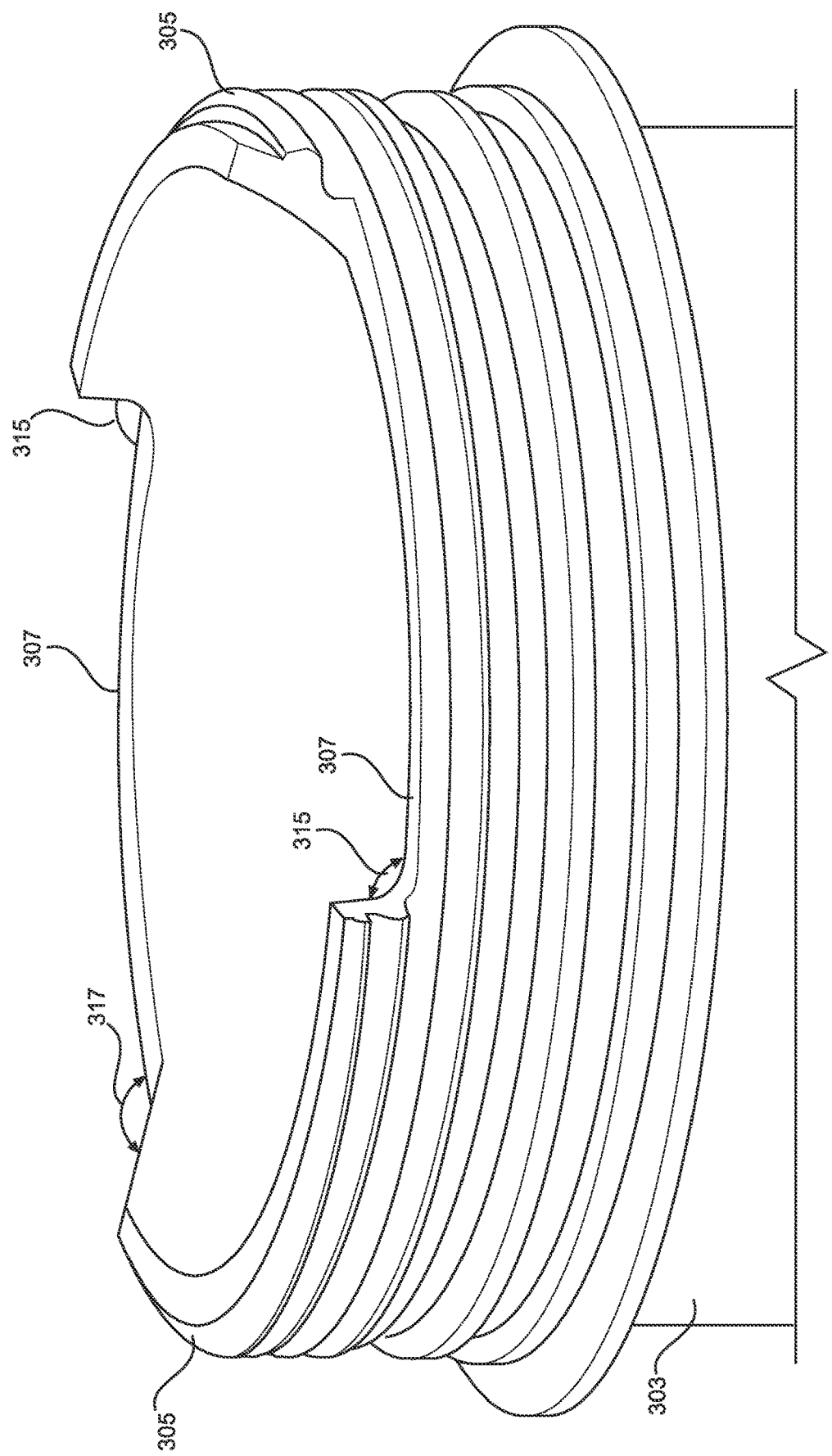
FIG. 28 is a perspective view of an embodiment of a filter bowl having two recess arrangements.

FIGS. 22-27 illustrate what happens when the filter bowl 300 is mounted on the filter head 200, without filter cartridge 400 installed therein. In FIGS. 22 and 23, the end 234 of the pin 203 engages against the upper rim 304 of the filter bowl 300. In FIGS. 24 and 25, the end 234 of the pin 203 projects into recess 307 of the recess arrangement 306, and the bowl 300 is prevent from further rotation because the pin 203 is blocked by the side 312 of the recess 307. In FIGS. 26 and 27, the bowl 300 is being removed from the filter head 200, and the pin 203 rides up over the side 312, the side 312 being at an angle of about 70°.

Figure 29:
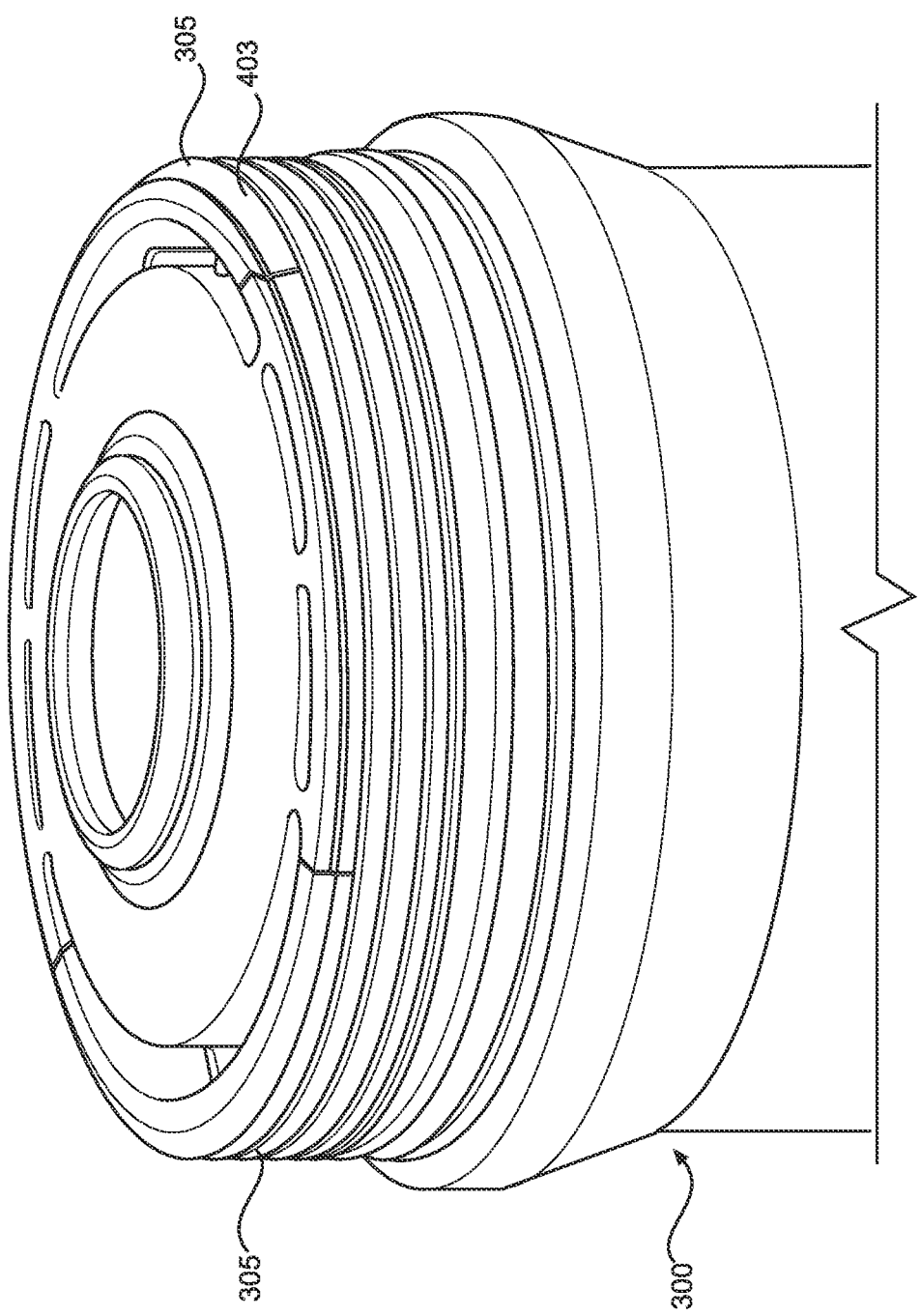
FIG. 29 is a perspective view of a filter cartridge having two radial extensions oriented within the filter bowl of FIG. 28.

According to FIGS. 28, 29, 31 &32, the recess arrangement 306 comprises no more than two recesses 307. Two threaded portions 305 alternate with the recesses 307. In FIG. 29, two radial extensions 403 of the cartridge 400 can be seen with the two recesses 307.

Filter Assembly of the Top-Mount Type

Figure 15:
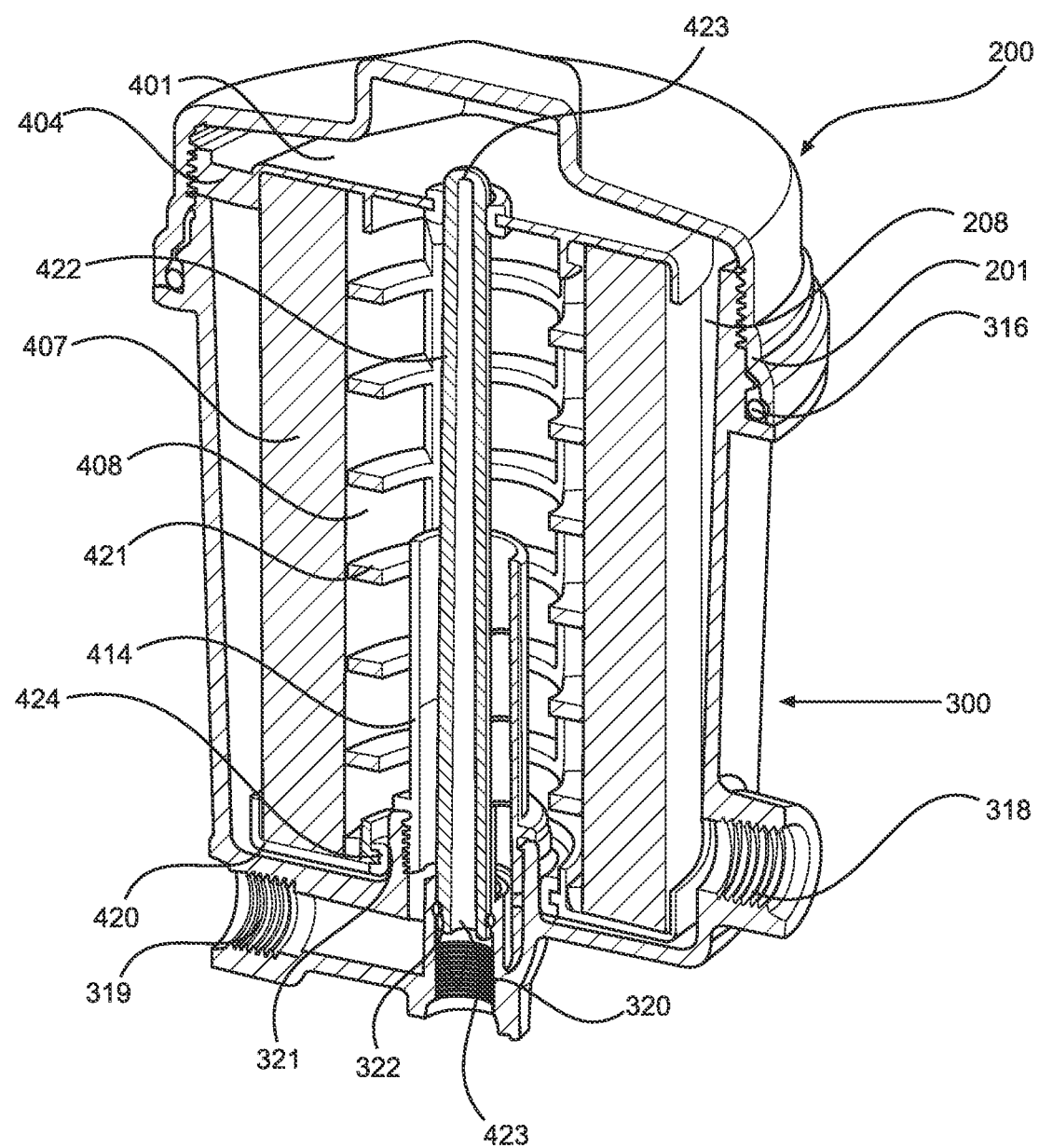
FIG. 15 shows a cross-section of an assembly of the top-mount type according to embodiments of the present disclosure.

The embodiment of FIG. 15 displays a filter assembly of the top-mount type according to the present disclosure, comprising a filter housing end part 200, a filter housing main part 300 and a filter cartridge 400. In this assembly, the filter cartridge 400 is received by the filter housing main part 300 through the receiving of the radial extension arrangement 403 by the recess arrangement 306. This receiving has been described in the context of FIG. 1, FIG. 5 and FIG. 6. Hence for details about the receiving of the filter cartridge 400 by the filter housing main part 300, the reader is referred to the appropriate passages in this document.

The embodiment of the filter housing main part 300 shown in the assembly is intended for use in a top-mount type assembly and hence differs from the embodiment of the filter housing main part 300, intended for use in a bottom-mount type of assembly, described in the context of FIG. 7. The main difference between both embodiments of filter housing main parts is that in the case of an embodiment intended for top-mount usage, the filter housing main part 300 comprises an inlet (or outlet, depending on the configuration of the system) duct 318 and an outlet (or inlet, depending on the configuration of the system) duct 319.

The embodiment of the filter housing main part 300 of FIG. 15 shows an air vent 320, located concentrically in the outlet duct 319. Such an air vent is not unique to or mandatory for embodiments of the top-mount type and can also occur in embodiments of the bottom-mount type.

The embodiment of the filter cartridge 400 shown in the assembly is intended for use in a top-mount type assembly and hence differs from the embodiment of the filter cartridge 400, intended for use in a bottom-mount type of assembly, described in the context of FIG. 3, FIG. 4, FIG. 5, FIG. 6 and FIG. 7. The main difference between both embodiments of filter cartridges is that in the case of an embodiment intended for top-mount usage, the filter cartridge 400 comprises an outlet (or inlet, depending on the configuration of the system) duct 414 in its second endcap 420, and not in its first endcap 401.

The embodiment of the filter cartridge 400 of FIG. 15 shows a filter media support structure 421, inserted into the open filter interior 408 to mechanically support the filter media 407. Such a support structure is not unique to or mandatory for embodiments of the top-mount type and can also occur in embodiments of the bottom-mount type.

The embodiment of the filter cartridge 400 of FIG. 15 also shows a central air duct 422, enclosed from the open filter interior 408 and extending through the first and second endcap of the filter cartridge 400. The central air duct 422 comprises air duct openings 423 on both opposite sides. Again, such an air duct is not unique to or mandatory for embodiments of the top-mount type and can also occur in embodiments of the bottom-mount type.

In the embodiment of FIG. 15, the filter cartridge 400 is received by the filter housing main part 300, not only through the receiving of the radial extension arrangement 403 by the recess arrangement 306, but also by the insertion of filter cartridge outlet duct 414 into the inwardly protruding rim 321 of the housing main part outlet duct 319. The inwardly protruding rim 321 radially compresses the bottom endcap seal 424 to avoid fluid flowing into or out of the open filter interior 408 through the opening between the rim 321 and the second endcap 420. At the same time, the central air duct 422 is inserted into the air vent rim 321, thereby radially compressing the air vent O-ring seal 322.

The embodiment of the filter assembly is completed by screwing the filter housing end part 200 onto the filter housing main part 300 and the filter cartridge 400. The completion of this assembly has been described in the context of FIG. 7 and the reader is referred to this discussion for further details.

The embodiment of the filter housing end part 200 shown in the assembly is intended for use in a top-mount type assembly and hence differs from the embodiment of the filter housing end part 200, intended for use in a bottom-mount type of assembly, described in the context of FIG. 7. The main difference between both embodiments of filter housing end parts is that in the case of an embodiment intended for top-mount usage, the filter housing end part 200 does not comprise inlets or outlets for establishing a fluid flow.

Embodiments of top-mount assemblies according to the present disclosure present important advantages when it comes to clean servicing of the filter assembly. After removal of the filter housing end part 200, the filter cartridge 400 can be lifted up partially, rotated around its longitudinal axis, and the radial extension arrangement 403 can be put to rest on the upper rim 304, supported by the non-interrupted part of the first end portion 303. In this position, the filter cartridge 400 is still largely inserted into the filter housing main part 300 while the bottom endcap seal is disengaged. As a result, the fluid remaining in the open filter interior 408 and the flow annulus 208 can drain through the outlet duct 319 before the filter cartridge is removed from the assembly. Additionally, after removal of the filter housing end part 200, this part can be flipped upside down and the filter cartridge 400 can, after its removal from the filter housing main part 300, be rested with its second endcap on the upside down oriented end part. Both of these mechanisms contribute to greatly reduced spilling of fluid upon servicing of the filter assembly.

FIG. 16 shows preferred embodiments of the filter housing main part 300 and filter cartridge for use in top-mounted assemblies. Preferably, the recess arrangement 306 does not show rotational symmetry such that a suitable filter cartridge 400 can only be installed in one position. Preferably, the recesses 307 of the recess arrangement 306 cover an angular extent of the first end portion 303 greater than 180°, more preferably greater than 270°. Preferably, the recess arrangement 306 comprises a single recess 307, this recess covering an angular extent of the first end portion 303 greater than 180°, more preferably greater than 270°. Preferably, the radial extension arrangement 403 comprises a single radial extension 404, this radial extension complementing the recess 307. The advantage of a single recess 307 covering a large angular extent is that it becomes very difficult to complete the filter assembly by screwing the filter housing end part 200 onto the filter housing main part 300 without the presence of a suitable filter cartridge 400. Moreover, the single large extension 404 can be gripped for lifting the filter cartridge 400 for servicing. Since the outer radial surface 406 of the extension arrangement 403 is outside the fluid flow path, this surface will be clean and the person performing the servicing can keep his hands clean. While the preferences and their associated benefits have been described in the context of a top-mount assembly, they are equally valid for bottom-mount assemblies.

Figure 33:
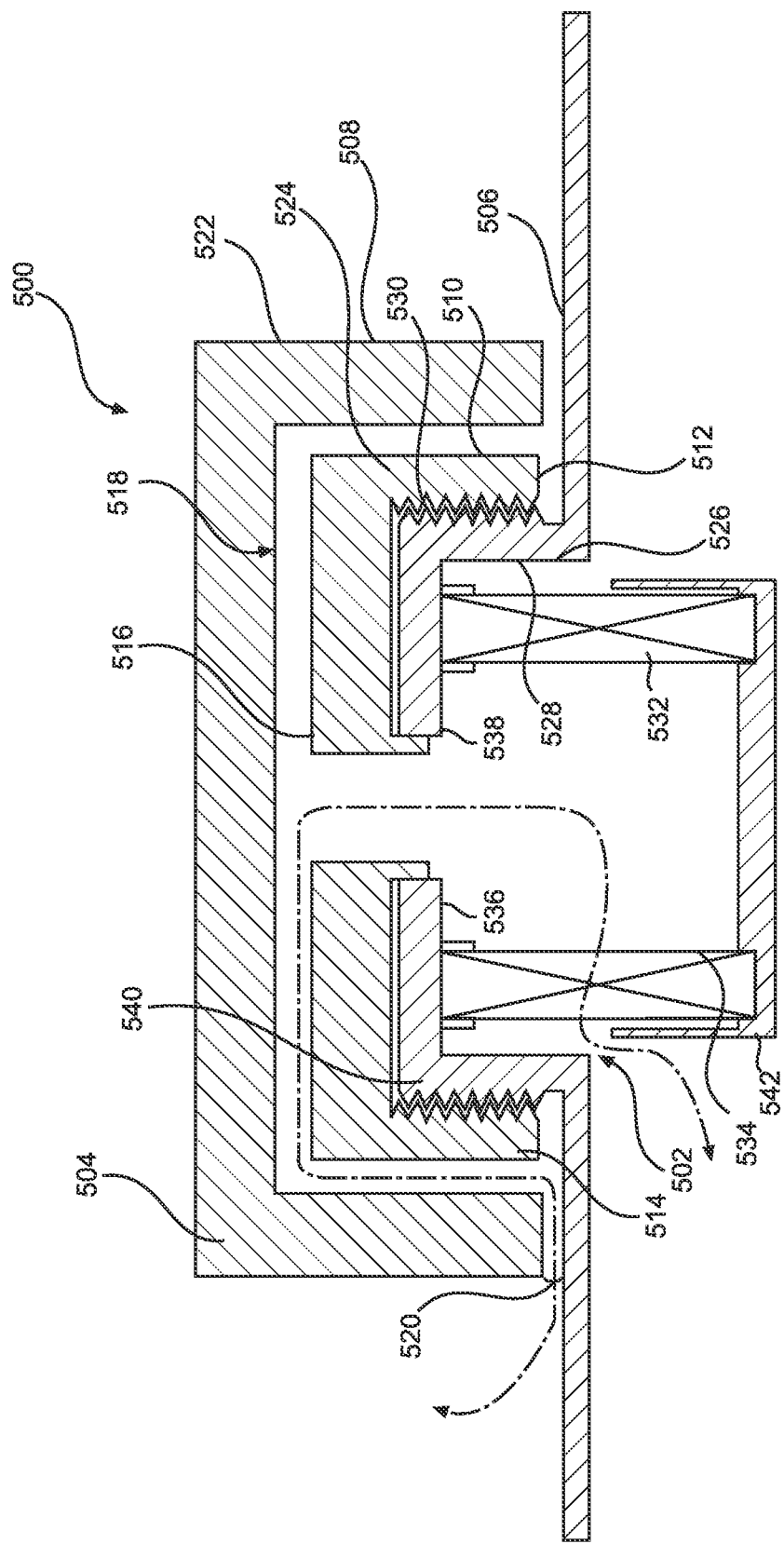
FIG. 33 is a schematic cross-sectional view of another embodiment of a system constructed in accordance with principles of this disclosure.

FIG. 33 illustrates another embodiment of a system comprising the principles and concepts described above. In FIG. 33, an in-tank filter assembly is shown generally at 500. In tank filter assemblies are used often in heavy-duty applications. Such applications included include cooling circuits, fluid conditioning systems, lube oil systems, process systems, return lines, and side loop systems. Breather filters are used to prevent contamination and water from the surroundings from entering the system in connection with fluctuations of oil level in the tank. In the system 500 of FIG. 33, a filter cartridge 502 is shown, functioning as a breather filter.

The filter assembly 500 includes the filter cartridge 502, a housing end part or cover 504, and filter housing main part or interface 506. The cover 504 is adapted for receiving the filter cartridge 502 and the interface 506 by rotatable threaded engagement, i.e., screwing.

The housing end part/cover 504 includes a main cover piece 508 and a first surrounding wall 510. The first surrounding wall 510 defines and surrounds a main opening 512.

Along an inner radial surface of the first surrounding wall 510 is a first threaded portion 514. The first threaded portion 514 extends radially inwardly and is typically a full 360° along the inner radial surface of the first surrounding wall 510.

The housing end part/cover 504 further includes a spigot 516. The spigot 516 is shown in tube shape extending away from a remaining portion of the cover 504 and into the cartridge 502. In the embodiment shown, the cover 504 is seal against and engaging the cartridge 502.

The cover 504 further includes an airflow passage 518. The airflow passage 518 allows air to flow through the spigot 516 and through a gap 520 between the cover 504 and the interface 506.

While a variety of arrangements are possible, in one or more examples, the cover 504 includes a first cover piece 522 and a second cover piece 524 in engagement with each other. For example, the cover pieces 522, 524 can be snapped together. The airflow passage 518 can be between the two cover pieces 522, 524.

The housing main part/interface 506 includes a second surrounding wall 526. The second surrounding wall 526 defines a interface opening 528. The interface opening 528 is sized for fitting within the main opening 512 of the cover 504. The second surrounding wall 526 has one or more interface threaded radial extensions 530. The interface threaded radial extensions 530 are adapted to engage the first threaded portion 514 of the cover 504. The one or more interface threaded radial extensions 530 are interrupted by one or more recesses therebetween.

In preferred embodiments, the interface threaded radial extension 530 is radially outwardly extending along the second surrounding wall 526. While many different alternatives are possible, in one example embodiment, there is a single recess in the interface threaded radial extensions 530.

Typically, the interface threaded radial extensions 530 extend less than 360° and frequently less than 270°. In examples, the interface threaded radial extensions 530 extend 45°-120°, and in some preferred examples, the interface threaded radial extensions 530 are extending at about 90°.

The filter cartridge 502 comprises media 532. The media 532 can be pleated media formed in a cylinder having an open filter interior 534.

A first end cap 536 is connected to the media 532. The first end cap 536 includes a central portion 538, which is an opening. The opening in the central portion 538 is sized to engage the spigot 516. In the example shown, the spigot 516 extends into and against the central portion 538 of the end cap 536.

The first end cap 536 further includes one or more cartridge radial extensions 540. The cartridge radial extensions 540 are adapted to threadably engage the first threaded portion 514 of the cover 504. The cartridge radial extensions 540 are interrupted by one or more recesses there between. The cartridge 502 is sized to be removably oriented in the interface opening 528.

As can be seen in FIG. 33, the cartridge radial extensions 540 are radially outwardly directed. Preferably, the interface threaded radial extensions 530 and the cartridge radial extensions 540 radially abut on a common cylindrical surface. In the example shown, they both engage with the first threaded portion 514 of the cover 504.

The filter cartridge 502 may further include a splash deflector 542. The splash deflector 542 is at an end of the filter cartridge 502 opposite of the first end cap 536. The splash deflector 542 can extend at least a partial extension along an outer diameter of the media 532, but less than a full extension to the first end cap 536.

The cartridge radial extensions 540 can be interrupted by only a single recess. In many examples, the cartridge radial extensions 540 extend less than 360° and more than 90°. In many examples, the cartridge radial extensions 540 extend between 180° and 300°. In one example, the cartridge radial extensions 540 extend about 270°.

The breather filter cartridge 502 can be serviced by unscrewing it from the cover 504 and replacing it with a new filter cartridge 502.

Aspects

Aspect 1. A filter assembly comprising a filter cartridge, a filter housing end part, and a filter housing main part, said filter housing main part being adapted for receiving said filter cartridge and adapted for being connected to said filter housing end part by screwing, wherein said filter housing main part comprises a first longitudinal axis and a main opening, said main opening being defined by a first end portion, said first end portion comprising an upper, interrupted rim and a first threaded portion arranged below said upper rim; and said filter cartridge comprises a filtration media and comprising a second longitudinal axis and a first end cap connected to said filtration media, said first end cap comprising a central portion and a radial extension arrangement comprising one or more radial extensions extending radially away from said central portion.

Aspect 2. A filter assembly according to aspect 1, wherein said filter housing end part comprises a second threaded portion for receiving said filter housing main part by at least said first threaded portion.

Aspect 3. A filter assembly according to aspect 1 or Aspect 2, wherein said radial extension arrangement comprises only 1 radial extension.

Aspect 4. A filter assembly according to aspect 3, wherein said radial extension comprises an angular extent around said second longitudinal axis which is larger than 180°, preferably larger than 270°.

Aspect 5. A filter assembly according to any of aspects 1 to Aspect 2, wherein said radial extension arrangement comprises at least 2 radial extensions.

Aspect 6. A filter assembly according to aspect 5, wherein said at least 2 radial extensions are arranged at irregular angular intervals.

Aspect 7. A filter assembly according to any of the previous aspects wherein:
said first end portion comprises a recess arrangement comprising one or more axially extending recesses, said one or more axially extending recesses interrupting said first threaded portion; and said radial extension arrangement is adapted for being received by said recess arrangement.

Aspect 8. A filter assembly according to aspect 7, whereby said recess arrangement comprises one recess.

Aspect 9. A filter assembly according to any of aspects 7 and 8, whereby said recess arrangement comprises at least two recesses.

Aspect 10. A filter assembly according to any of aspects 7-9, wherein a quantity of axial recesses equals a quantity of radial extensions.

Aspect 11. A filter assembly according to any of aspects 7-10, wherein, when said filter cartridge is received by said filter housing main part in a mounted state of said assembly, said radial extensions have an axial extent which equals the height of said respective recesses.

Aspect 12. A filter assembly according to any of aspects 7-11, wherein, when said filter cartridge is received by said filter housing main part in a mounted state of said assembly, said radial extensions have an axial extent which is smaller than the height of said respective recesses.

Aspect 13. A filter assembly according to any of the previous aspects, wherein at least one of said radial extensions of said filter cartridge further comprises one or more through openings, which allow fluid to pass.

Aspect 14. A filter assembly according to any of aspects 7-12, wherein said radial extension arrangement comprises a third threaded portion on a cylindrical surface, said third threaded portion being configured to complement the first threaded portion, thereby forming a radially continuous thread upon receiving of said radial extension arrangement by said recess arrangement, at least over a part of the, preferably over the whole, axial extent of the first threaded portion.

Aspect 15. A filter assembly according to any of the previous aspects 1-13, wherein said radial extension arrangement comprises a third threaded portion configured to complement the first threaded portion partially in the radial direction.

Aspect 16. A filter assembly according to aspect 14 or 15, wherein the starting point of said complete thread is located on said radial extension arrangement.

Aspect 17. A filter assembly according to aspect 14 or 15, wherein the starting point of said complete thread is located on said first threaded portion of the housing main part.

Aspect 18. A filter assembly according to any of aspects 1-13 wherein a cylindrical surface of said radial extension arrangement comprises a deformable material, said deformable material being softer than material of which said second threaded portion is composed, and said deformable material having a radial thickness greater than the thread depth of said second threaded portion.

Aspect 19. A filter assembly according to any of the preceding aspects, wherein said filter housing end part comprises a spring loaded sliding pin, said sliding pin being arranged to jut into one of said recesses upon the screwing on of said filter housing main part on said filter housing end part in the absence of said filter cartridge, thereby disabling the complete screwing on of said filter housing main part on said filter housing end part in the absence of said filter cartridge.

Aspect 20. A filter assembly according to any of aspects 1 to 18, wherein said filter housing end part comprises a flat spring, said flat spring being arranged to jut into one of said recesses upon the screwing on of said filter housing main part on said filter housing end part in the absence of said filter cartridge, thereby disabling the complete screwing on of said filter housing main part on said filter housing end part in the absence of said filter cartridge.

Aspect 21. A filter assembly according to any one of the preceding aspects wherein an outer dimeter of the radial extension arrangement is between 95-100% inclusive of an outer diameter of the main opening of the main part.

Aspect 22. A filter cartridge for use in a filter housing main part, said filter cartridge having a longitudinal axis, comprising: filter media surrounding an open filter interior; said filter media having first and second, opposite, ends; a first end cap at one end of said filter media; wherein said first end cap comprises a central portion and a radial extension arrangement comprising one or more radial extensions extending radially away from said central portion; said one or more radial extensions comprise an angular extent around said longitudinal axis which totals at least 20° and less than 340°.

Aspect 23. A filter cartridge according to aspect 22 wherein said one or more radial extensions comprise an angular extent around said longitudinal axis which totals at least 60°.

Aspect 24. A filter cartridge according to aspect 22 wherein said one or more radial extensions comprise an angular extent around said longitudinal axis which totals at least 120°.

Aspect 25. A filter cartridge according to aspect 22 wherein said one or more radial extensions comprise an angular extent around said longitudinal axis which totals at least 180°.

Aspect 26. A filter cartridge according to aspect 22 wherein said one or more radial extensions comprise an angular extent around said longitudinal axis which totals at least 270°.

Aspect 27. A filter cartridge according to aspect 22 wherein said one or more radial extensions comprise an angular extent around said longitudinal axis which totals less than 300°.

Aspect 28. A filter cartridge according to any one of aspects 22-27 wherein said radial extension arrangement comprises a threaded portion.

Aspect 29. A filter cartridge according to aspect 28, wherein said threaded portion comprises the starting point of a thread.

Aspect 30. A filter cartridge according to any one of aspects 22-29 wherein at least a portion of one of said radial extensions is tapered in an axial direction at an angle of 45-85°.

31. A filter cartridge according to any one of aspects 22-29 wherein at least one of said radial extensions is tapered in an axial direction at an angle of about 70°.

Aspect 32. A filter cartridge according to any one of aspects 22-27 wherein said radial extension arrangement comprises a deformable material.

Aspect 33. A filter cartridge according to any one of aspects 22-27, wherein said radial extension arrangement comprises a threadable material.

Aspect 34. A filter cartridge according to any of aspects 22-33, comprising a primary aperture through said first end cap, said primary aperture being in communication with said open filter interior and not overlapping with said filter media in axial projection.

Aspect 35. A filter cartridge according to any of aspects 22 to 34, wherein said radial extension arrangement comprises only 1 radial extension.

Aspect 36. A filter cartridge according to any of aspects 22 to 34, wherein said radial extension arrangement comprises at least 2 radial extensions.

Aspect 37. A filter cartridge according to aspect 36, wherein said at least 2 radial extensions are arranged at irregular angular intervals.

Aspect 38. A filter cartridge according to any of aspects 2 to 37, wherein said radial extension arrangement comprises an axial extension arrangement at its free end.

Aspect 39. A filter cartridge according to any of aspects 2 to 38, wherein said first end cap comprises three or more axially extending radial alignment tabs for alignment with a cylindrical inner wall of a corresponding filter housing main part; said alignment tabs projecting away from said first end cap and having a tapered height dimension along the axial direction.

40. A filter cartridge according to any of aspects 22 to 39, wherein said radial extension arrangement comprises two separate parts, which are arranged in a slidable manner with respect to each other.

Aspect 41. A method of installing a filter cartridge oriented in a filter housing main part to a filter housing end part; the method comprising: screwing the filter cartridge oriented in the filter housing main part to the filter housing end part to axially displace a pin projecting from the filter housing end part.

Aspect 42. A method according to aspect 40 wherein: the step of axially displacing a pin includes providing an axial force against the pin by one of the filter cartridge or the filter housing main part.

Aspect 43. A method according to any one of aspects 41 and 42, wherein: said filter housing main part comprises a first longitudinal axis and a main opening, said main opening being defined by a first end portion, said first end portion comprising an upper, interrupted rim and a first threaded portion arranged below said upper rim; said first end portion comprising a recess arrangement comprising one or more axially extending recesses, said one or more axially extending recesses at least partially interrupting said first threaded portion; said filter cartridge comprises a filtration media and comprising a second longitudinal axis and a first end cap connected to said filtration media, said first end cap comprising a central portion and a radial extension arrangement comprising one or more radial extensions extending radially away from said central portion; wherein said radial extension arrangement is adapted for being received by said recess arrangement; and the step of axially displacing a pin includes providing an axial force against the pin by one of the upper rim of the filter housing main part or one of the radial extensions.

Aspect 44. An in-tank filter assembly comprising a filter cartridge, a cover, and an interface; the cover being adapted for receiving the filter cartridge and the interface by screwing; wherein: (a) the cover comprises a main opening, said main opening being defined by a first surrounding wall comprising a first threaded portion along the first surrounding wall; (b) the interface comprises an interface opening defined by a second surrounding wall sized for fitting within the main opening; the second surrounding wall having one or more interface threaded radial extensions adapted to engage the first threaded portion; the one or more interface threaded radial extensions being interrupted by one or more recesses therebetween; and (c) the filter cartridge comprises a filtration media and a first end cap connected to said filtration media, said first end cap comprising a central portion and one or more cartridge radial extensions extending radially away from said central portion; (i) said cartridge radial extensions being adapted to threadably engage the first threaded portion of the cover; (ii) said cartridge radial extensions being interrupted by one or more recesses therebetween; and (iii) said cartridge being removably oriented in the interface opening.

Aspect 45. The in-tank filter assembly of aspect 44 wherein the cover includes a spigot, and the central portion of the first end cap engages the spigot.

Aspect 46. The in-tank filter assembly of any one of aspects 44 and 45 wherein the first threaded portion along the first surrounding wall is radially inwardly directed.

Aspect 47. The in-tank filter assembly of aspect 46 wherein the interface threaded radial extensions and the cartridge radial extensions are radially outwardly directed.

Aspect 48. The in-tank filter assembly of any one of aspects 44-47 wherein the interface threaded radial extensions and the cartridge radial extensions radially abut.

Aspect 49. The in-tank filter assembly of any one of aspects 44-47 wherein the cover includes an airflow passage allowing air to flow through the spigot and through a gap between the cover and the interface.

Aspect 50. The in-tank filter assembly of aspect 49 wherein the cover includes a first cover piece and a second cover piece in engagement with each other.

Aspect 51. The in-tank filter assembly of any one of aspects 44-50 further including a splash deflector at an end of the filter cartridge opposite of the first end cap.

Aspect 52. The in-tank filter assembly of any one of aspects 44-51 wherein: a) the first threaded portion extends 360°; (b) the interface threaded radial extensions extend less than 360°; and (c) the cartridge radial extensions extend less than 360°.

Aspect 53. The in-tank filter assembly of any one of aspects 44-51 wherein: (a) the first threaded portion extends 360°; (b) the interface threaded radial extensions extend less than 270°; and (c) the cartridge radial extensions extend more than 90°.

Aspect 54. The in-tank filter assembly of any one of aspects 44-51 wherein: (a) the first threaded portion extends 360°; (b) the interface threaded radial extensions extend 45-120°; and (c) the cartridge radial extensions extend 180-300°.

Aspect 55. The in-tank filter assembly of any one of aspects 44-51 wherein: (a) the first threaded portion extends 360°; (b) the interface threaded radial extensions extend 90°; and (c) the cartridge radial extensions extend 270°.

Aspect 56. The in-tank filter assembly of any one of aspects 44-55 wherein the filtration media comprises pleated media.

The above description is of example principles. Many embodiments can be made using these principles.

The invention claimed is:

1. A filter assembly comprising a filter cartridge, a filter housing end part, and a filter housing main part, said filter housing main part being adapted for receiving said filter cartridge and adapted for being connected to said filter housing end part by screwing, wherein said filter housing main part comprises a first longitudinal axis and a main opening, said main opening being defined by a first end portion, said first end portion comprising an upper, interrupted rim and a first threaded portion arranged below said upper rim;

said first end portion comprises a recess arrangement comprising one or more axially extending recesses, said one or more axially extending recesses interrupting said first threaded portion;

said filter cartridge comprises a filtration media and comprising a second longitudinal axis and a first end cap connected to said filtration media, said first end cap comprising a central portion and a radial extension arrangement comprising one or more radial extensions extending radially away from said central portion; said radial extension arrangement being adapted for being received by said recess arrangement; and wherein said radial extension arrangement comprises a third threaded portion on a cylindrical surface, said third threaded portion being configured to complement the first threaded portion, thereby forming a radially continuous thread upon receiving of said radial extension arrangement by said recess arrangement, at least over a part of the, preferably over the whole, axial extent of the first threaded portion.

2. A filter assembly according to claim 1, wherein said filter housing end part comprises a second threaded portion for receiving said filter housing main part by at least said first threaded portion.

3. A filter assembly according to claim 1, wherein said radial extension arrangement comprises only 1 radial extension.

4. A filter assembly according to claim 3, wherein said radial extension comprises an angular extent around said second longitudinal axis which is larger than 180°.

5. A filter assembly according to claim 1, wherein said radial extension arrangement comprises at least 2 radial extensions.

6. A filter assembly according to claim 5, wherein said at least 2 radial extensions are arranged at irregular angular intervals.

7. A filter assembly according to claim 1, whereby said recess arrangement comprises one recess.

8. A filter assembly according to claim 1, whereby said recess arrangement comprises at least two recesses.

9. A filter assembly according to claim 1, wherein a quantity of axial recesses equals a quantity of radial extensions.

10. A filter assembly according to claim 1, wherein, when said filter cartridge is received by said filter housing main part in a mounted state of said assembly, said radial extensions have an axial extent which equals the height of said respective recesses.

11. A filter assembly according to claim 1, wherein, when said filter cartridge is received by said filter housing main part in a mounted state of said assembly, said radial extensions have an axial extent which is smaller than the height of said respective recesses.

12. A filter assembly according to claim 1, wherein at least one of said radial extensions of said filter cartridge further comprises one or more through openings, which allow fluid to pass.

13. A filter assembly according to claim 1, wherein the starting point of said radially continuous thread is located on said first threaded portion of the housing main part.

14. A filter assembly according to claim 1, wherein said filter housing end part comprises a spring loaded sliding pin, said sliding pin being arranged to jut into one of said recesses upon the screwing on of said filter housing main part on said filter housing end part in the absence of said filter cartridge, thereby disabling the complete screwing on of said filter housing main part on said filter housing end part in the absence of said filter cartridge.

15. A filter assembly according to claim 1 wherein an outer dimeter of the radial extension arrangement is between 95-100% inclusive of an outer diameter of the main opening of the main part.

16. A filter assembly comprising a filter cartridge, a filter housing end part, and a filter housing main part, said filter housing main part being adapted for receiving said filter cartridge and adapted for being connected to said filter housing end part by screwing, wherein said filter housing main part comprises a first longitudinal axis and a main opening, said main opening being defined by a first end portion, said first end portion comprising an upper, interrupted rim and a first threaded portion arranged below said upper rim;

said filter cartridge comprises a filtration media and comprising a second longitudinal axis and a first end cap connected to said filtration media, said first end cap comprising a central portion and a radial extension arrangement comprising one or more radial extensions extending radially away from said central portion; and wherein said radial extension arrangement comprises a third threaded portion configured to complement the first threaded portion partially in the radial direction.

17. A filter assembly according to claim 16, wherein said filter housing end part comprises a second threaded portion for receiving said filter housing main part by at least said first threaded portion.

18. A filter assembly according to claim 16, wherein said radial extension arrangement comprises only 1 radial extension.

19. A filter assembly according to claim 18, wherein said radial extension comprises an angular extent around said second longitudinal axis which is larger than 180°.

20. A filter assembly according to claim 16, wherein said radial extension arrangement comprises at least 2 radial extensions.

21. A filter assembly according to claim 20, wherein said at least 2 radial extensions are arranged at irregular angular intervals.

22. A filter assembly according to claim 16 wherein:
said first end portion comprises a recess arrangement comprising one or more axially extending recesses, said one or more axially extending recesses interrupting said first threaded portion; and
said radial extension arrangement is adapted for being received by said recess arrangement.

23. A filter assembly according to claim 22, whereby said recess arrangement comprises one recess.

24. A filter assembly according to claim 22, whereby said recess arrangement comprises at least two recesses.

25. A filter assembly according to claim 22, wherein a quantity of axial recesses equals a quantity of radial extensions.

26. A filter assembly according to claim 22, wherein, when said filter cartridge is received by said filter housing main part in a mounted state of said assembly, said radial extensions have an axial extent which equals the height of said respective recesses.

27. A filter assembly according to claim 22, wherein, when said filter cartridge is received by said filter housing main part in a mounted state of said assembly, said radial extensions have an axial extent which is smaller than the height of said respective recesses.

28. A filter assembly according to claim 16, wherein at least one of said radial extensions of said filter cartridge further comprises one or more through openings, which allow fluid to pass.

29. A filter assembly according to claim 16 wherein an outer dimeter of the radial extension arrangement is between 95-100% inclusive of an outer diameter of the main opening of the main part.

* * * * *